United States Patent [19]

Kawana et al.

[11] Patent Number: 5,586,227
[45] Date of Patent: Dec. 17, 1996

[54] IMAGE PROCESSING APPARATUS

[75] Inventors: Takashi Kawana, Yokohama; Kaoru Seto, Chigasaki; Hiroshi Mano, Tokyo; Hiromichi Yamada, Yokohama; Atsushi Kashihara, Hachioji; Tetsuo Saito, Tokyo, all of Japan

[73] Assignee: Canon Kabushiki Kaisha, Tokyo, Japan

[21] Appl. No.: 855,083

[22] Filed: Mar. 20, 1992

[30] Foreign Application Priority Data

| Mar. 28, 1991 | [JP] | Japan | 3-064270 |
| Mar. 29, 1991 | [JP] | Japan | 3-065916 |
| Mar. 29, 1991 | [JP] | Japan | 3-066899 |
| Mar. 29, 1991 | [JP] | Japan | 3-066900 |

[51] Int. Cl.⁶ ............................................. G06F 15/00
[52] U.S. Cl. .................................. 395/112; 395/114
[58] Field of Search ............................ 395/132, 109, 395/128, 100, 112, 117, 111, 114; 364/519

[56] References Cited

U.S. PATENT DOCUMENTS

| 4,437,122 | 3/1984 | Walsh et al. | 358/166 |
| 4,847,641 | 7/1989 | Tung | 346/154 |
| 4,974,171 | 11/1990 | Yeh et al. | 364/519 |
| 5,125,072 | 6/1992 | Ng | 395/112 |
| 5,155,478 | 10/1992 | Sekiya et al. | 395/132 |
| 5,161,213 | 11/1992 | Knowlton | 395/132 |
| 5,191,640 | 3/1993 | Plass | 395/100 |
| 5,216,753 | 6/1993 | Ng | 395/109 |
| 5,271,095 | 12/1993 | Yamada | 395/128 |
| 5,276,787 | 1/1994 | Searby | 395/132 |

FOREIGN PATENT DOCUMENTS

| 356224 | 2/1990 | European Pat. Off. . |
| 389776 | 4/1991 | Japan . |

Primary Examiner—Raymond J. Bayerl
Assistant Examiner—Steven P. Sax
Attorney, Agent, or Firm—Fitzpatrick, Cella, Harper & Scinto

[57] ABSTRACT

An image processing apparatus which generates an output image based on inputted print data, includes a resolution converting device which converts image data corresponding to the inputted print data at a first resolution into image data having a second resolution. The image conversion device includes a plurality of arithmetic processing units each of which performs computations which differ from the others, with one of the plurality of arithmetic processing unit being selected in dependence upon a recording density set for recording the output image. In other aspects, the resolution conversion computation can be input into the device from an external device. In situations where the generated output image is recorded on a pulse-width-modulated device, such as a laser beam printer, it is possible to control the pulse-width based on the density set for recording.

14 Claims, 56 Drawing Sheets

FIG. 6

$$a = C4 * D4 + D4 * \overline{C3} * \overline{D3} * \overline{E3} * \overline{C4} * \overline{C5}$$
$$+ C3 * C4 * D5 * \overline{D3} * \overline{E4} * \overline{E5}$$

$$b = C4 * D4 + D4 * \overline{C3} * \overline{D3} * \overline{D5} * \overline{E5}$$
$$+ C1 * C2 * C3 * C4 * D5 * \overline{D1} * \overline{D2} * \overline{D3} * \overline{E4} * \overline{E5}$$

$$C = D4 * E4 + D4 * \overline{E3} * \overline{E4} * \overline{C5} * \overline{D5}$$
$$+ E1 * E2 * E3 * E4 * D5 * \overline{D1} * \overline{D2} * \overline{D3} * \overline{C4} * \overline{C5}$$

$$D = D4 * E4 + D4 * \overline{C3} * \overline{D3} * \overline{E3} * \overline{E4} * \overline{E5}$$
$$+ E3 * E4 * D5 * \overline{D3} * \overline{C4} * \overline{C5}$$

| LOGIC SELECTING SIGNAL | | PRINTING DENSITY |
|---|---|---|
| 1 BIT | 0 BIT | HIGH ↑ ↓ LOW |
| 1 | 1 | |
| 1 | 0 | |
| 0 | 1 | |
| 0 | 0 | |

F I G.  37

(A) OPERATION BY LOGIC CIRCUIT 205

$a = \overline{A4} * \overline{B4} * \overline{C4} * \overline{D4} * \overline{E4} * \overline{F4} * G4 * C5 * D5 * E5 * F5 * G5$
$\quad + \overline{A4} * \overline{B4} * \overline{C4} * \overline{D4} * \overline{E4} * \overline{F4} * G4 * A5 * B5 * C5 * D5 * E5 * F5 * G5$ b = NONE c = NONE $d = \overline{A4} * \overline{B4} * \overline{C4} * \overline{D4} * \overline{E4} * \overline{F4} * G4 * B5 * C5 * D5 * E5 * F5 * G5$ (B) OPERATION BY LOGIC CIRCUIT 206

$a = \overline{A4} * \overline{B4} * \overline{C4} * \overline{D4} * \overline{E4} * \overline{F4} * G4 * C5 * D5 * E5 * F5 * G5$
$\quad + \overline{A4} * \overline{B4} * \overline{C4} * \overline{D4} * \overline{E4} * F4 * G4 * A5 * B5 * C5 * D5 * E5 * F5 * G5$ $b = \overline{A4} * \overline{B4} * \overline{C4} * \overline{D4} * \overline{E4} * \overline{F4} * G4 * B5 * C5 * D5 * E5 * F5 * G5$ c = NONE $d = \overline{A4} * \overline{B4} * \overline{C4} * \overline{D4} * \overline{E4} * \overline{F4} * G4 * B5 * C5 * D5 * E5 * F5 * G5$ (C) OPERATION BY LOGIC CIRCUIT 207

$a = \overline{A4} * \overline{B4} * \overline{C4} * \overline{D4} * \overline{E4} * \overline{F4} * G4 * C5 * D5 * E5 * F5 * G5$
$\quad + \overline{A4} * \overline{B4} * \overline{C4} * \overline{D4} * \overline{E4} * F4 * G4 * B5 * C5 * D5 * E5 * F5 * G5$ $b = \overline{A4} * \overline{B4} * \overline{C4} * \overline{D4} * \overline{E4} * F4 * G4 * B5 * C5 * D5 * E5 * F5 * G5$
$\quad + \overline{A4} * \overline{B4} * \overline{C4} * \overline{D4} * \overline{E4} * F4 * G4 * A5 * B5 * C5 * D5 * E5 * F5 * G5$ $c = \overline{A4} * \overline{B4} * \overline{C4} * \overline{D4} * \overline{E4} * F4 * G4 * A5 * B5 * C5 * D5 * E5 * F5 * G5$ d = NONE (D) OPERATION BY LOGIC CIRCUIT 208

$a = \overline{A4} * \overline{B4} * \overline{C4} * \overline{D4} * \overline{E4} * \overline{F4} * G4 * C5 * D5 * E5 * F5 * G5$
$\quad + \overline{A4} * \overline{B4} * \overline{C4} * \overline{D4} * \overline{E4} * F4 * G4 * B5 * C5 * D5 * E5 * F5 * G5$
$\quad + \overline{A4} * \overline{B4} * \overline{C4} * \overline{D4} * \overline{E4} * F4 * G4 * A5 * B5 * C5 * D5 * E5 * F5 * G5$ $b = \overline{A4} * \overline{B4} * \overline{C4} * \overline{D4} * \overline{E4} * \overline{F4} * G4 * B5 * C5 * D5 * E5 * F5 * G5$
$\quad + \overline{A4} * \overline{B4} * \overline{C4} * \overline{D4} * E4 * F4 * G4 * A5 * B5 * C5 * D5 * E5 * F5 * G5$ $c = \overline{A4} * \overline{B4} * \overline{C4} * \overline{D4} * E4 * F4 * G4 * A5 * B5 * C5 * D5 * E5 * F5 * G5$ d = NONE

F I G. 38

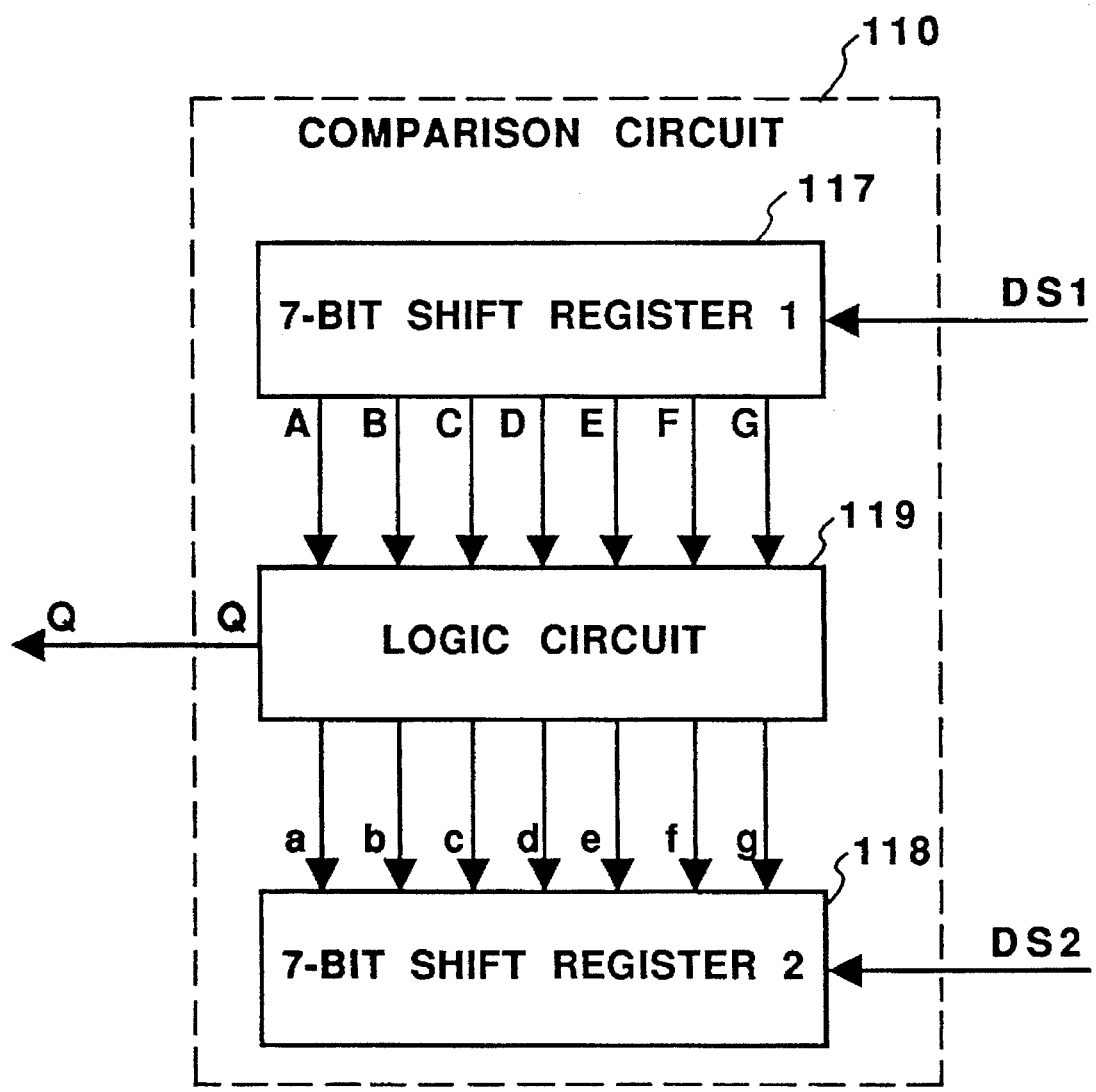
F I G. 45

Q = D

| ADDRESS | | | | | | | | | | | | | | DATA |
|---|---|---|---|---|---|---|---|---|---|---|---|---|---|---|
| A | B | C | D | E | F | G | a | b | c | d | e | f | g | Q |
| A0 | A1 | A2 | A3 | A4 | A5 | A6 | A7 | A8 | A9 | A10 | A11 | A12 | A13 | D0 |
| — | — | — | 1 | — | — | — | — | — | — | — | — | — | — | 1 |

$Q = (A+G) * a * b * c * d * e * f * g$
   $+ (B+F) * b * c * d * e * f$
   $+ (C+E) * c * d * e$
   $+ D * d$

| ADDRESS | | | | | | | | | | | | | | DATA |
|---|---|---|---|---|---|---|---|---|---|---|---|---|---|---|
| A | B | C | D | E | F | G | a | b | c | d | e | f | g | Q |
| A0 | A1 | A2 | A3 | A4 | A5 | A6 | A7 | A8 | A9 | A10 | A11 | A12 | A13 | D0 |
| 1 | — | — | — | — | — | — | 1 | 1 | 1 | 1 | 1 | 1 | 1 | 1 |
| — | — | — | — | — | — | 1 | 1 | 1 | 1 | 1 | 1 | 1 | 1 | 1 |
| — | 1 | — | — | — | — | — | — | 1 | 1 | 1 | 1 | 1 | — | 1 |
| — | — | — | — | — | 1 | — | — | 1 | 1 | 1 | 1 | 1 | — | 1 |
| — | — | 1 | — | — | — | — | — | — | 1 | 1 | 1 | — | — | 1 |
| — | — | — | — | 1 | — | — | — | — | 1 | 1 | 1 | — | — | 1 |
| — | — | — | 1 | — | — | — | — | — | — | 1 | — | — | — | 1 |

F I G.  51

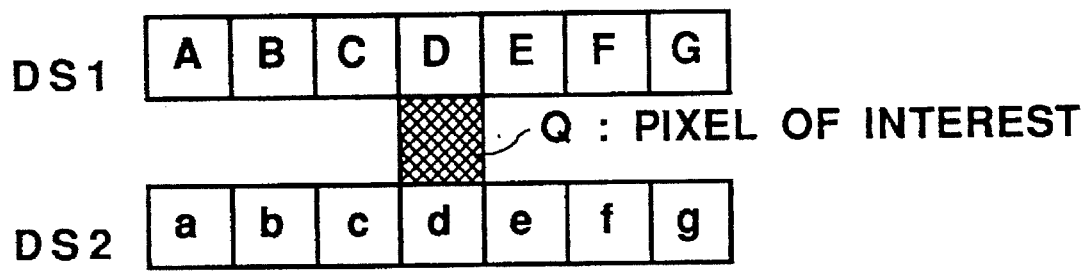
$Q = (B+F) * b * c * d * e * f$
$+ (b+f) * B * C * D * E * F$
$+ (C+E) * c * d * e$
$+ (C+e) * C * D * E$
$+ D * d$
$+ A * B * C * D * E * F * G$
$+ a * b * c * d * e * f * g$
F I G. 53

| ADDRESS | | | | | | | | | | | | | | DATA |
|---|---|---|---|---|---|---|---|---|---|---|---|---|---|---|
| A | B | C | D | E | F | G | a | b | c | d | e | f | g | Q |
| A0 | A1 | A2 | A3 | A4 | A5 | A6 | A7 | A8 | A9 | A10 | A11 | A12 | A13 | D0 |
| — | 1 | — | — | — | — | — | — | 1 | 1 | 1 | 1 | 1 | — | 1 |
| — | — | — | — | — | 1 | — | — | 1 | 1 | 1 | 1 | — | — | 1 |
| — | 1 | 1 | 1 | 1 | 1 | — | — | 1 | — | — | — | — | — | 1 |
| — | 1 | 1 | 1 | 1 | 1 | — | — | — | — | — | — | 1 | — | 1 |
| — | — | 1 | — | — | — | — | — | — | 1 | 1 | 1 | — | — | 1 |
| — | — | — | — | 1 | — | — | — | — | 1 | 1 | 1 | — | — | 1 |
| — | — | 1 | 1 | 1 | — | — | — | — | 1 | — | — | — | — | 1 |
| — | — | 1 | 1 | 1 | — | — | — | — | — | — | 1 | — | — | 1 |
| — | — | — | 1 | — | — | — | — | — | 1 | — | — | — | — | 1 |
| 1 | 1 | 1 | 1 | 1 | 1 | 1 | — | — | — | — | — | — | — | 1 |
| — | — | — | — | — | — | — | 1 | 1 | 1 | 1 | 1 | 1 | 1 | 1 |

F I G. 54

| ADDRESS | | | | | | | | | | | | | | DATA | | |
|---|---|---|---|---|---|---|---|---|---|---|---|---|---|---|---|---|
| A | B | C | D | E | F | G | a | b | c | d | e | f | g | Q | | |
| A0 | A1 | A2 | A3 | A4 | A5 | A6 | A7 | A8 | A9 | A10 | A11 | A12 | A13 | D0 | D1 | D2 |
| — | — | — | 1 | — | — | — | — | — | — | — | — | — | — | 1 | — | — |
| 1 | — | — | — | — | — | — | 1 | 1 | 1 | 1 | 1 | 1 | 1 | — | 1 | — |
| — | — | — | — | — | — | 1 | 1 | 1 | 1 | 1 | 1 | 1 | 1 | — | 1 | — |
| — | 1 | — | — | — | — | — | — | 1 | 1 | 1 | 1 | 1 | — | — | 1 | — |
| — | — | — | — | — | 1 | — | — | 1 | 1 | 1 | 1 | 1 | — | — | 1 | — |
| — | — | 1 | — | — | — | — | — | — | 1 | 1 | 1 | — | — | — | 1 | — |
| — | — | — | — | 1 | — | — | — | — | 1 | 1 | 1 | — | — | — | 1 | — |
| — | — | — | 1 | — | — | — | — | — | — | 1 | — | — | — | — | 1 | — |
| — | 1 | — | — | — | — | — | 1 | 1 | 1 | 1 | — | — | — | — | — | 1 |
| — | — | — | — | 1 | — | — | 1 | 1 | 1 | 1 | — | — | — | — | — | 1 |
| — | 1 | 1 | 1 | 1 | 1 | — | — | 1 | — | — | — | — | — | — | — | 1 |
| — | 1 | 1 | 1 | 1 | 1 | — | — | — | — | — | 1 | — | — | — | — | 1 |
| — | — | 1 | — | — | — | — | — | 1 | 1 | 1 | — | — | — | — | — | 1 |
| — | — | — | — | 1 | — | — | — | 1 | 1 | 1 | — | — | — | — | — | 1 |
| — | — | 1 | 1 | 1 | — | — | — | 1 | — | — | — | — | — | — | — | 1 |
| — | — | 1 | 1 | 1 | — | — | — | — | — | — | 1 | — | — | — | — | 1 |
| — | — | — | 1 | — | — | — | — | — | 1 | — | — | — | — | — | — | 1 |
| 1 | 1 | 1 | 1 | 1 | 1 | 1 | — | — | — | — | — | — | — | — | — | 1 |
| — | — | — | — | — | — | — | 1 | 1 | 1 | 1 | 1 | 1 | 1 | — | — | 1 |

F I G. 57

IMAGE PROCESSING APPARATUS

BACKGROUND OF THE INVENTION

This invention relates to an image processing apparatus and, more particularly, to an image processing apparatus for printing an output image on a prescribed recording medium based upon externally inputted print data.

A laser-beam printer is a typical example of an apparatus of this kind. Recent laser-beam printers are widely employed as computer output units. In particular, small-size laser-beam printers having a resolution on the order of 300 dpi (dots per inch) are rapidly becoming more popular owing to their low cost and compact nature.

As illustrated in FIG. 15, an exemplary 300 dpi laser-beam printer comprises a printer engine 200 for actually performing printing on a photosensitive drum based upon dot data, and a printer controller 100 connected to the printer engine 200 for receiving code data sent from an external host computer 300, generating page information consisting of dot data (bit-map data) based upon the code data, and transmitting the dot data to the printer engine 200 in successive fashion. The host computer 300 functions as a word processor, for example, for loading application software (an application program) from a floppy disk 500 having the application software, and then starting the application software.

The application software that can be used is of a large variety of types. Accordingly, the user keeps in his or her possession a large quantity of data created using this variety of application software.

The course of the printing operation in the printer controller 100 will now be described with reference to FIG. 18.

As shown in FIG. 18, the printer controller 100 includes an image memory 114 for storing one page of bit-map data (image data), an address generator 115 for generating addresses of the image memory 114, an output buffer register 116 for converting image data read out of the image memory 114 into an image signal VIDEO, a synchronizing clock generator circuit 117 for generating an image clock signal VCLK synchronized to a well-known beam-detection signal (BD signal), which is a horizontal synchronizing signal, a CPU 118 for administering overall control of the controller 100, a printer I/F, which is an input/output unit for interfacing signals with the printer engine 200, and a host I/F 1200, which is an input/output unit for interfacing signals with an external host, such as a personal computer.

Operation when the image signal VIDEO is sent to the printer engine in the above arrangement will now be described.

When one page of image data has been prepared in the image memory 114, the printer controller 100 sends a print-request signal PRINT to the printer engine 200. Upon receiving the PRINT signal, the printer engine 200 starts a printing operation and sends a VSREQ signal to the printer controller 100 at such time that a vertical synchronizing signal VSYNC (described later) is received and a state is attained in which printing can actually be carried out. When the VSREQ signal is received, the printer controller 100 sends the VSYNC signal to the printer engine 200 and, in order that printing may be carried out from a prescribed position in the subordinate scanning direction, counts a predetermined period of time from the moment of the VSYNC signal. When the counting of this predetermined period of time ends, the address generator 115 generates addresses successively from the beginning address of the image data stored in the image memory 114 and reads out the image data. The read image data is inputted to the output buffer register 116 line by line in terms of the main scanning lines. In order that printing may be performed from a prescribed position in the main scanning direction, a predetermined number of pulses in the image clock signal VCLK are counted after the BD signal, which is generated whenever a printing line is subjected to printing processing, is applied, after which the output buffer register 116 transmits the data of the prevailing printing line to the printer engine 200 as the image signal VIDEO synchronized to the VCLK signal. An image forming operation is then performed by the printer engine 200.

By performing the above-described operation for every of printing page, printing can be carried out on paper at the same position at all times.

As an example of actual operation, assume that a code corresponding to "a" (an ASCII code $61, where "$" indicates a hexadecimal number) has arrived from the host computer 300. In such case, the printer controller 100 develops a bit map and transfers the bit map to the printer engine 200 line by line so that the printer engine 200 performs printing as shown in FIG. 16.

However, since a character is composed of a collection of dots, the jaggedness of the character contour becomes conspicuous at a character density of 300 dpi. For this reason, printing using a printer having a higher resolution of, say, 600 dpi has been considered. However, when printing is merely performed at a recording density of 600 dpi using the dot composition as is, the size of the printed character is halved in both the vertical and horizontal direction.

More specifically, when consideration is given to the fact that most of the application software used thus far as well as the data created employing this application software has been produced for a resolution of 240-300 dpi, a problem which arises is that even if a 600 dpi printer is produced, it cannot cope with such application software. Accordingly, a technique is required through which the aforementioned application software can be exploited effectively while raising the definition of the printed output.

A method is available in which the dot composition is simply doubled within the printer in both the vertical and horizontal directions of the image data to be printed, whereby the 300 dpi dot composition is made to apply to 600 dpi. In accordance with this method, there is no reduction in the size of the printed character. However, when a character printed at 300 dpi and a character printed at 600 dpi are compared, no improvement whatsoever is seen in the jaggedness of the character contour. In short, the printing of characters cannot be carried out at a high quality which demonstrates the capability of a 600 dpi printer.

One example of a method proposed to solve this problem involves keeping the source data at 300 dpi, performing interpolation processing when the conversion from 300 dpi to 600 dpi is made using a 600 dpi printer engine, thereby improving upon the jagged edge of the contour, and printing at 600 dpi. With this method, however, it is required that the diameter of the laser beam in the printer engine be narrowed down, and the cost is very high.

Though proposals for improving upon the foregoing have been disclosed in the specifications of Japanese Patent Application Nos. 63-211501 and 63-211909 (the assignee of which is the that of the present application), which counterpart has been filed in USPTO as U.S. Ser. No. 07/398,822. These inventions involve printing in which a pixel of interest to be printed is subjected to smoothing signal processing by referring to data indicative of the surrounding or peripheral pixels and using a single prescribed algorithm.

Further, as set forth in the specification of Japanese Patent Application No. 1-224690, a method has been proposed in which the 300 dpi of the printer engine is maintained and only the recording density in the main scanning direction is raised to improve resolution [i.e., to achieve a resolution of, say, 1200 dpi (main scanning)×300 dpi (subordinate scanning)] so that vertical lines in particular are printed smoothly.

In all of the foregoing methods, however, only a single prescribed algorithm can be applied.

In addition, smoothing signal processing of the above-mentioned kind is such that different data is produced in pseudo fashion. This means that it is essentially almost impossible to select, in alternative fashion, an optimum algorithm for all kinds of data, such as data indicative of characters, Figures and pictures (dither images), etc.

For example, the following problems arise:

(1) There is a difference between the effectiveness of smoothing applied to characters (black characters) and the effectiveness of smoothing applied to reversed characters (white characters).

(2) Even if a character is capable of being smoothed, an attendant drawback is that the density of a dither image is raised, thereby resulting in a darkened picture.

(3) Characters of small size are deformed.

(4) Preferences regarding the effects of character smoothing differ depending upon the individual.

The prior is incapable of solving problems of this kind.

SUMMARY OF THE INVENTION

An object of the present invention is to provide an image processing apparatus in which, rather than merely smoothing the contour jaggedness of printed characters, a high-definition image is capable of being recorded by a prescribed recording device in conformity with printing density.

According to the present invention, the foregoing object is attained by providing an image processing apparatus for generating an output image based upon inputted print data and delivering the output image to a prescribed recording device, comprising density setting means for setting recording density, input means for inputting print data intended to be printed at a first resolution, resolution converting means for generating image data having a second resolution by splitting each pixel in image data, which is based upon the print data inputted by the input means, into a plurality of partial pixels and then applying a correction, and output means for outputting the image data converted by the resolution converting means to the prescribed recording device, the resolution converting means including a plurality of arithmetic means for computing the state of each individual partial pixel at the second resolution, wherein computations performed by individual arithmetic means differ from one another, and selecting means for selecting one of the plurality of arithmetic means in dependence upon the density set by the density setting means.

According to another aspect of the invention, the foregoing object is attained by providing an image processing apparatus comprising density setting means for setting recording density, generating means for generating a synchronizing clock signal in a main scanning direction, input means for inputting image data, which has a first printing density, in synchronization with the synchronizing clock signal generated by the generating means, memory means for storing a plurality of lines of the image data, inputted by the input means, in main-scanning units, referring means for referring to the state of a pixel of interest and the states of pixels peripheral to the pixel of interest based upon the image data stored in the memory means, a plurality of converting means for converting image data which corresponds to the pixel of interest to a second printing density higher than the first printing density based upon the results of reference performed by the referring means, selecting means for selecting one item of image data, from among the image data converted by the plurality of converting means, based upon the density set by the density setting means, and output means for outputting the image data of the second printing density outputted by the selecting means.

According to another aspect of the invention, the foregoing object is attained by providing an image processing apparatus comprising density setting means for setting recording density, generating means for generating a synchronizing clock signal in a main scanning direction, input means for inputting image data, which has a first printing density, in synchronization with the synchronizing clock signal generated by the generating means, memory means for storing a plurality of lines of the image data, inputted by the input means, in main-scanning units, referring means for referring to the state of a pixel of interest and the states of pixels peripheral to the pixel of interest based upon the image data stored in the memory means, converting means for converting image data which corresponds to the pixel of interest to a second printing density higher than the first printing density based upon the results of reference performed by the referring means, pulse-width control means for controlling pulse width of each pixel, which is contained in the image data converted by the converting means, based upon the density set by the density setting means, and output means for outputting the image data controlled by the pulse-width control means.

Another object of the invention is to provide an image processing apparatus in which, rather than merely smoothing the contour jaggedness of printed characters, a high-definition image is capable of being recorded and printed by a prescribed in conformity with printing density.

According to the present invention, the foregoing object is attained by providing an image processing apparatus for generating an output image based upon inputting print data and printing the output image on a prescribed recording medium, comprising density setting means for setting recording density, input means for inputting print data intended to be printed at a first resolution, resolution converting means for generating image data having a second resolution by splitting each pixel in image data, which is based upon the print data inputted by the input means, into a plurality of partial pixels and then applying a correction, and printing means for printing the image data converted by the resolution converting means, the resolution converting means including a plurality of arithmetic means for computing the state of each individual partial pixel at the second resolution, wherein computations performed by individual arithmetic means differ from one another, and selecting means for selecting one of the plurality of arithmetic means in dependence upon the density set by the density setting means.

A further object of the present invention is to provide an image processing apparatus in which an image whose nature is as intended by the user is capable of being printed using a prescribed recording device.

According to the present invention, the foregoing object is attained by providing an image processing apparatus for generating an output image based upon inputted print data and delivering the output image to a prescribed recording device, comprising input means for inputting image data, memory means for storing a plurality of pixels located within a predetermined area of the image data inputted by the input means, output-pixel generating means for generating an output pixel upon processing status information indicative of the plurality of pixels stored in the memory means, output means for delivering the output pixel generated by the output-pixel generating means to the prescribed recording device, second input means for externally inputting data of an algorithm of said processing, and control means for performing control in accordance with the processing algorithm data, inputted by the second input means, in such a manner that the output-pixel generating means generates an output pixel.

Still another object of the present invention is to provide an image processing apparatus in which an excellent image is capable of being recorded by a prescribed recording device at an intended picture quality irrespective of the type of image to be recorded.

According to the present invention, the foregoing object is attained by providing an image processing apparatus for generating an output image based upon inputted print data and delivering the output image to a prescribed recording device, comprising input means for inputting image data having a first resolution, memory means for storing a plurality of pixels located within a predetermined area of the image data inputted by the input means, interpolating means for interpolating image data having a second resolution higher than the first resolution by inserting a new pixel between pixels stored in the memory means, output means for outputting the image data having the second resolution, in which pixels interpolated by the interpolating means have been added to the pixel data inputted by the input means, second input means for externally inputting algorithm data indicative of interpolation performed by the interpolating means, and output means for performing control in accordance with the interpolation algorithm data, inputted by the second input means, in such a manner that the interpolating means generates interpolated pixel data.

According to another aspect of the invention, the foregoing object is attained by providing an image processing apparatus comprising interpolation algorithm data storing means for storing interpolation algorithm data inputted from an external device, image-information storing means for storing inputted image information, and output-image generating means for generating output image information, which is based upon the interpolation algorithm information stored in the interpolation algorithm data storing means, with respect to the image information stored in the image-information storing means, whereby it is possible to execute image interpolation processing in accordance with any interpolation algorithm inputted by the external device.

Other features and advantages of the present invention will be apparent from the following description taken in conjunction with the accompanying drawings, in which like reference characters designate the same or similar parts throughout the Figures thereof.

BRIEF DESCRIPTION OF THE DRAWINGS

Figure 6:
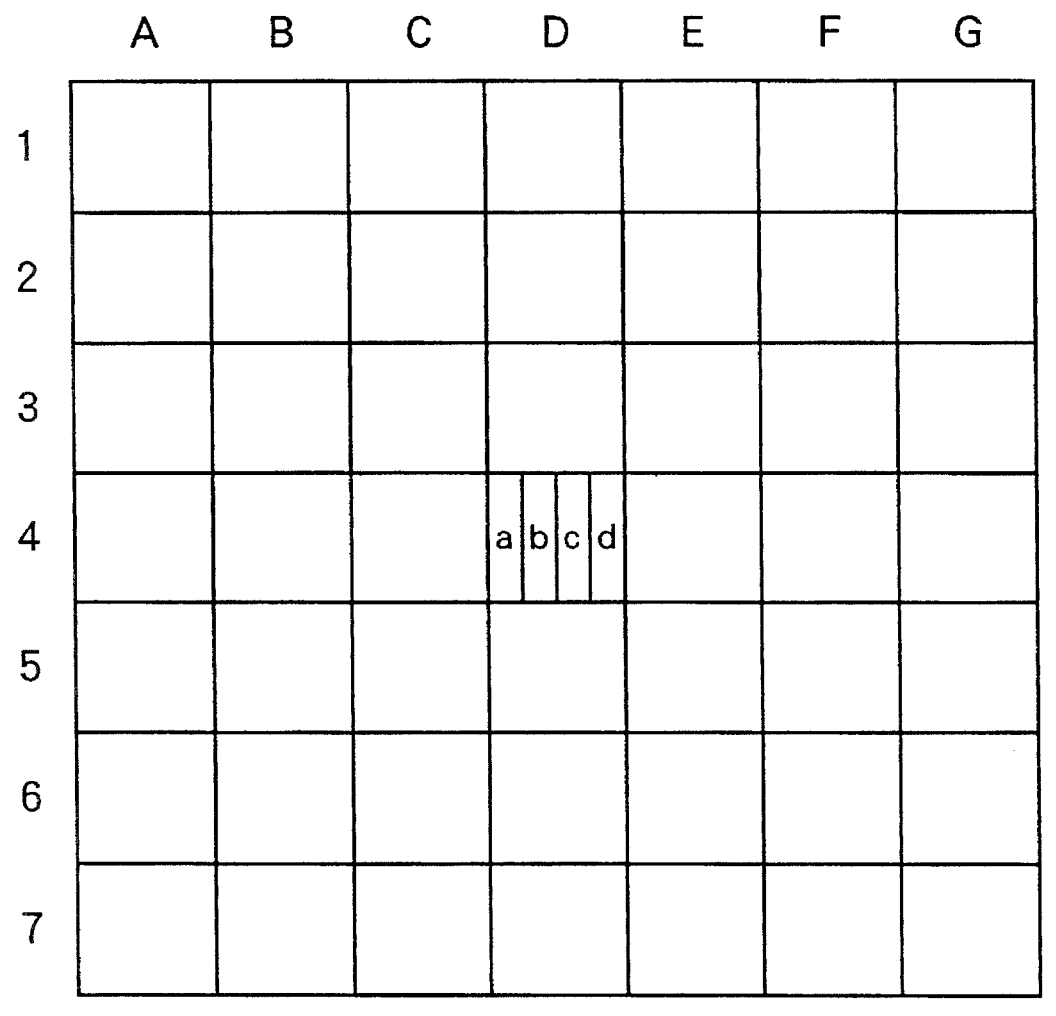

FIG. 6 is a diagram showing the relationship between a referential pixel area and outputted partial pixels in a logic circuit in the first embodiment;

FIG. 7 is a diagram showing the the content of processing performed by the arithmetic circuit in the first embodiment;

FIGS. 8~10 are diagrams for describing the content of processing of FIG. 7;

FIG. 37 is a diagram showing the relationship between set density and the logic levels of a two-bit signal outputted by the printing density setting unit of the fifth embodiment;

FIG. 38 is a diagram showing the content of processing performed by each logic circuit in FIG. 35;

FIG. 45 is a block diagram illustrating a comparison circuit in FIG. 43;

FIG. 51 is a diagram showing the data stored in an SRAM based upon the second smoothing algorithm;

FIG. 53 is a diagram for describing the principle according to which a pixel of interest is generated in a third smoothing algorithm;

FIG. 54 is a diagram showing the data stored in an SRAM based upon the third smoothing algorithm;

FIG. 57 is a diagram showing an example of the data stored in an SRAM based upon a smoothing algorithm in the eighth embodiment.

DESCRIPTION OF THE PREFERRED EMBODIMENTS

Embodiments of the present invention will now be described in detail with reference to the accompanying drawings.

In the embodiments, a laser-beam printer, which is one type of page printer, will be described with reference to FIG. 17.

Figure 17:
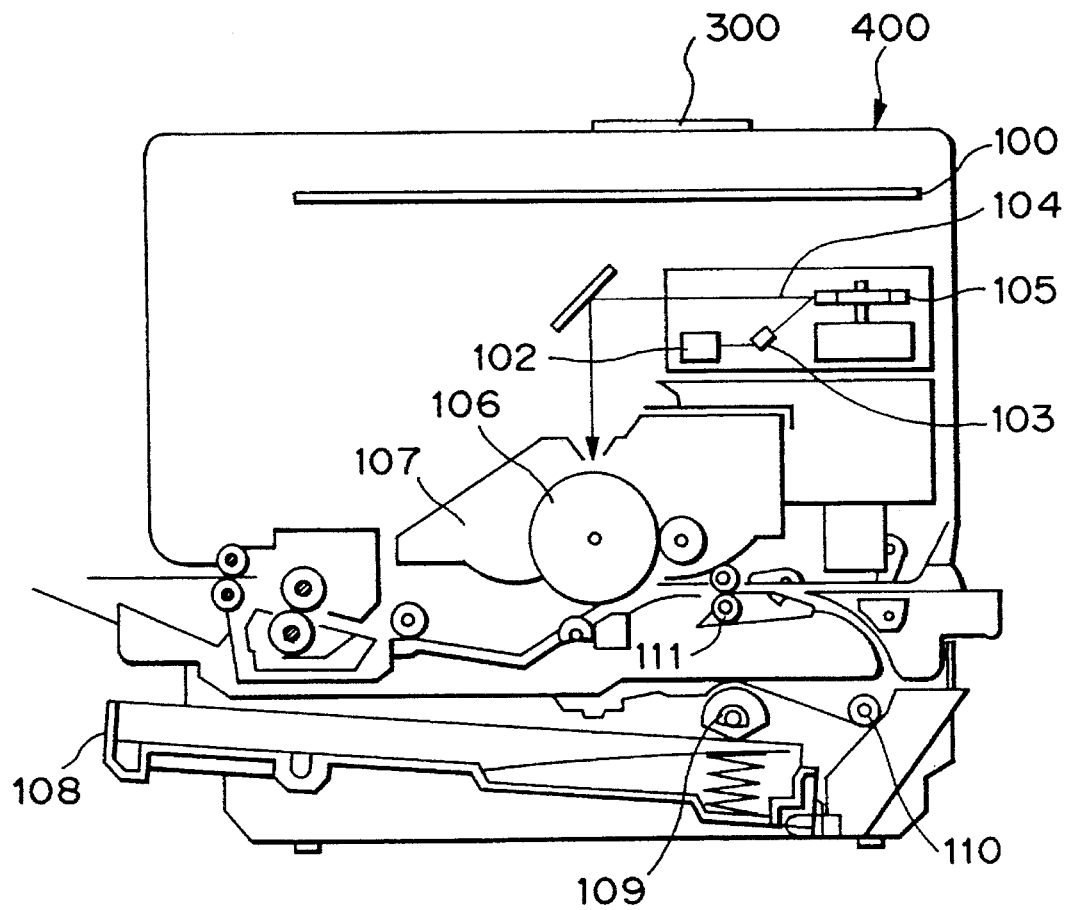
FIG. 17 is a sectional view showing the construction of a laser-beam printer according to first through eighth embodiments.
Figure 18:
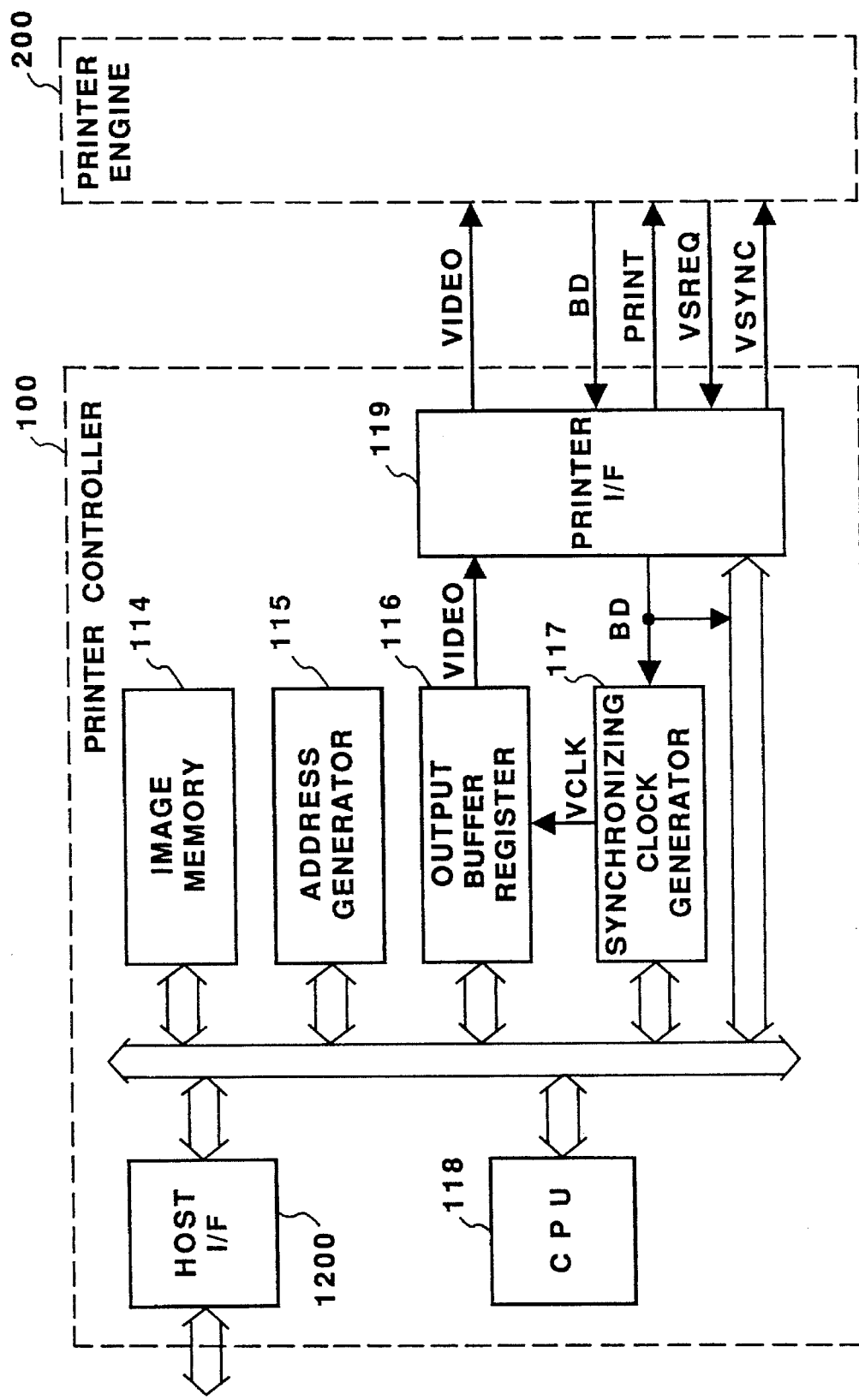
FIG. 18 is a block diagram of a printer controller in a conventional laser-beam printer.

FIG. 17 is a sectional view showing the internal structure of a laser-beam printer (hereinafter referred to as an "LBP") according to an embodiment. This LBP is capable of registering pattern data from a data source (not shown), registering form data, etc.

In FIG. 17, numeral 400 denotes the main body of the page printer for inputting and storing printing information (character codes and the like) and form information or macro instructions supplied by an externally host computer, creating character patterns and form patterns corresponding to this information, and forming an image on recording paper serving as the recording medium. Numeral 300 designates a control panel having manually operated switches and an LED display unit. Numeral 100 denotes a printer controller for performing overall control of the page printer 400 and analyzing character information supplied by the host computer. The printer controller 100 mainly converts character information into a video signal of the corresponding character pattern and outputs the video signal to a laser driver 102.

The laser driver 102 is a circuit for driving a semiconductor laser 103. Specifically, the laser driver 102 turns on and off a laser beam 104 emitted by the semiconductor laser 103 in dependence upon the inputted video signal. The laser beam 104 is made to scan an electrostatic drum 106 by being swept back and forth by a polygon mirror 105. As a result, an electrostatic latent image of a character pattern is formed on the electrostatic drum 106. The latent image is transferred to the recording paper after being developed by a developing unit 107 arrayed about the periphery of the electrostatic drum 106. After the image on the recording paper has been fixed, the paper is ejected to the outside of the apparatus. Cut sheets of paper for use in a cassette are employed as the recording paper. The cassette recording paper is accommodated in a paper cassette 108 loaded in the page printer 400 and is fed into the apparatus by a feed roller 109 and conveyor rollers 110, 111, whereby the paper is supplied to the electrostatic drum 106.

Preferred embodiments of the present invention will now be described in detail with reference to the accompanying drawings.

Figure 1:
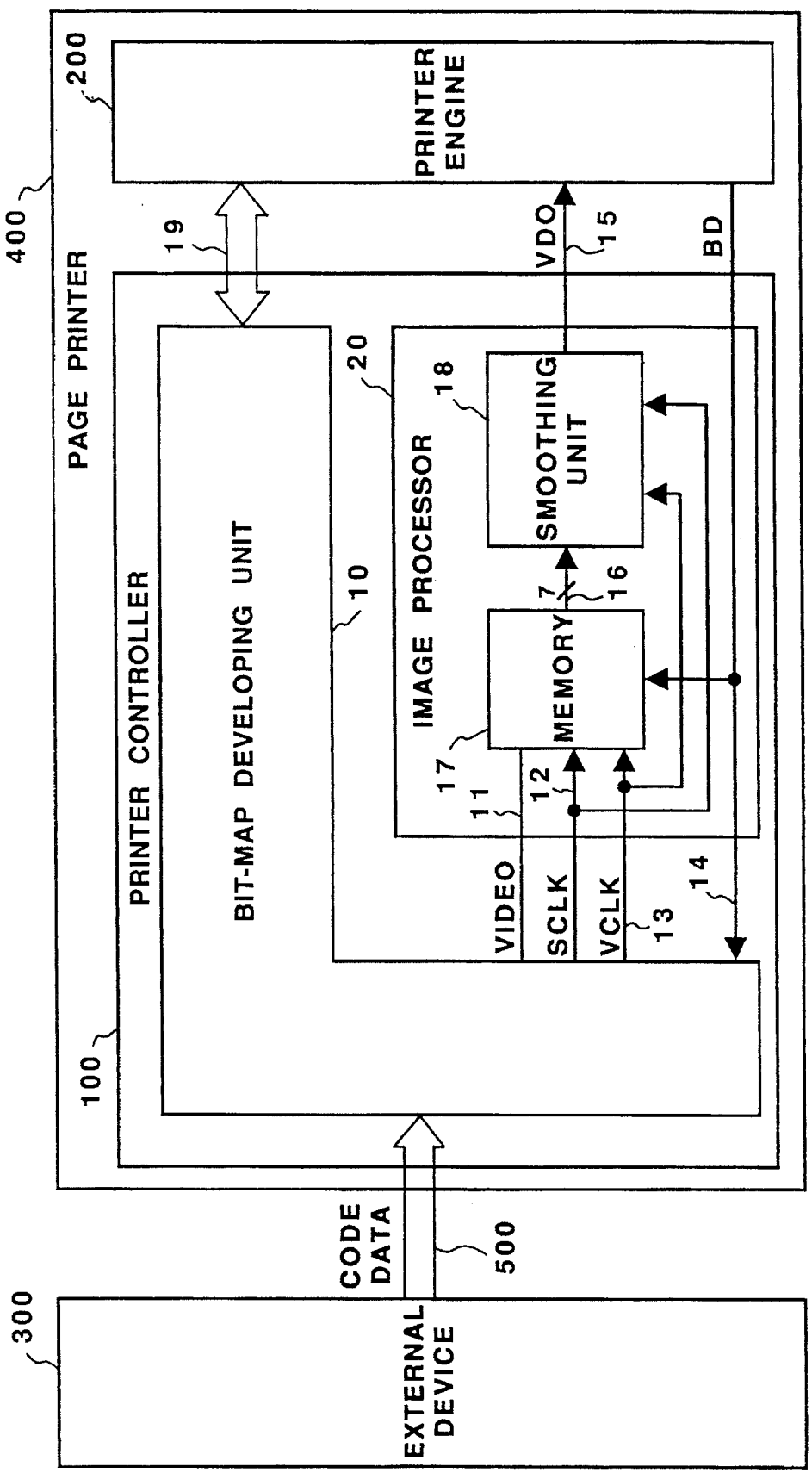
FIG. 1 is a block diagram illustrating a printer controller according to a first embodiment of the present invention.

FIG. 1 is a block diagram illustrating a first embodiment of an image processing apparatus according to the present invention. As described earlier, the page printer 400 of the laser-beam printer comprises the printer controller 100 and the printer engine 200. The printer controller 100 is internally provided with an image processor 20 and bit-map development unit 10. Typical examples of signals and data exchanged by the printer controller 100 and printer engine 200 are a signal group 19 which includes a horizontal synchronizing signal, a beam-detection signal (hereinafter referred to as a "BD") 14 of the horizontal synchronizing signal, and image data (hereinafter referred to as "VDO"). In the printer controller 100, a video signal (hereinafter referred to as "VIDEO"), an image clock (hereinafter referred to as "VCLK") and a system clock (hereinafter referred to as "SCLK") are outputted from the bit-map development unit 10 to the image processor 20. The page printer 400 is connected to an external device 300 by a cable for receiving code data 500 and performing recording processing.

As for the operation of the above-described arrangement, the bit-map development unit 10 develops the code data 500 from the external device 300 in a memory as a bit map and sends VIDEO 11 to the image processor 20 in synchronization with a horizontal synchronizing signal BD 14. The image processor 20 outputs a signal VDO 15, which is based upon VIDEO 11 inputted thereto, to the printer engine 200. Meanwhile, the signal group 19 is exchanged by the printer controller 100 and printer engine 200.

In particular, in accordance with this embodiment, the image processor 20 receives VIDEO 11 sent from the bit-map development unit 10, stores seven lines in the main scanning direction, and develops this into seven dots, in the form of a window, in the main scanning direction. The image processor 20 performs image processing as well and sends the results to the printer engine 200.

Figure 2:
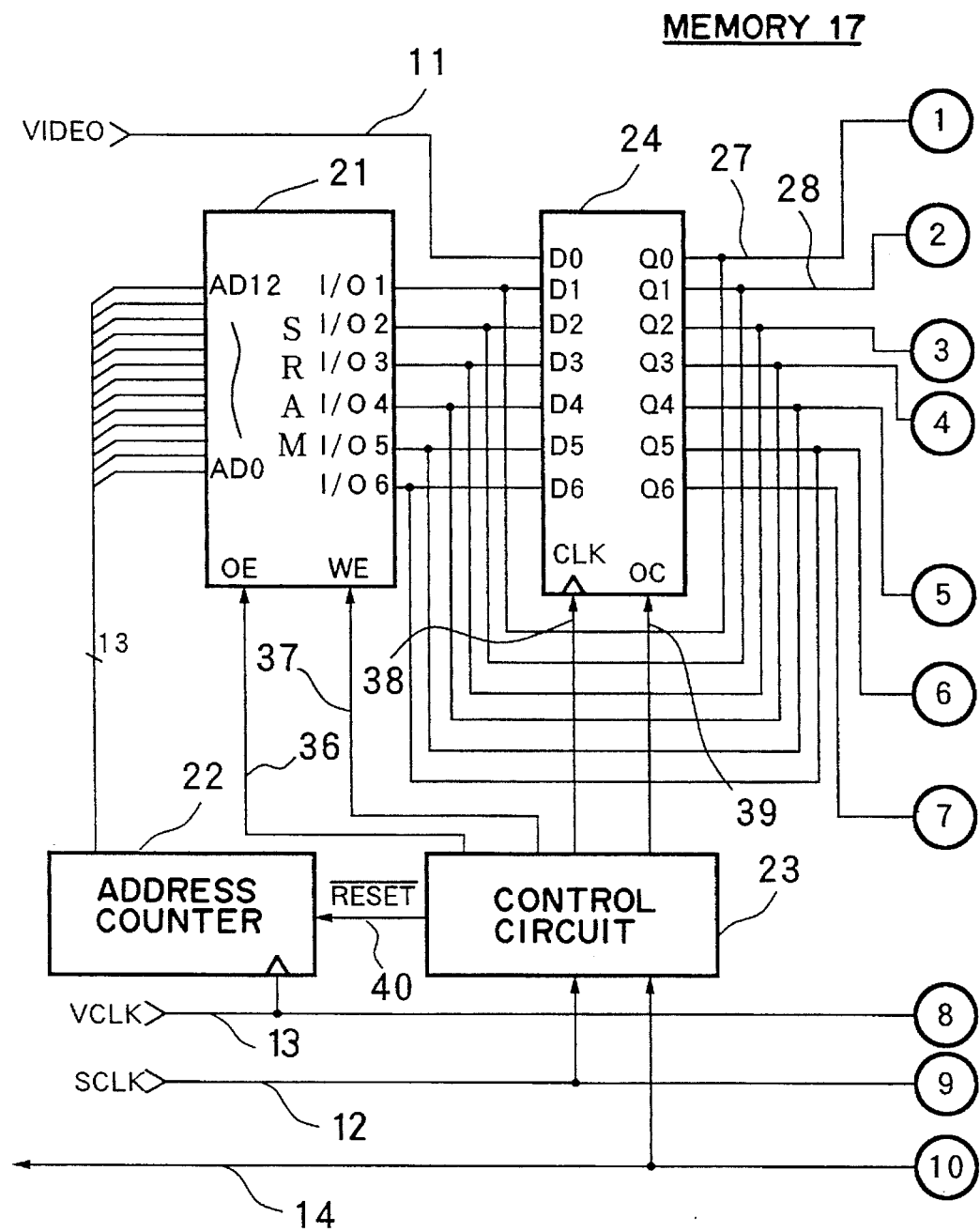
FIG. 2 is a block diagram showing a memory unit in an image processor depicted in FIG. 1.
Figure 3:
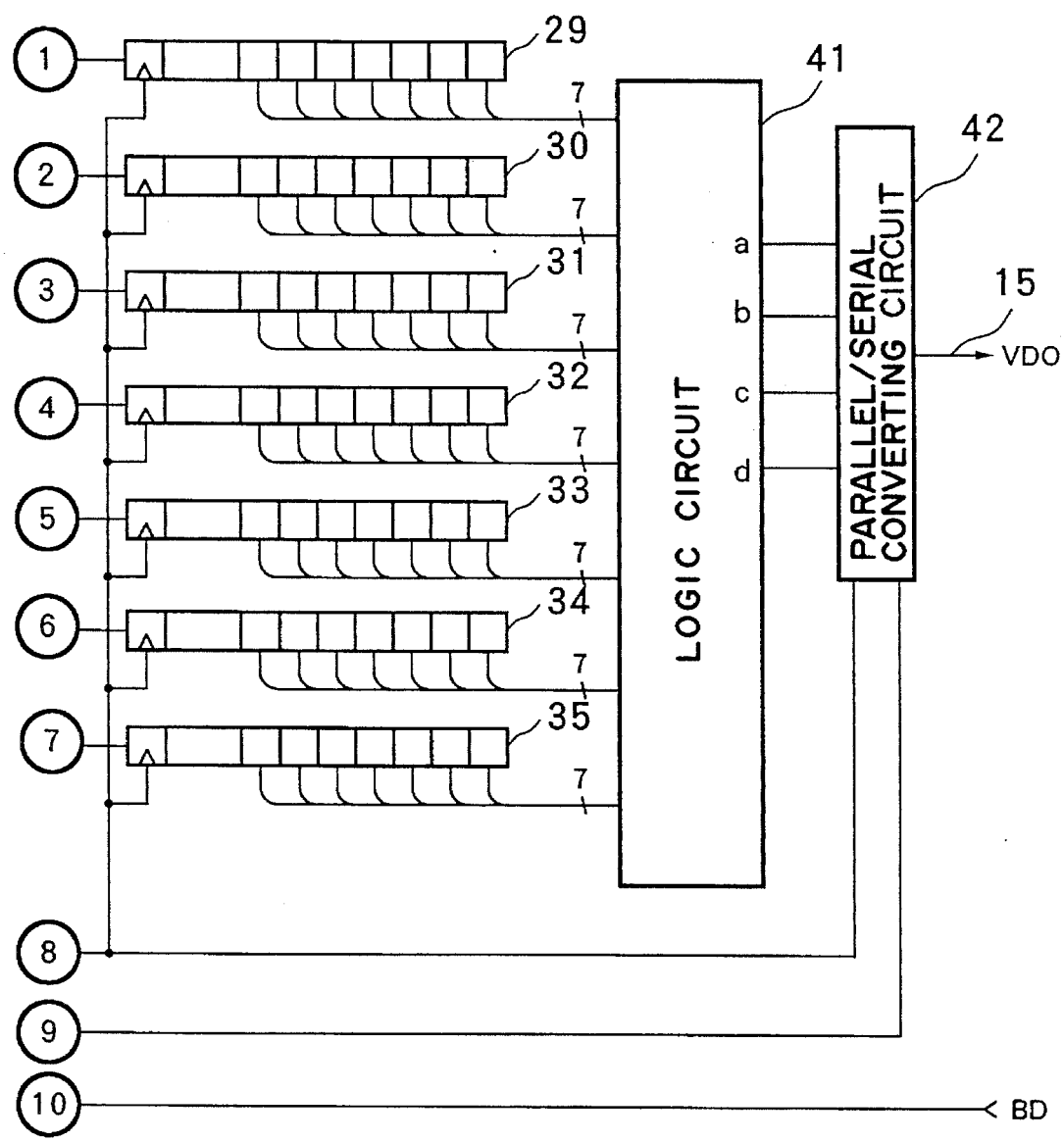
FIG. 3 is a block diagram showing a smoothing unit in the image processor depicted in FIG. 1.

FIGS. 2 and 3 are block diagrams illustrating the construction of the image processor 20 according to the first embodiment. As shown in FIGS. 2 and 3, the image processor 20 includes a static RAM (hereinafter referred to as an "SRAM") 21, an address counter 22, a control circuit 23, a three-state latch buffer 24, a logic circuit 41 and a parallel-serial converting circuit 42. A clock signal VCLK 13 corresponding to 300 dpi from the bit-map development unit 10, a clock signal SCLK 12 having the same phase as VCLK 13 and eight times the frequency, and VIDEO 11 synchronized to SCLK 12 are sent to the image processor 20. The signal VIDEO 11 is connected to one input terminal (DO) of the three-state latch buffer 24. The output Q0 (which corresponds to D0) of the three-state latch buffer 24 is delivered to the input terminal of a shift register 29 and to a data pin I/01 of the SRAM 21. The address of the SRAM 21 is connected to 13 address lines from the address counter 22. The address length should be enough to store one line of 300 dpi image data. A read signal 36 and write signal 37 for the SRAM 21, a latch signal 38 and output enable signal 39 for the three-state latch buffer 24, and a clear signal 40 for the address counter 22 are produced by the control circuit 23, the operation of which will be described later.

In FIGS. 2 and 3, the control circuit 23 produces a plurality of states during one period of VCLK 12 in accordance with SCLK 13. Accordingly, SCLK 13 has a frequency eight times that of VCLK 12, and therefore eight steps are capable of being executed during one period of VCLK 12.

Figure 4:
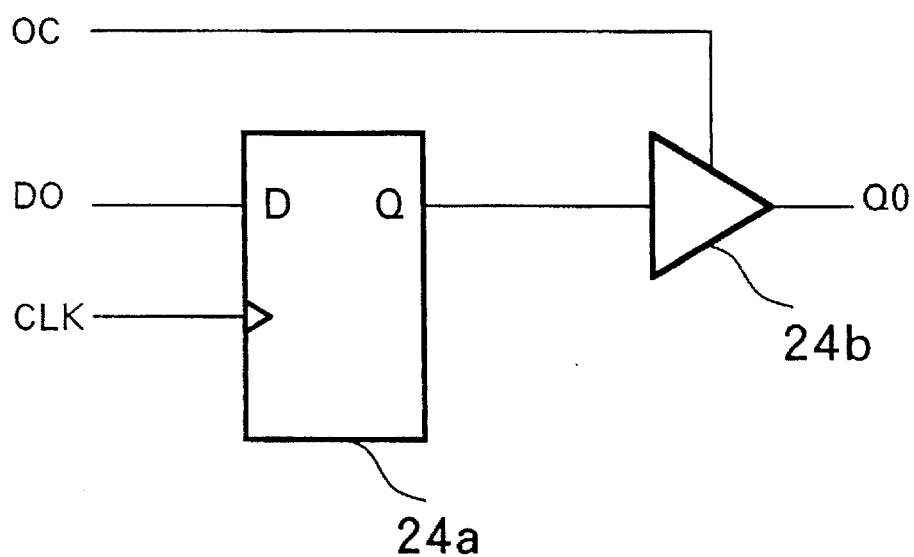
FIG. 4 is a diagram showing the construction of a three-state latch buffer according to the first embodiment.

FIG. 4 is a block diagram illustrating an example of the construction of the three-state latch buffer 24 according to the first embodiment. As shown in FIG. 4, the three-state latch buffer 24 comprises a latch circuit 24a and a buffer circuit 24b. In FIG. 4, only an arrangement corresponding to one bit is shown.

The operation of circuit peripheral to the SRAM will now be described with reference to the timing chart of FIG. 5. FIG. 6 is a diagram showing the correspondence between shift-register output and a logical expression in the first embodiment. In the description to follow, data indicative of an n-th pixel is represented by data (n), and the address at which this data is stored is represented by adr (n).

Figure 5:
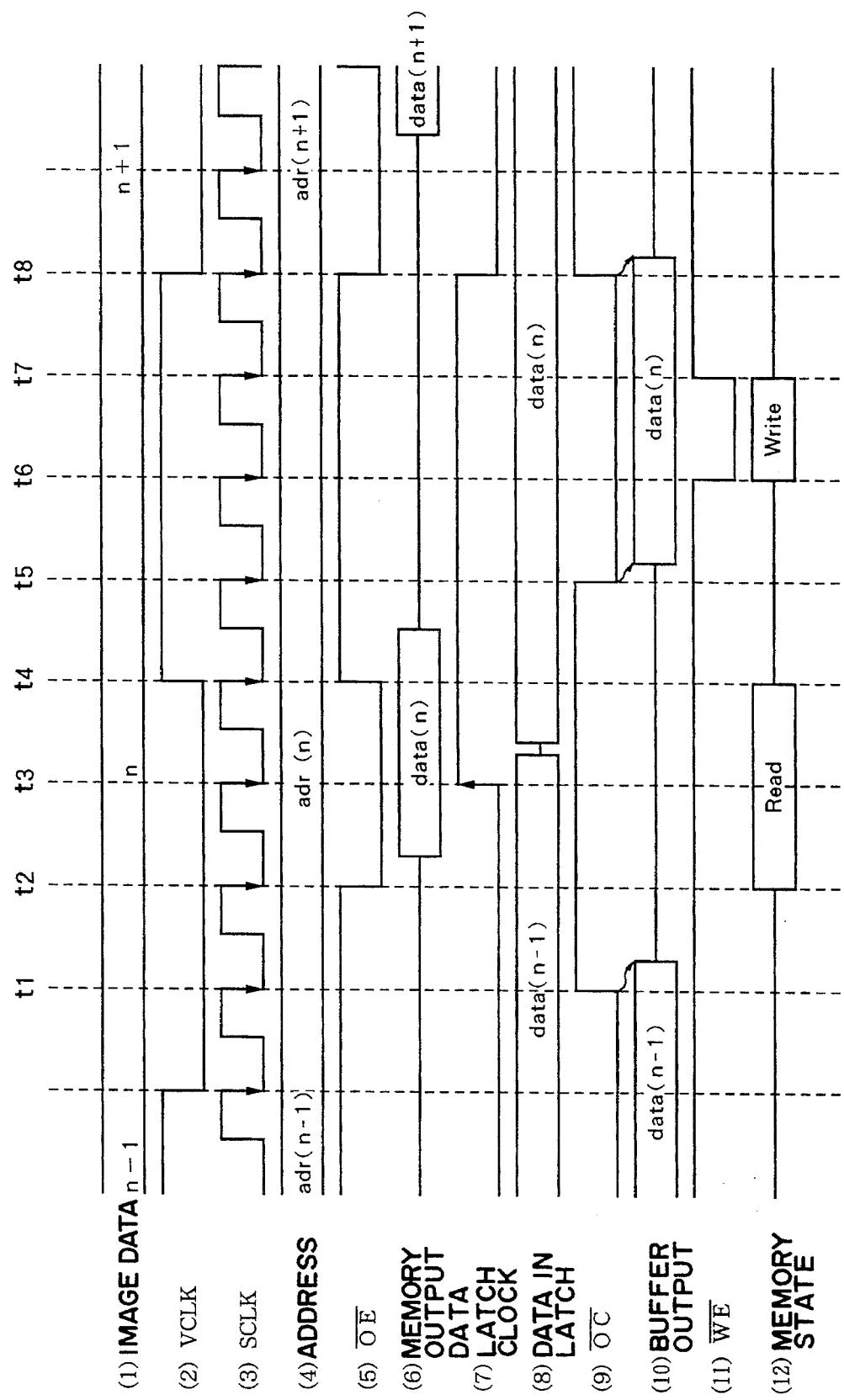
FIG. 5 is a timing chart showing various signals involving an SRAM in the image processor depicted in FIG. 1.

When a first clock pulse enters (time t1) after VCLK 12 shown at (1) FIG. 5 has assumed the low level, the enable signal OC [(9) in FIG. 5] of the three-state latch buffer 24 becomes false, a buffer circuit 24a assumes a high impedance, preceding data (n–1) in the process of being outputted stops [(10) in FIG. 5] and a state is attained in which there is no input whatsoever to the data bus of the SRAM 21. When the second clock pulse enters (time t2), the OE signal becomes true [(5) in FIG. 5], the SRAM 21 attains a read state [(12) in FIG. 5] and data represented by data(n) that has been stored at address adr(n) is outputted on the data bus.

When the third clock pulse enters (time t3), the data(n) that has been outputted on the data bus is latched within the three-state latch buffer 24 [(7) in FIG. 5]. However, the output enable signal OC shown at (9) in FIG. 5 remains false, and therefore no output is delivered to the exterior of the three-state latch buffer 24. Consequently, collisions on the bus do not occur.

When the fourth clock pulse enters (time t4), the output enable signal OE of SRAM 21 becomes false and the SRAM 21 assumes a floating state.

When the fifth clock pulse enters (time t5), the output enable signal OC of the three-state latch buffer 24 becomes true, the data(n) that has been latched is outputted and is sent to the SRAM 21. However, since the write-enable signal WE 37 shown at (11) in FIG. 5 is false, the data is not written in the SRAM 21.

When the sixth clock pulse enters (time t6), the write enable signal WE of the SRAM 21 becomes true and data(n) is written in the SRAM 21.

When the seventh clock pulse enters (time t7), the write enable signal WE becomes false and the writing operation is completed.

When the eighth clock pulse enters (time t8), the address is updated from adr(n) to adr(n+1) and one series of operations relating to the data of one pixel is completed. An operation of this kind is performed in a similar manner and at the same time with regard also to the three-state latch buffer 24 and SRAM 21.

Thus, data that has been outputted from the data pin IO1 of SRAM 21 in one cycle of VLCK 12 is written in data pin IO2 at the same address. Similar processing is performed with regard also to the other data pins of SRAM 21. By sending the data sequentially, seven lines of image data are stored at all times and the image data is supplied to shift registers 29 through 35.

The shift registers 29 through 35 each have a bit length of seven bits and subject the seven lines of image data sent from the three-state latch buffer 24 to a serial-to-parallel conversion. Accordingly, an image of 7×7 dots in the main and subordinate scanning directions is developed by the shift registers 29 through 35. The image of 7×7 dots, for a total of 49 dots, is supplied to the logic circuit 41.

The logic circuit 41 applies the 49-bit data to a 7 ×7-dot window of the kind shown in FIG. 6 and, in accordance with prescribed logic, decides four dots a, b, c, d resulting from processing a pixel of interest D4.

Thus, data of seven lines read out of the SRAM 21 is inputted to the shift registers of seven bits, a serial-to-parallel conversion is performed by VCLK 12, 7 ×7=49 pixels are referred to, and the outputs of the shift registers are fed into the logic circuit 41. In this case, the pixel of interest is the fourth dot portion of the shift register 32.

Based upon the 49 inputs applied thereto, the logic circuit 41 decides and outputs pixels of a, b, c, d, obtained by splitting the pixel of interest into four parts, as shown in FIG. 6. The output of the logic circuit 41 is subjected to a parallel-to-serial conversion by the parallel-serial converting circuit 42, and the latter outputs 1200 dpi pixel data 15, which is then printed by the printer engine 200.

Thus, a, b, c, d decided by the logical conversion are outputted simultaneously. In the parallel-serial converting circuit 42, the signal SCLK 13 is frequency divided by two, this is used to apply a parallel-to-serial conversion to the converted pixel data a, b, c, d inputted at the frequency of VCLK 12, and the image data 15 is outputted in the order a, b, c, d at a frequency four times that of VCLK, i.e., in units of 1200 dpi.

Figure 8:
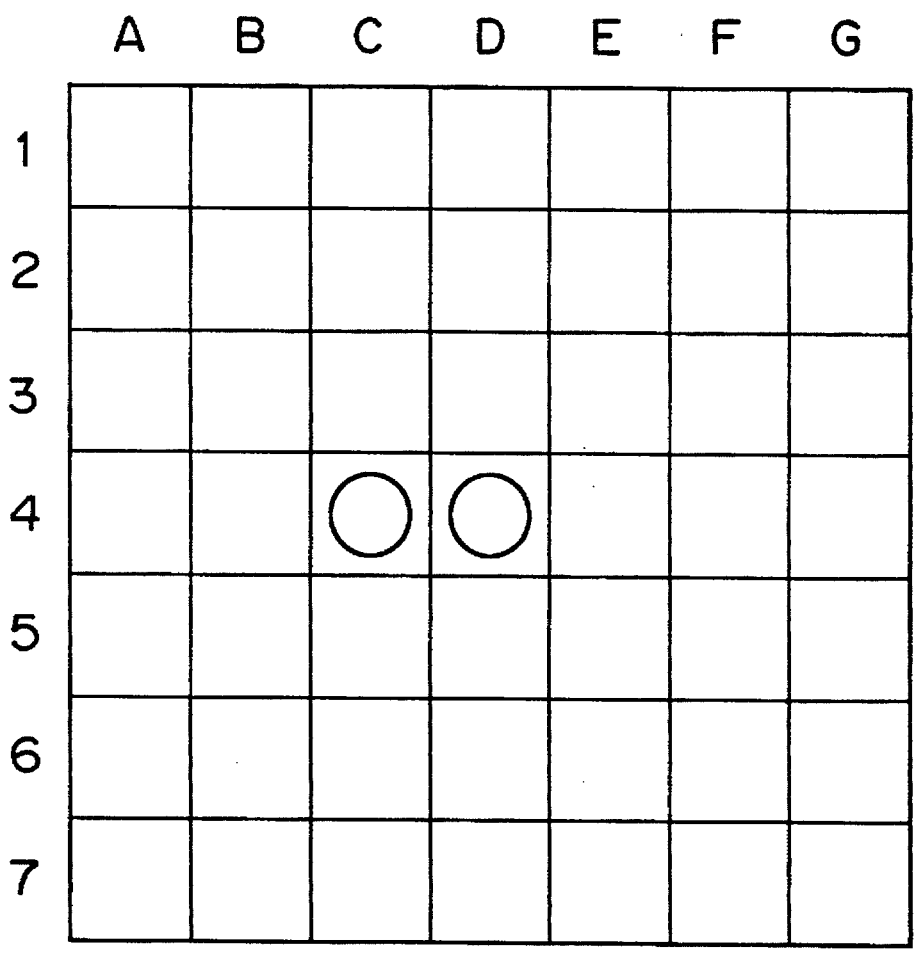
Figure 9:
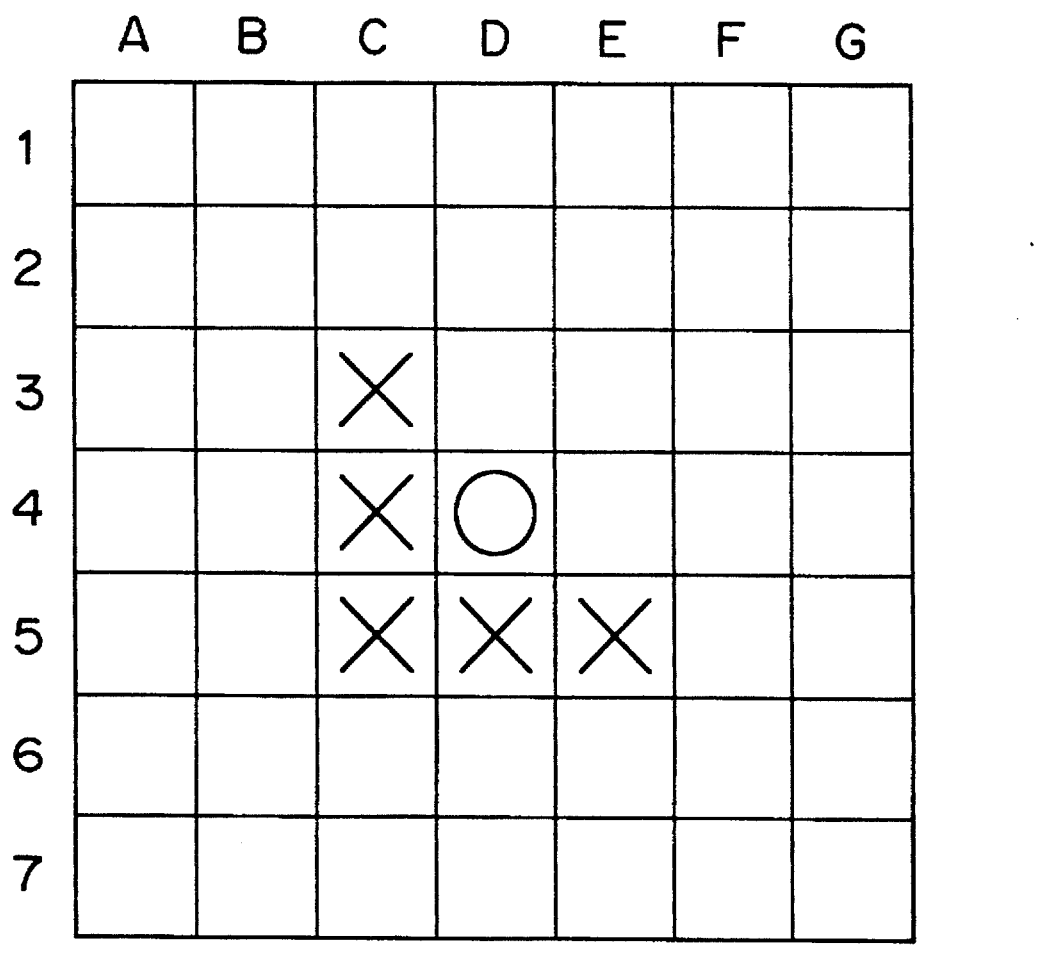
Figure 10:
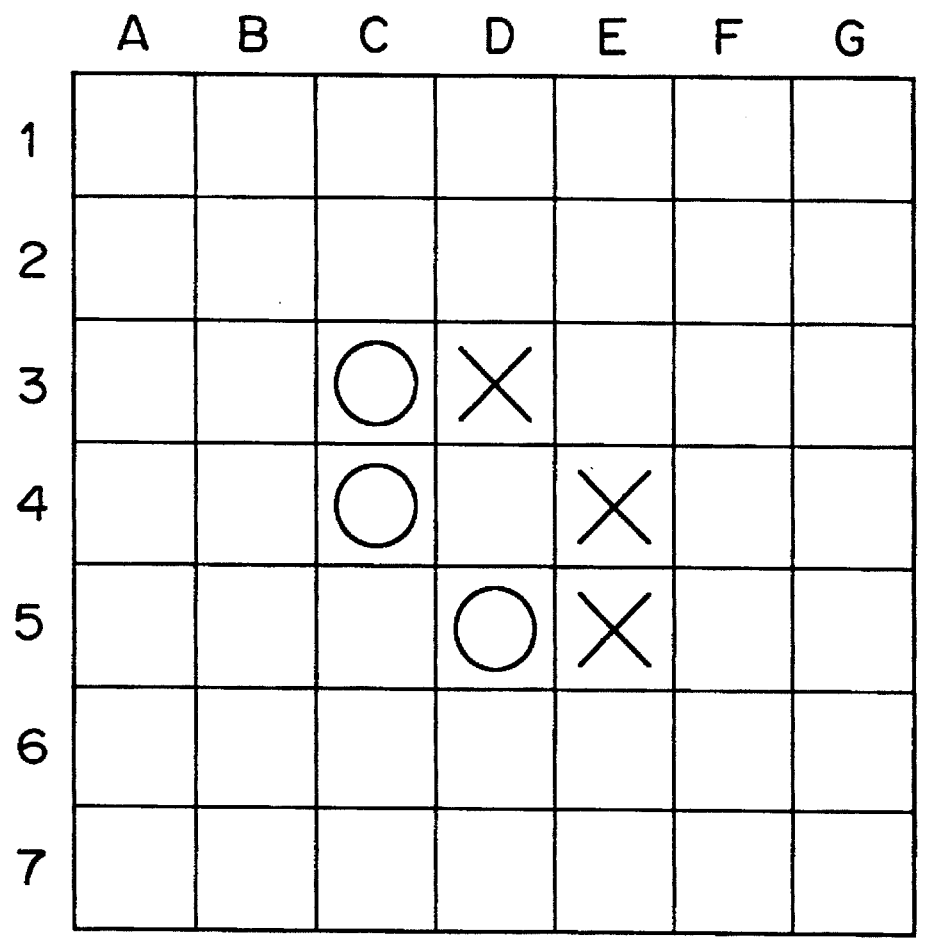

The processing executed by the logic circuit 41 will now be described with reference to FIGS. 7 through 10. FIG. 7 illustrates the contents of processing for producing the partial pixels a, b, c, d (see FIG. 6) obtained by splitting the 300 dpi pixel of interest into four parts. The circle marks in FIGS. 8 through 10 represent black pixels (dots that are on), and the "X" marks represent white pixels (dots that are off). The 300 dpi pixel of interest is D4. Further, the pixels having upper bars in FIG. 7 indicate that the bits at these pixel positions have been reversed. In addition, the "*" mark represents a logical product, and the "+" mark represents a logical sum.

The details of a logical expression for generating the partial pixel a will now be described.

The first term (=C4*D4) of logical expression a is for a case where it is desired to preserve the state of the original pixel, as shown in FIG. 8. The condition for this to hold is that the pixel of interest and its neighboring pixels be black. The second term represents logic for detecting and preserving right-angled contours. In this case, the condition for this to hold is that the pixel of interest be black and that the five peripheral pixels in the Figure be white. The third term is logic for adding a dot to a conspicuously jagged portion of a contour. The condition for this to hold is that a prescribed number of the peripheral pixels be white and black, irrespective of the state of the pixel of interest.

A description of the generation of other partial pixels will be omitted.

Figure 11:
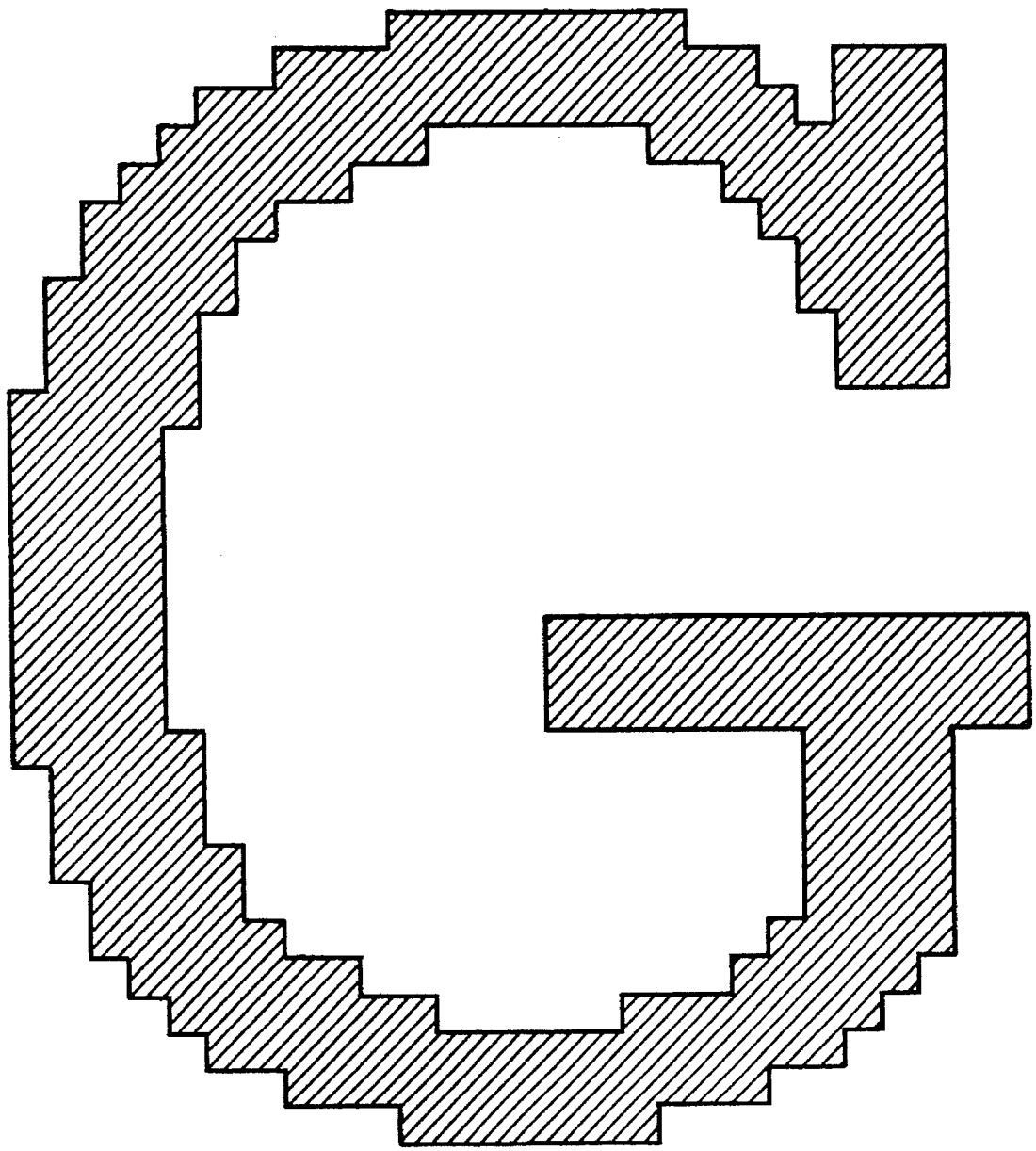
FIG. 11 is a diagram showing a character pattern before application of smoothing processing according to the first embodiment.
Figure 12:
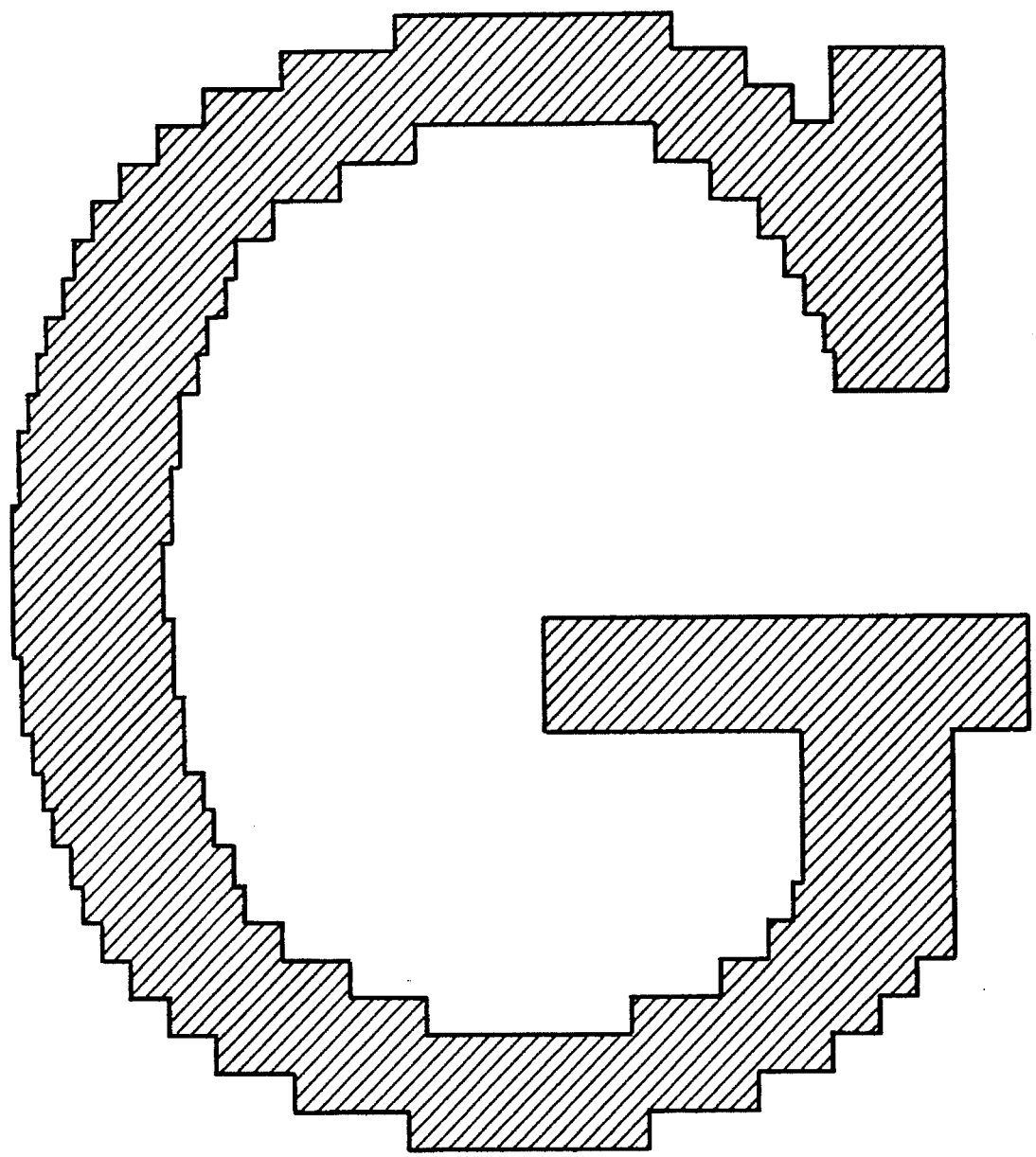
FIG. 12 is a diagram showing a character pattern after application of smoothing processing according to the first embodiment.

FIGS. 11 and 12 illustrate image data before and after smoothing processing, respectively. It will be appreciated that the contour of the letter "G" shown in FIG. 11 has been improved to that shown in FIG. 12.

Further, since the above-described smoothing processing takes preservation of density into consideration, there is no change in density, as a comparison of FIGS. 11 and 12 illustrates.

In the foregoing embodiment, an example is described in which the pixels referred to are 7×7=49. However, this does not impose a limitation upon the invention. For example, 9×9 pixels may be used. Further, though expression is made by a combination of 300 dpi and 1200 dpi, this also does not impose a limitation upon the invention.

Thus, in accordance with the first embodiment, as described above, the contour of an output image can be made smooth through an inexpensive arrangement.

Figure 13:
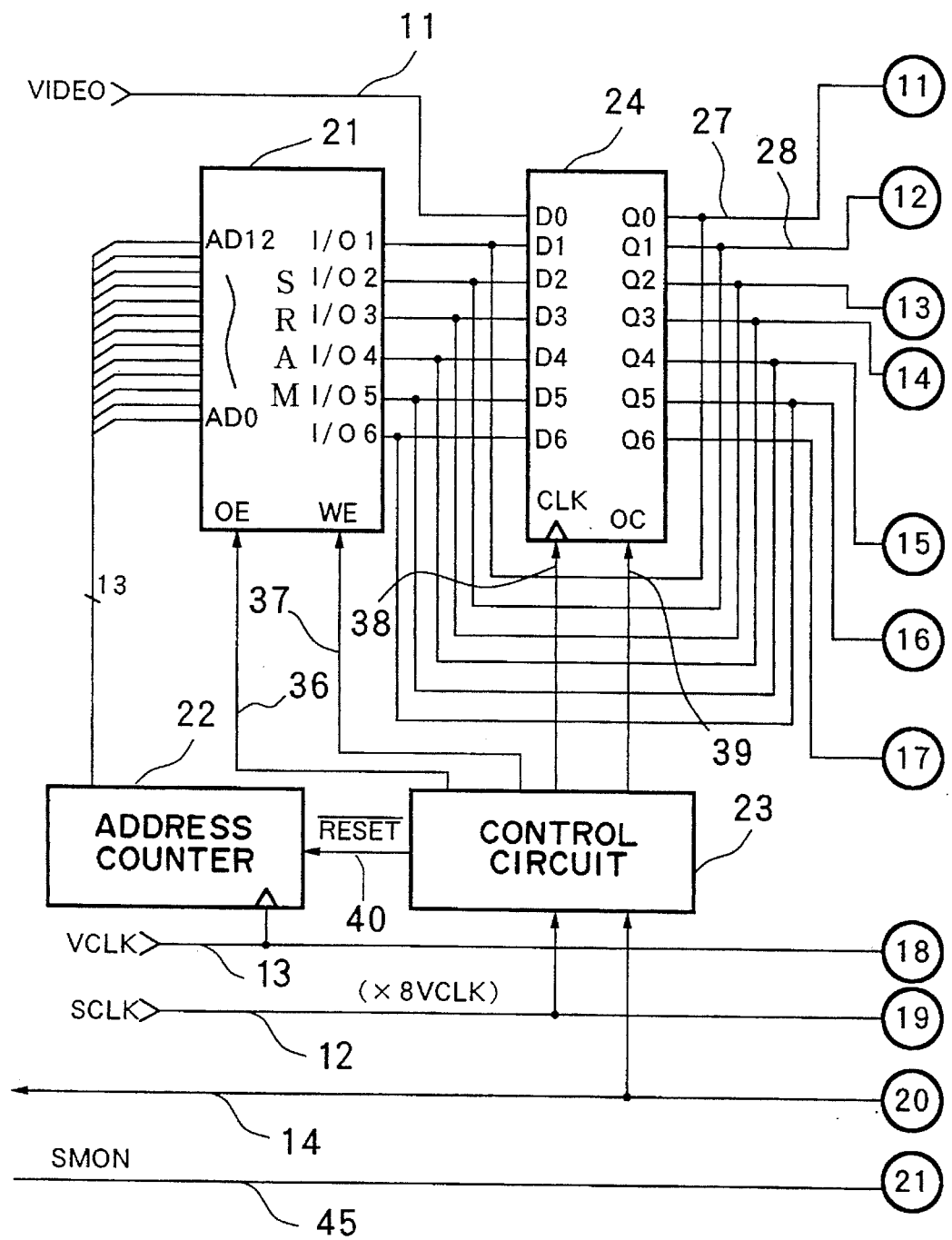
FIGS. 13 and 14 are block diagrams illustrating an image processor according to a second embodiment of the present invention.
Figure 14:
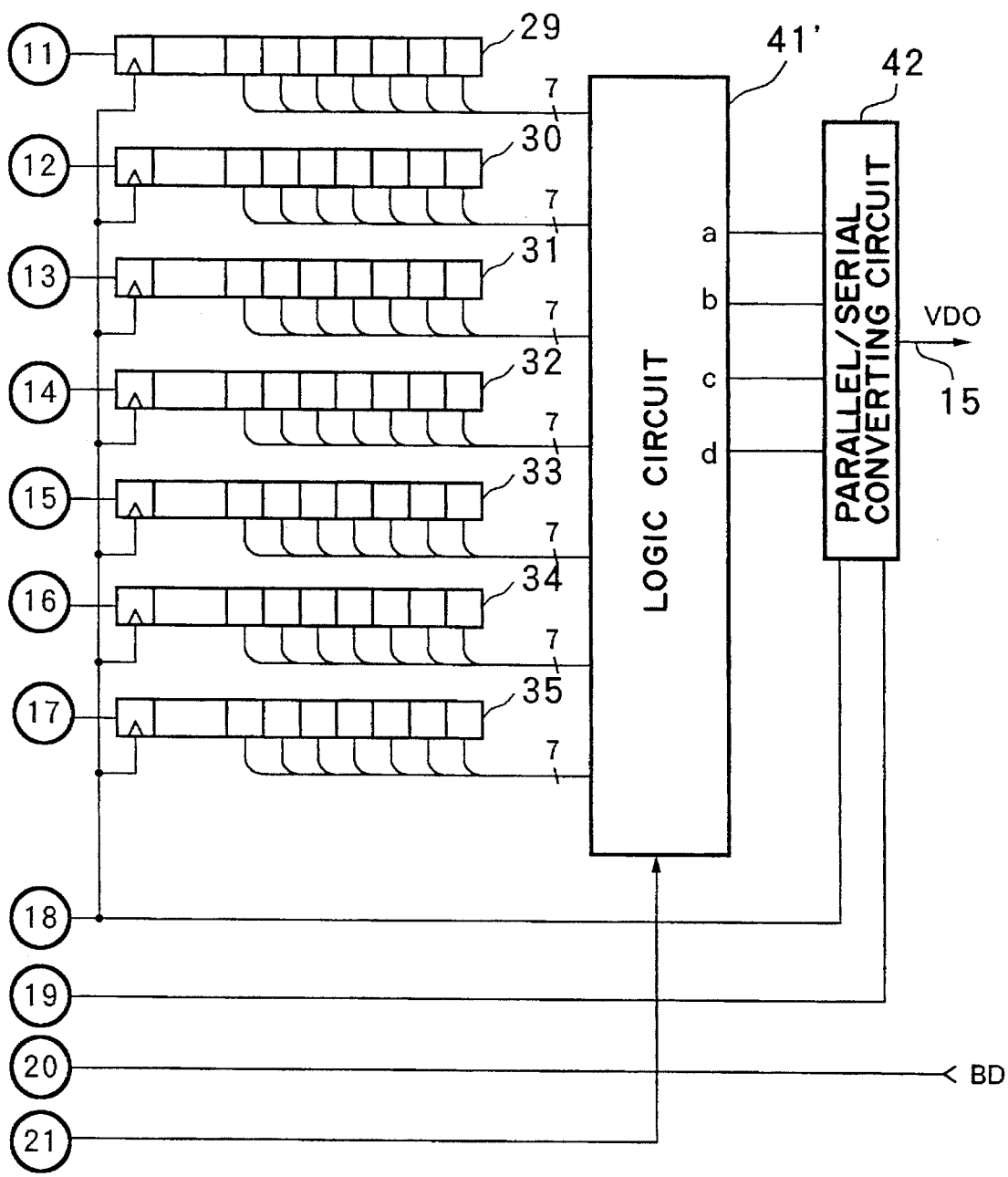
Figure 15:
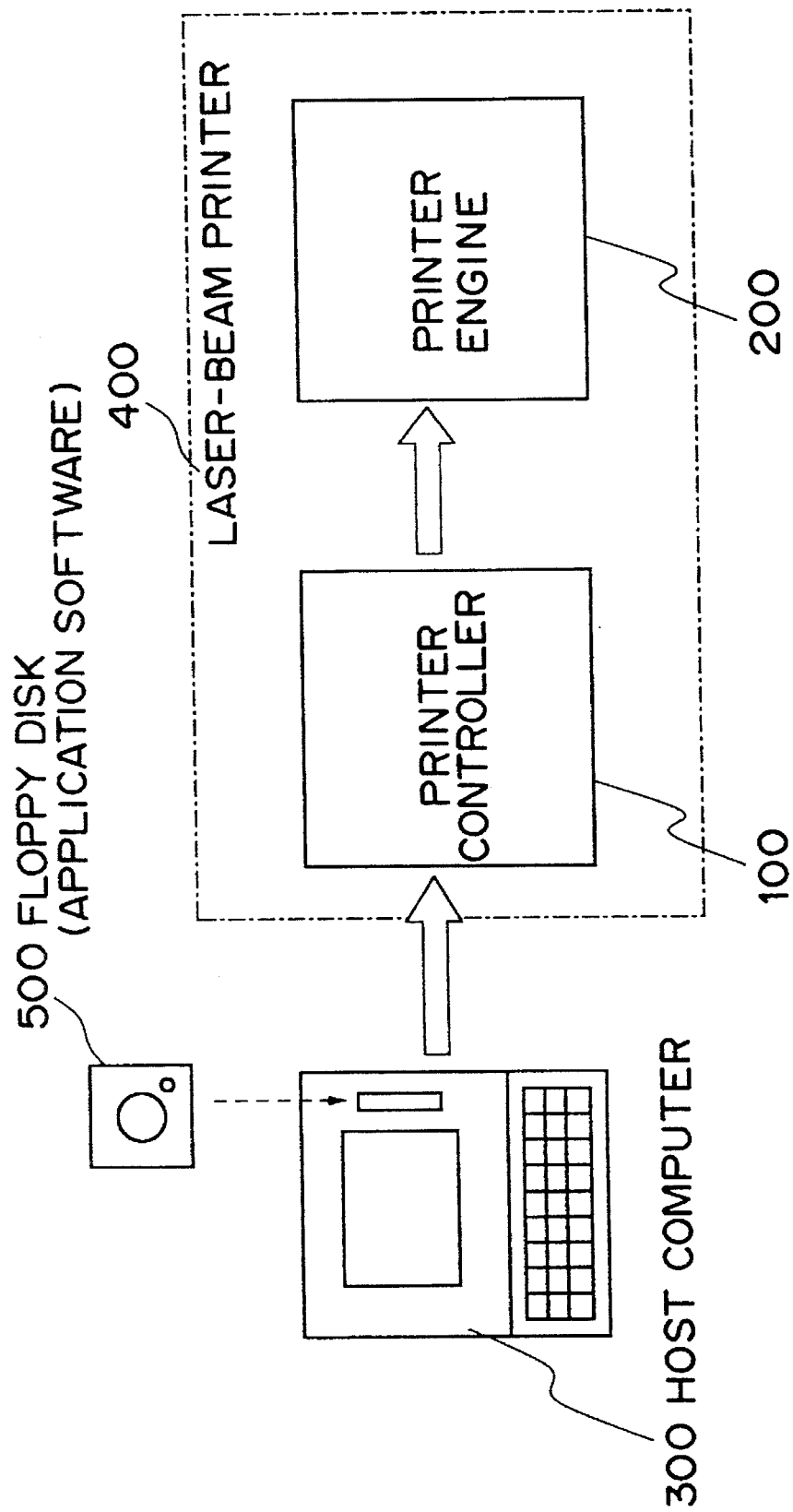
FIG. 15 is a diagram showing the construction of an ordinary laser-beam printer.

FIGS. 13 and 14 are block diagrams illustrating an example of the construction of an image processor according to a second embodiment of the invention. Circuit portions in FIGS. 13 and 14 similar in construction and function to those shown in FIGS. 2 and 3 are designated by like reference characters and need not be described again.

The first embodiment described above is premised upon delivery of an image such as that of a character. However, in a case where an image that has been subjected to binarizing processing, such as dither processing, is delivered, applying smoothing processing will have an adverse effect upon the image printed as a result of such processing.

In the second embodiment of the invention, therefore, a command signal (hereinafter referred to as "SMON") 45 is accepted by a logic circuit 41' every page in order to decide whether to carry out smoothing processing. For example, in a case where a page contains a dither image, a deterioration in the printed image can be prevented by turning off smoothing. If a page does not contain a dither image, smoothing is turned on so as to carry out an operation similar to that of the first embodiment. The type of processing executed by the logic circuit 41' in the second embodiment is such that processing similar to that of the first embodiment is performed when the SMON signal is at the "1" level. When the level of the SMON signal is "0", processing is executed so that the logic level of the inputted 300 dpi pixel of interest is reflected in the partial pixels a, b, c, d in common.

In the second embodiment described above, the advantage obtained is that, in addition to the effects of the first embodiment, an excellent image can be reproduced even with regard to an image that has been subjected to dither processing.

Thus, a logical expression which decides a is set up in the manner described above. Since the basic arrangement for each of the other partial pixels b, c and d is the same, no further description need be given.

Thus, in accordance with the second embodiment, as described above, the contour of an output image can be made smooth through an inexpensive arrangement.

A third embodiment of the present invention will now be described.

The third embodiment also will be described for a case where a 300 dpi laser-beam printer is used.

Figure 19:
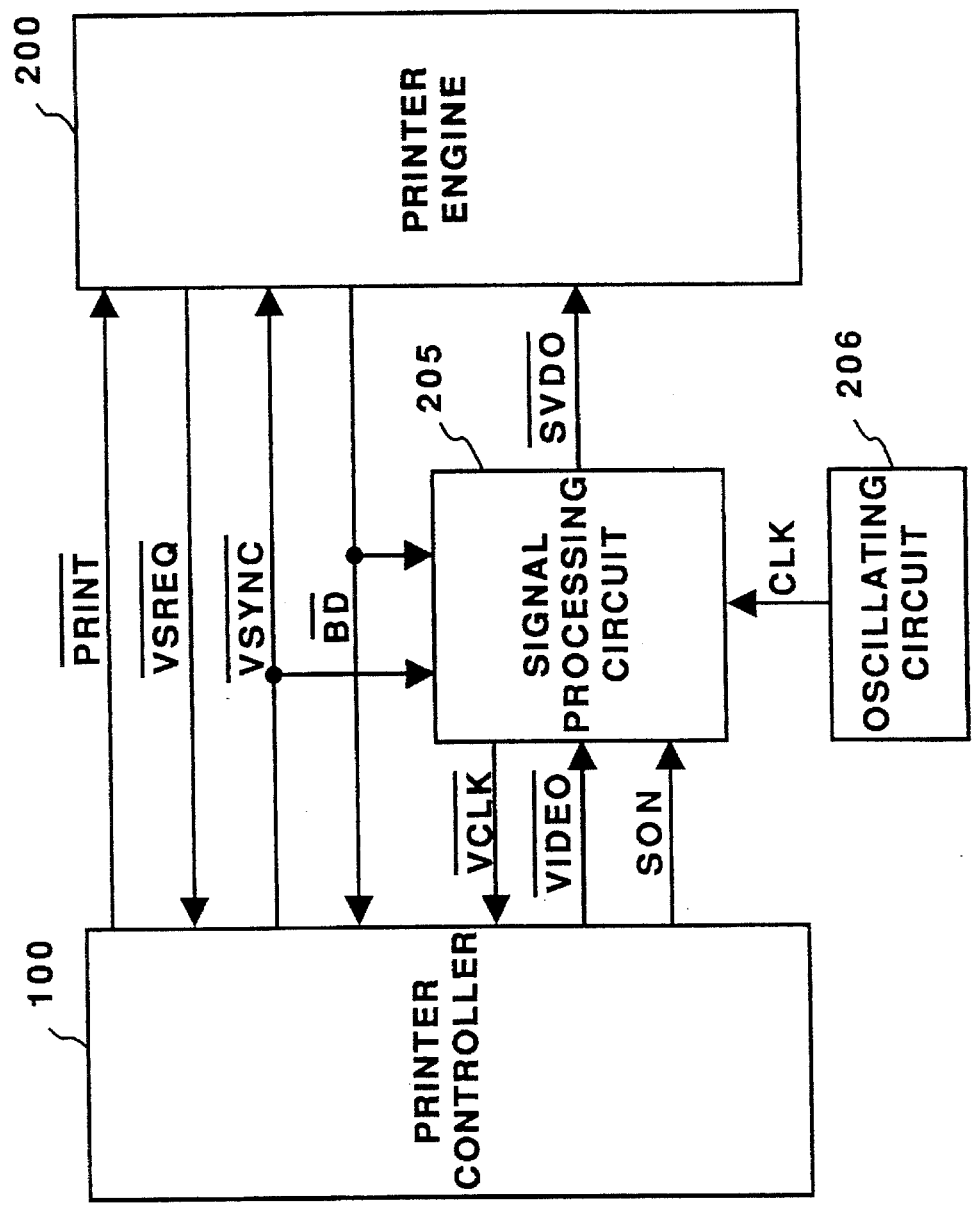
FIG. 19 is a block diagram showing a laser-beam printer according to a third embodiment.

FIG. 19 is a block diagram showing a third embodiment in which the image processing apparatus of the present invention is applied to a laser-beam printer. The printer shown in FIG. 19 mainly comprises a signal processing circuit 205, the printer engine 200, the printer controller 100, and an oscillating circuit 206. Mechanically speaking, the signal processing circuit 205 of the third embodiment is situated between the printer engine 200 and the printer controller 100, the resolution (in the main scanning direction) of the 300 dpi image signal VIDEO outputted by the printer controller 100 is raised to 1200 dpi, and the signal is sent to the printer engine 200 as a smoothed signal (hereinafter referred to as "SVDO").

Other input and output signals associated with the signal processing circuit 205 will now be described. First, input signals from the printer controller 100 are the VIDEO signal, a vertical synchronizing signal (VSYNC) and a signal (SON) which designates whether smoothing processing is to be turned on or off. An input signal from the printer engine 200 is the horizontal synchronizing signal (BD). An output signal to the printer controller 100 is a VIDEO output clock, which is an image clock signal (VCLK) synchronized to the BD signal. Further, a CLK signal inputted from the oscillating circuit 206 is used as a basic clock within the signal processing circuit 205 and has a frequency eight times that of the VCLK signal. Since the VCLK signal is produced by frequency-dividing the CLK signal by eight at a timing synchronized to the BD signal, the synchronizing precision of the BD signal becomes ⅛ of period of VCLK. Accordingly, jitter of the image (in the main scanning direction) with respect to the BD signal is held within ⅛ of one dot and therefore an excellent image is obtained.

The signal processing circuit 205 will be described next.

Figure 20:
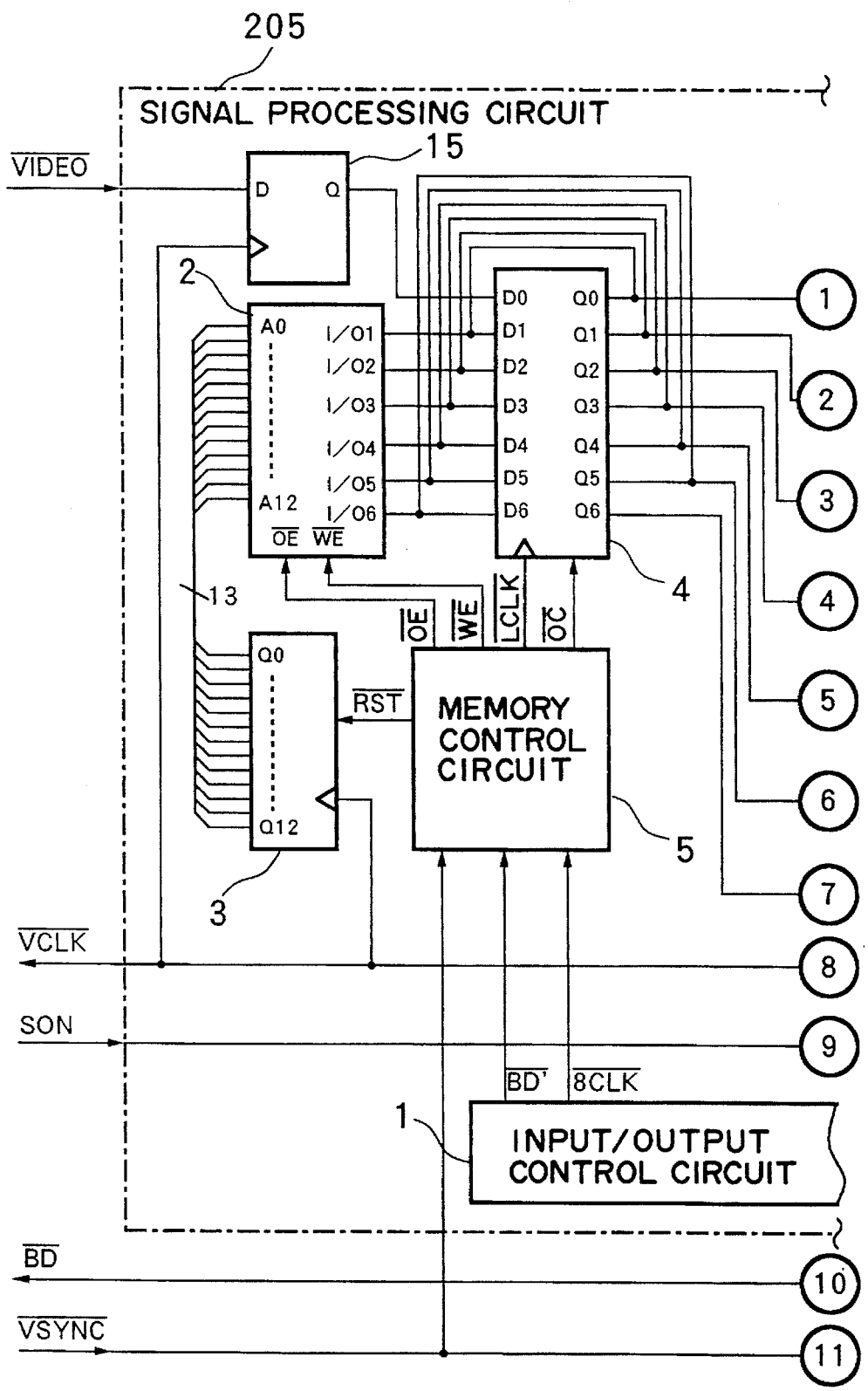
FIGS. 20 and 21 are block diagrams showing a signal processing circuit in FIG. 19.
Figure 21:
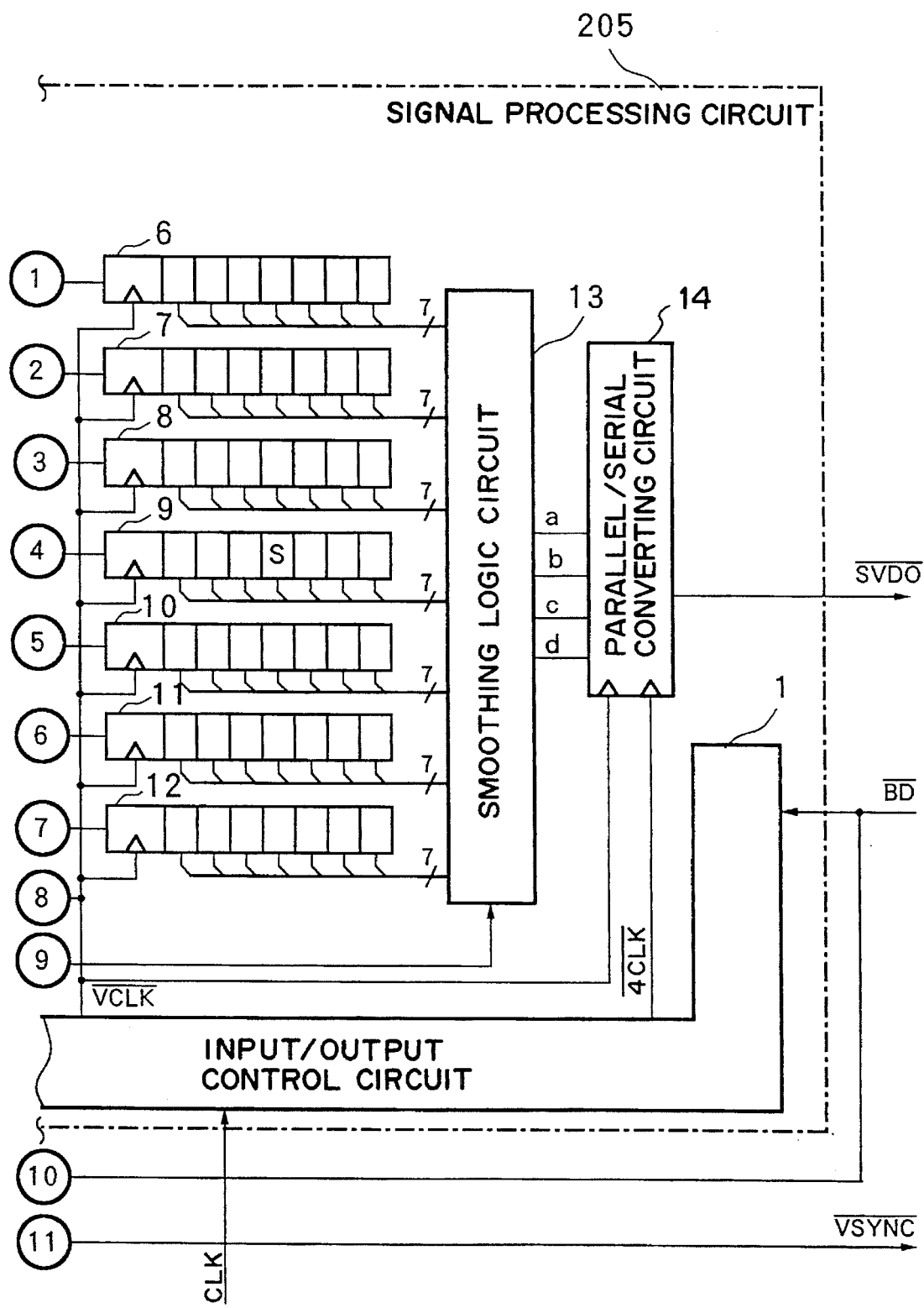
Figure 22:
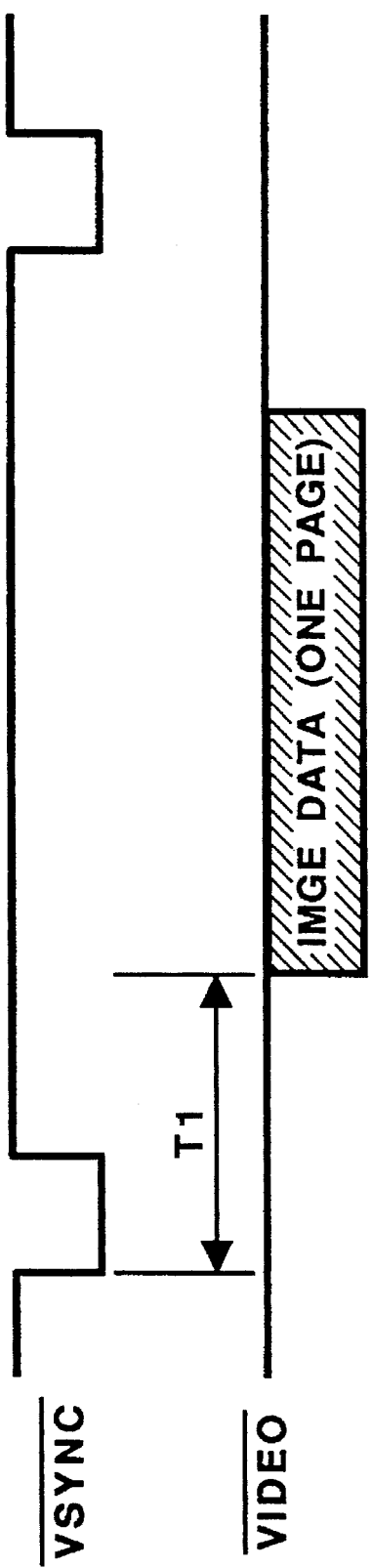
FIG. 22 is a timing chart indicative of one page of image recording in the subordinate scanning direction.
Figure 23:
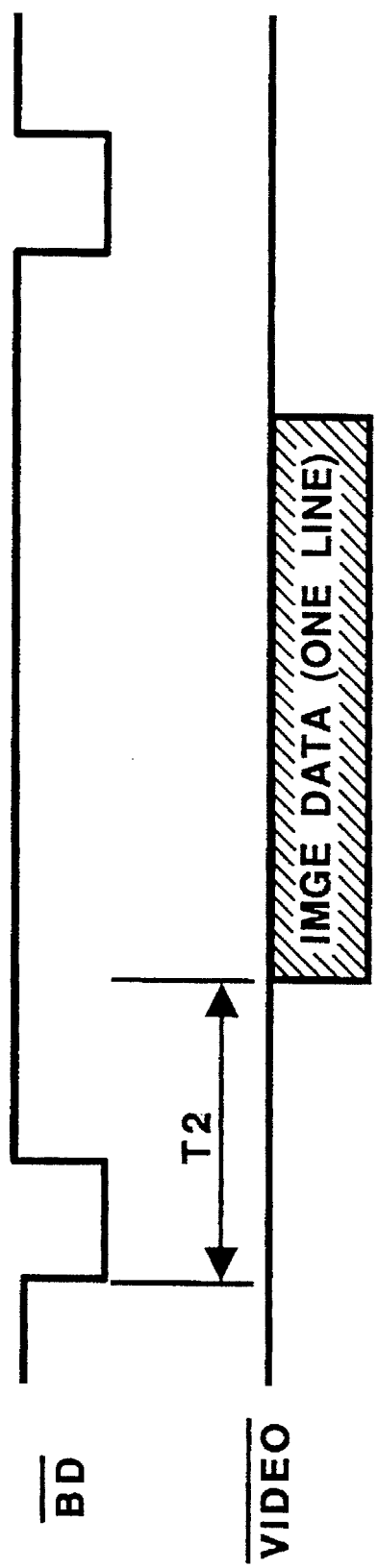
FIG. 23 is a timing chart indicative of one line of image recording in the main scanning direction.
Figure 24:
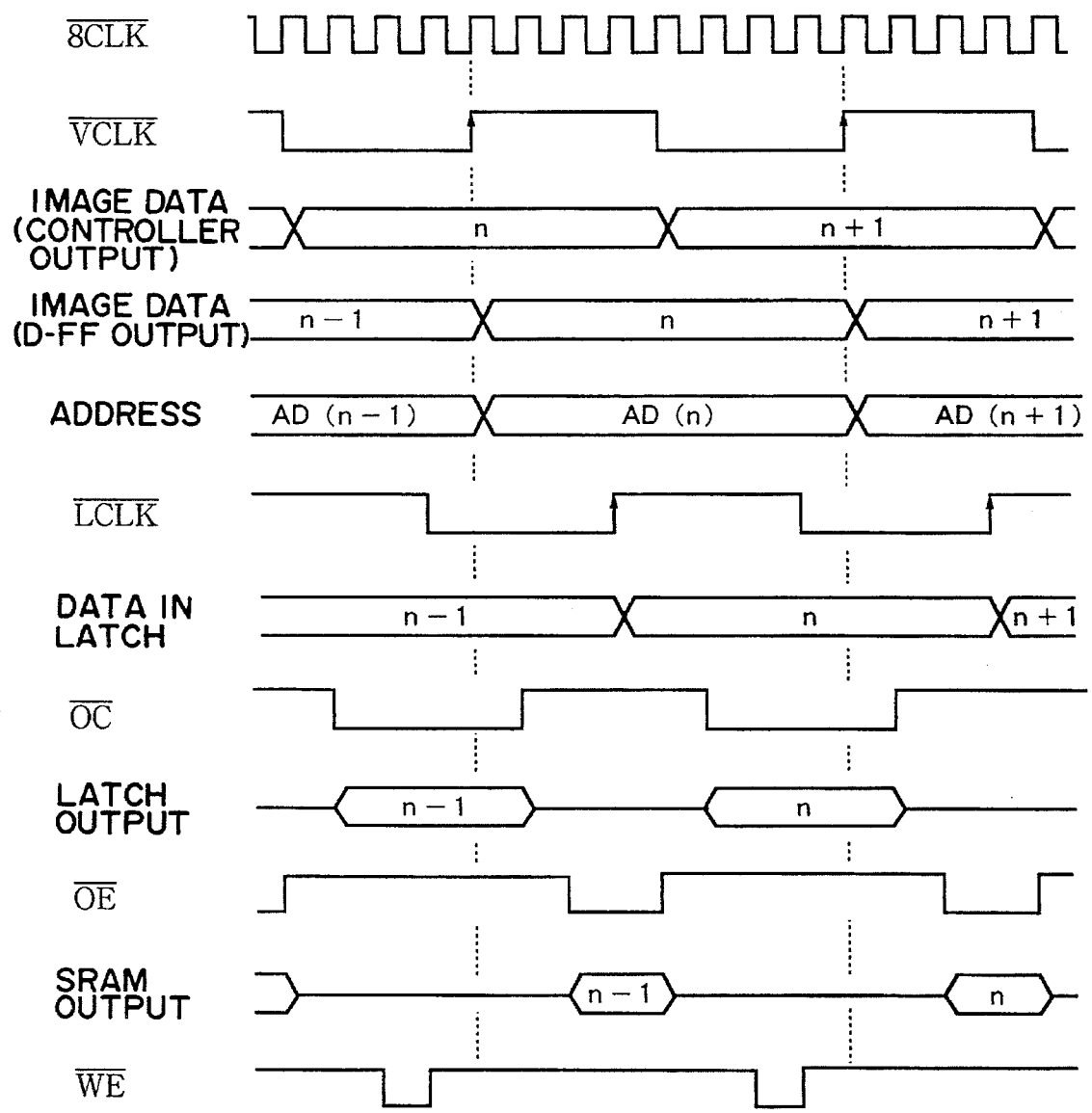
FIG. 24 is a timing chart for describing the operation of a memory control circuit in FIG. 20.
Figure 25:
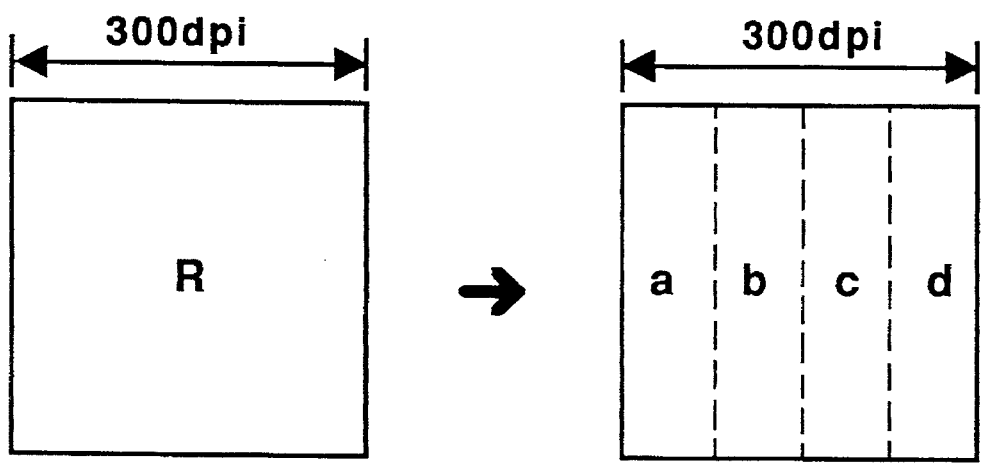
FIG. 25 is a diagram showing a principle according to which a 300 dpi pixel is split into four parts in the third embodiment.

FIGS. 20 and 21 are block diagrams showing the construction of the signal processing circuit 205 according to the third embodiment, FIGS. 22 and 23 are timing charts showing the relationship between the synchronizing signals and image data, FIG. 24 is a timing chart for describing the operation of a memory control circuit according to the third embodiment, and FIGS. 25 and 26 are diagrams for comparing and describing data before and after a conversion of printing density.

In FIGS. 20 and 21, numeral 1 denotes an input/output control circuit for controlling each of the input and output signals, 2 a static RAM (hereinafter referred to as an "SRAM") having a memory capacity of 8 K words×8 bits, 3 an address counter for generating addresses of the SRAM 2, 4 a latch having three-state output, and 5 a memory control circuit for controlling the SRAM 2, the address counter 3 and the latch 4. Further, numerals 6 through 12 denote shift registers, 13 a smoothing logic circuit, 14 a parallel-to-serial converting circuit and 15 a D-type flip-flop (hereinafter referred to as a D.FF).

The operation of this arrangement will now be described.

As described above in connection with the prior art, the printer controller 201 starts transmitting one page of the VIDEO signal upon elapse of a prescribed time T1 from the VSYNC signal in the subordinate scanning direction. The VIDEO signal is indicative of "white" data except for the period of time during which it is outputted. The relationship between the VSYNC signal and the VIDEO signal is illustrated in FIG. 22. Meanwhile, in the main scanning direction, the transmission of one main-scanning line of image data is started upon elapse of a prescribed time T2 from the horizontal synchronizing signal BD. The printer controller outputs image data in synchronization with the trailing edge of the image clock signal VCLK. In the signal processing circuit 205, the above-mentioned image data is latched in the D.FF 15 at the trailing edge of VCLK. The latched image data is then latched in the latch 4 by a signal LCLK, which is obtained by delaying VCLK by ⅜ of a period. The latch output Q0 is applied to the input/output pin I/O1 of SRAM 2 so as to be written at a prescribed address. The written image data is read out at a timing ahead of the writing of the image data at the next period of the VCLK signal, and the read image data is applied to input terminal D1 of the latch 4. Thus, the reading of image data and the writing of the next item of image data is carried out at the same address of the SRAM 2 within one period of the VCLK signal. The timing of this operation is shown in FIG. 24. When one main-scanning line ends, the address counter 3 is reset by a reset signal (hereinafter referred to as a "RST" signal") (produced at the beginning portion of the BD signal of the next main scanning line). After the resetting operation, a similar operation is carried out immediately with regard to the next line of data. Accordingly, data indicative of white data is written in the SRAM 3 also during the time period T2 in FIG. 23, which is the period of time during which there is no output of image data. In other words, data from the moment the address counter 3 is released from the reset state is handled as image data (the data in the above-mentioned period of time is invalid, i.e., "white"). By repeating the foregoing operation, seven pixels of data having the same positions in the main scanning direction and being arrayed successively in the subordinate scanning direction are outputted simultaneously at the outputs Q0 –Q6 of the latch 4. In the above-described operation, white data is written in all addresses of the SRAM 2, thereby initializing the SRAM, in the time period T1 (FIG. 2), which is the period during which there is no output of image data, following the input of the SYNC signal. The foregoing control is carried out by the memory control circuit 5.

Next, the outputs Q0–Q6 of the latch 4, which are indicative of seven continuous main-scanning lines of image data, are supplied to the shift registers 6–12, respectively. These shift registers are shifted sequentially by the leading edge of the image clock VCLK, so that seven shifted outputs from respective shift registers, for a total of 49 items of data, enter the smoothing logic circuit 13.

Figures 26A, 26B:
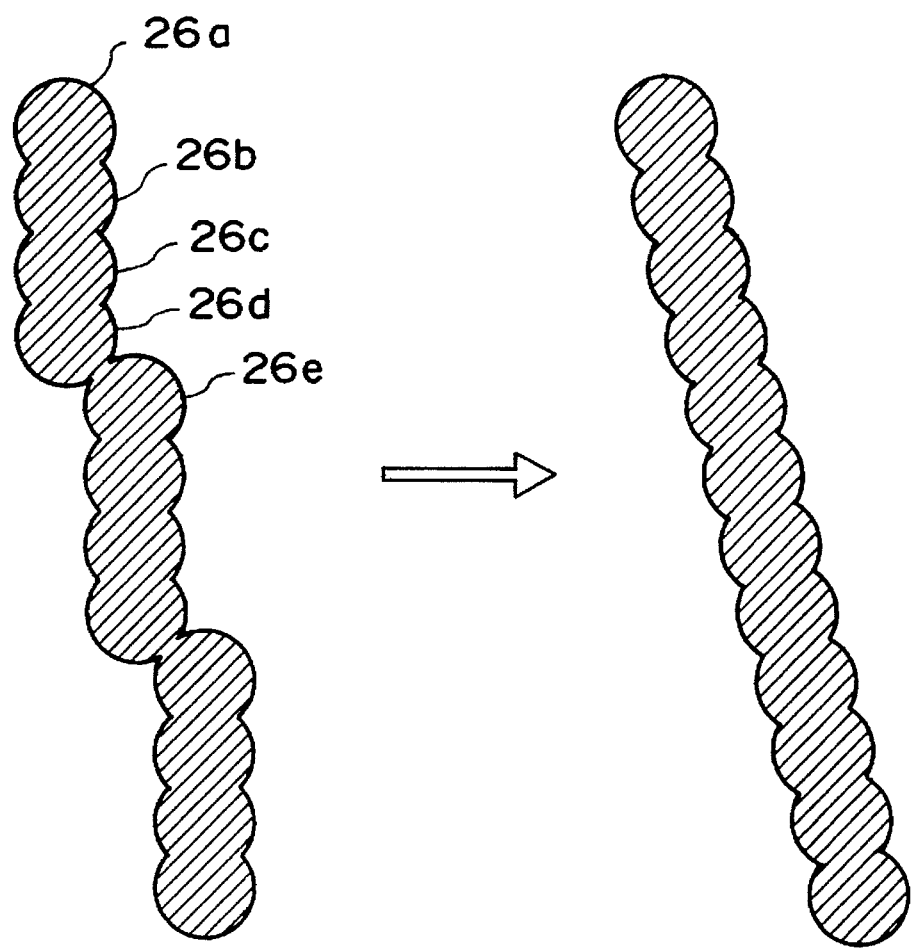
FIGS. 26A and 26B are diagrams respectively illustrating an image of a diagonal line before smoothing processing and after smoothing processing in the third embodiment.

In the smoothing logic circuit 13, reference is made to image data of seven pixels in the main scanning direction and seven pixels in the subordinate scanning direction surrounding a pixel of interest R, a conversion is made to four items of data a, b, c, d, which are obtained by splitting the pixel of interest into the equivalent of 1200 dpi in the main scanning direction in accordance with a prescribed algorithm, and the result is outputted as parallel data (see FIG. 25). The four items of data a, b, c, d are converted into serial data by the parallel-to-serial converting circuit 14. The converted items of data a, b, c, d are outputted to the printer engine as a smoothed image signal SVDO in accordance with clock signal 4CLK, the frequency of which is four times that of the image clock VCLK. The algorithm within the smoothing logic circuit 13 is not described in detail. However, in case of, say, 300 dpi image data from the printer controller, it is possible for a diagonal line printed at shown in FIG. 26(A) to be smoothed and printed as shown in FIG. 26(B).

By way of example, assume that the pixel at the center of the 7×7-pixel block is the pixel of interest. The pixel of interest is black, the black pixels contiguous to the pixel of interest are two in number, and the connection relationship among black pixels neighboring these black pixels is examined. If it is finally found that two end points of a line segment within the 7×7-pixel block exist, then it can be determined whether the pixel of interest lies on a straight line or on a curve. If it is clarified that pixels are arrayed along a straight line connecting the two end points, then it can be determined that the pixel of interest lies on a straight line.

When it has been determined that the position of the pixel of interest is on a straight line, the following processing is executed: If there are at least three black pixels contiguous in the direction of a neighboring pixel contiguous to the pixel of interest, then the pixel of interest is left as is. In other words, the partial pixels a, b, c, d corresponding to the pixel of interest are all turned on. In terms of FIG. 26(A), the pixel 26a is left as is.

If two black pixels but not three black pixels are contiguous in the direction of a neighboring pixel contiguous to the pixel of interest and, moreover, the third pixel is offset by one dot, then three of the partial pixels a, b, c, d of the pixel of interest are turned on from the left or right and the remaining partial pixel is turned off. In FIG. 26(A), the pixel 26b meets this requirement. In other words, the pixels 26c and 26d are contiguous to the pixel 26b in the same direction and the third pixel 26e is offset to the right by one dot. In this case, in order to shift the pixel of interest 26b to the right by ¼ pixel, the partial pixels b, c, d are turned on and the remaining partial pixel a is turned off. It should be noted, however, that the partial pixels a, b, c, d corresponding to the white pixel neighboring the pixel of interest 26b on its right side are corrected based upon the amount of shift of the pixel of interest. That is, in this case the partial pixel a corresponding to the white pixel neighboring the pixel of interest 26b its right side is turned on and the remaining partial pixels b, c, d are turned off.

Similarly, in the case of pixel 26c, this pixel is shifted to the right by 2/4 pixel, and the pixel 26d is shifted to the right by ¾ pixel. Based upon these amounts of shift, the white pixels neighboring the pixels 26c, 26d their right side also are corrected.

The above-described operation is for a case where the signal SON from the printer controller designating whether smoothing is to be turned on or off is valid ("H"). If the SON signal is invalid ("L"), then the data indicative of the print pixel R is outputted as is. In other words, if the data indicative of the print pixel R is "black" then "black" data is outputted along with a, b, c and d. If the data indicative of the print pixel R is "white", then "white" data is outputted along with a, b, c and d. Accordingly, the results of printing in this case are the same as in a case where printing is performed by the VIDEO signal from the printer controller. The printer controller controls the SON signal in this manner. As a result, whether smoothing processing is turned on or off can be designated based upon user preference.

By constructing the above-described signal processing circuit as a signal processing IC in the form of a single chip, with portions other than the SRAM being put into the form of a gate array, and by slightly modifying the data output portion of the conventional printer controller board and adding on the above-mentioned signal processing IC along with an SRAM, a laser-beam printer can be provided in which a high-quality image is obtained at low cost. In order to make more efficient use of space, an arrangement is conceivable in which the signal processing circuit, inclusive of the SRAM, is constructed as a single chip. In such case, an advantage is that the number of input/output pins can be greatly reduced. Furthermore, it goes without saying that the signal processing circuit may be mounted on the printer engine side.

In the foregoing embodiment, the area referred to at the time of the data conversion is seven pixels in the main scanning direction by seven pixels in the subordinate scanning direction. However, this does not impose a limitation upon the invention, for an even higher quality smoothing effect can be obtained if the area referred to is nine pixels in the main scanning direction by nine pixels in the subordinate scanning direction. Furthermore, though a case is described in which 300 dpi image data is converted to 1200 dpi data in the main scanning direction, this also does not impose a limitation upon the invention. For example, it is possible to make a conversion to data having a density of 2400 dpi in the main scanning direction. This could be achieved by making the parallel/serial converting circuit 14 an eight-bit circuit and using a clock whose frequency is eight times that of VCLK as the output clock.

In accordance with the third embodiment, as described above, recording is carried out upon making a conversion to data in which the printing density is increased four-fold in the main scanning direction of print data indicative of recording pixels. This makes it possible to obtain a high-quality image output at low cost.

Next, a fourth embodiment of the invention will be described.

In the third embodiment set forth above, the transmission of image data from the printer controller 100 is performed based upon the VCLK signal produced by the signal processing circuit 205. In general, a transfer clock of image data synchronized to the BD signal is produced within the conventional printer controller. Furthermore, the synchronizing clock generating circuit and the other control circuit are located within a gate array, and signals, such as clock signals, that are not outputted to the exterior of the gate array are numerous. By contrast, in the fourth embodiment, a case is illustrated in which use is made of a signal processing circuit capable of accommodating also the printer controller.

Figure 27:
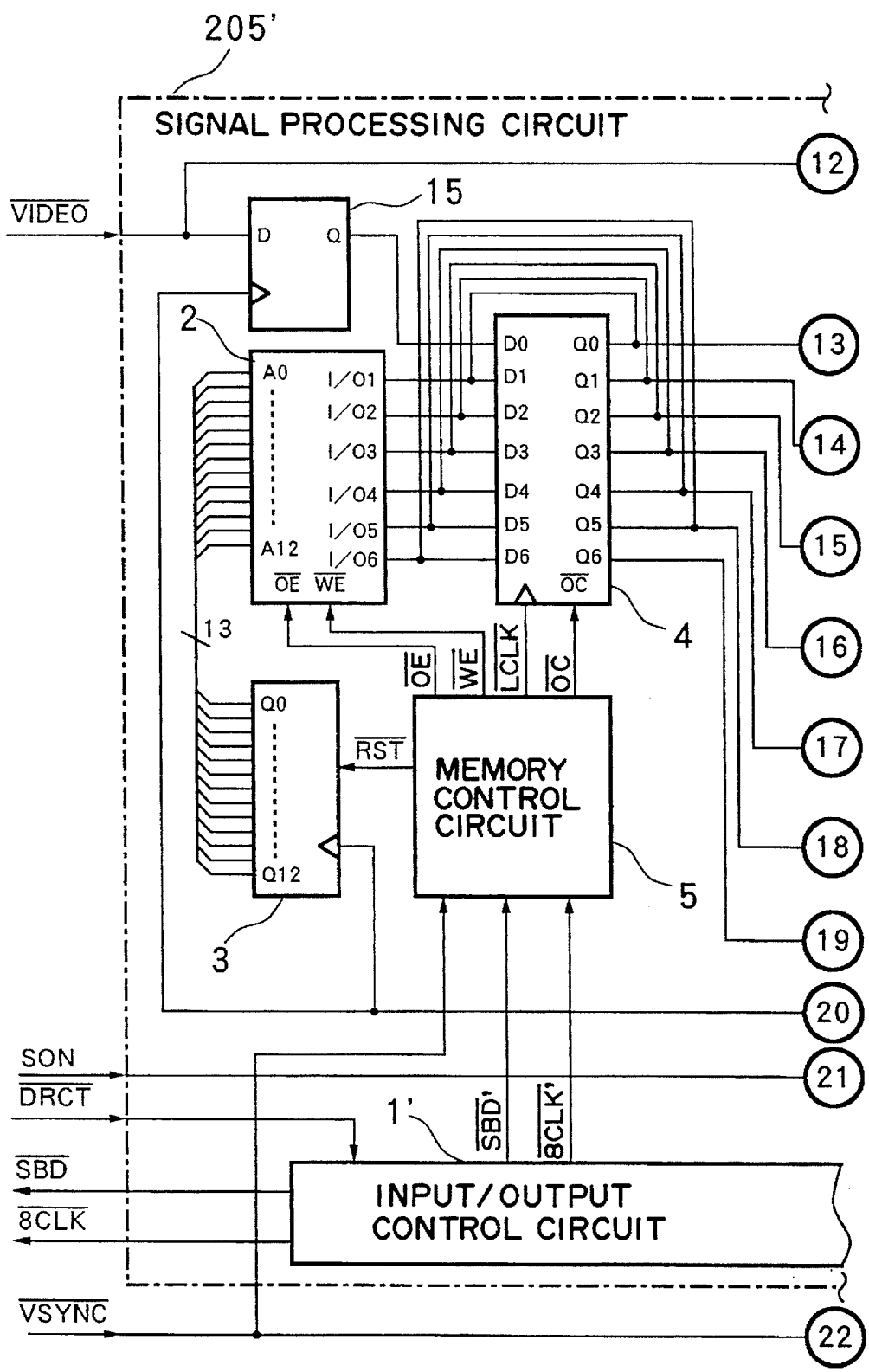
FIGS. 27 and 28 are block diagrams showing a signal processing circuit according to a fourth embodiment.
Figure 28:
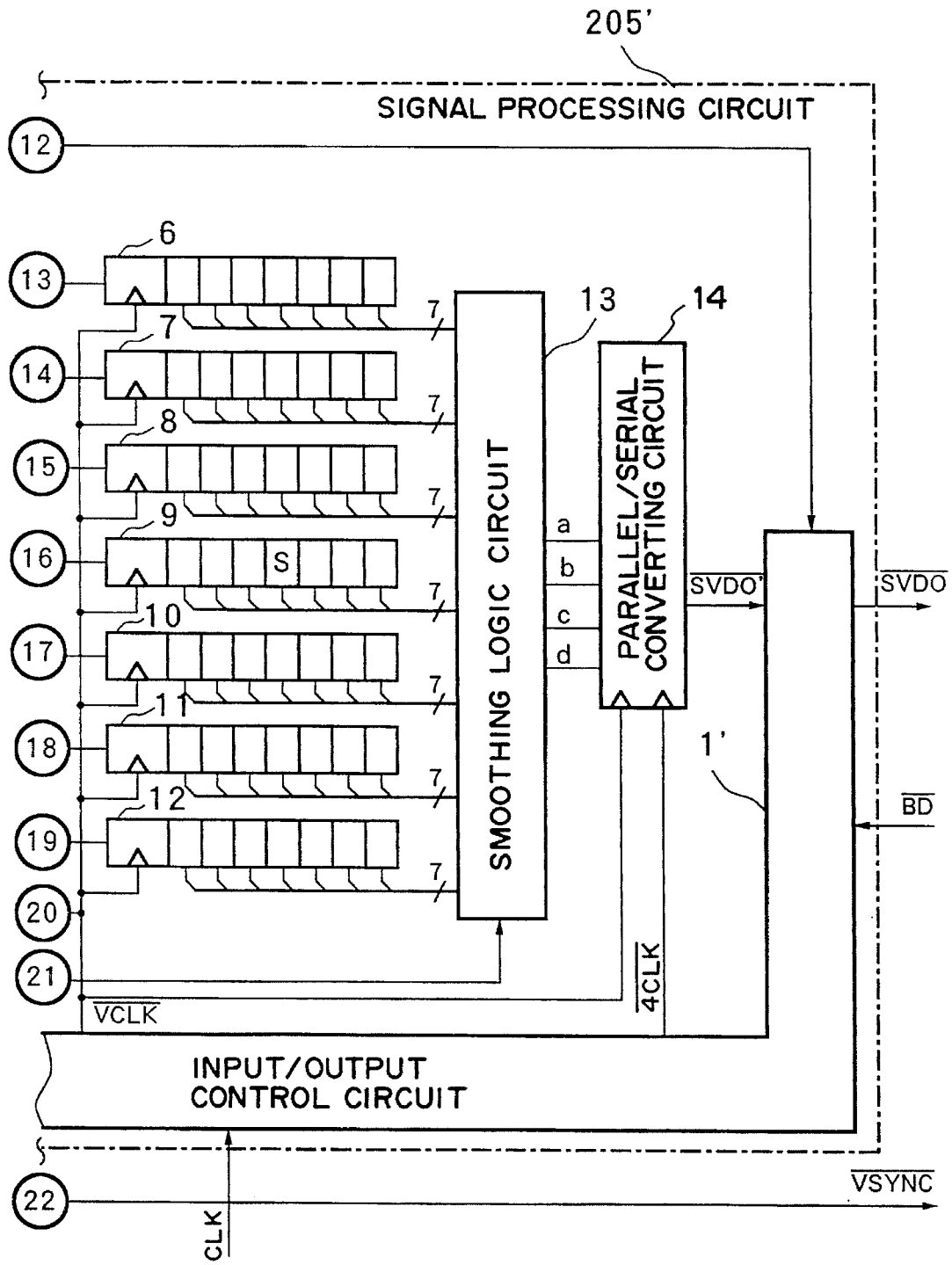

FIGS. 27 and 28 are block diagrams illustrating an example of the construction of a signal processing circuit according to the fourth embodiment. Circuit portions in FIGS. 27 and 28 similar in construction and function to those of the third embodiment are designated by reference characters the same those in FIGS. 20 and 21 and need not be described again. Portions different from those of the third embodiment have apostrophe marks attached to the numerals of the circuits corresponding to FIGS. 20 and 21. A major difference between this embodiment and the third embodiment is the control of the input/output signals by input/output control circuit 1'.

Signals that differ from those of the third embodiment will now be described.

Figure 29:
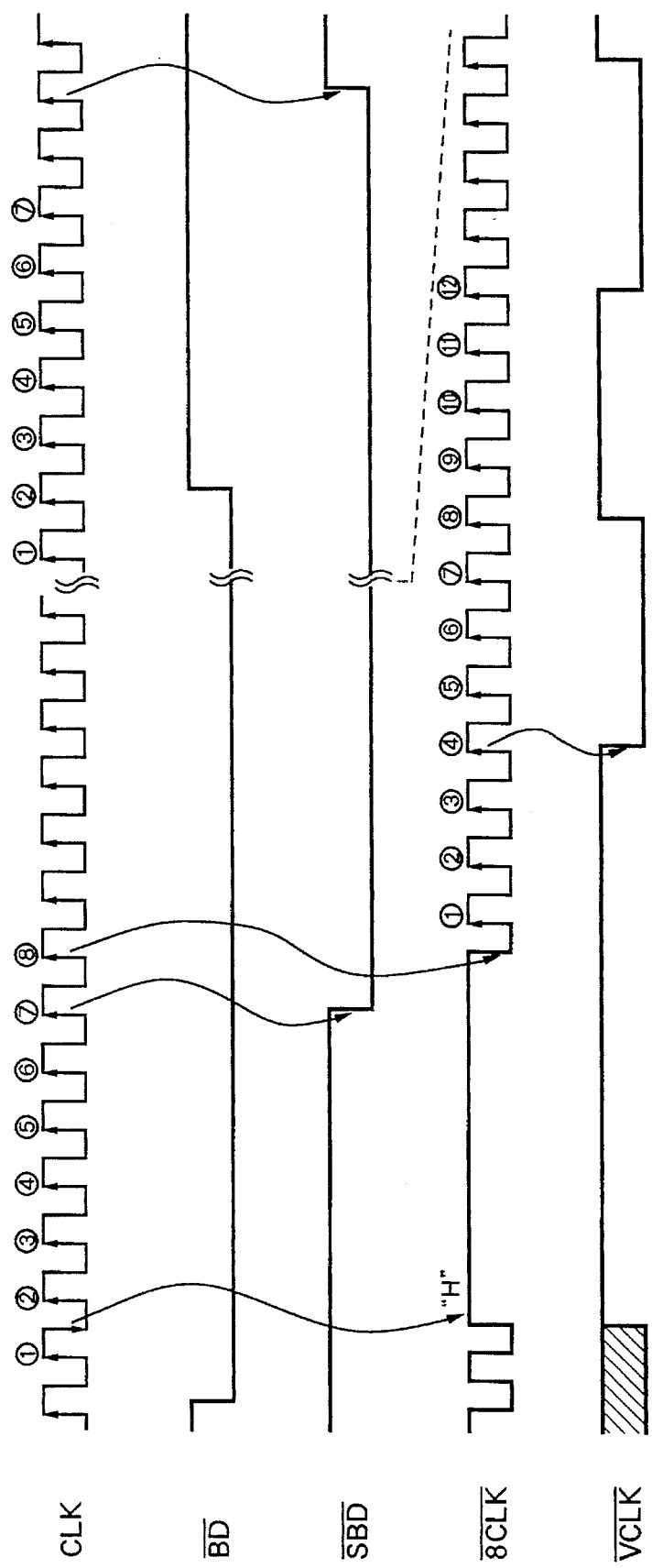
FIG. 29 is a timing chart for describing the operation of an input/output control circuit in FIGS. 28 and 29.
Figure 30:
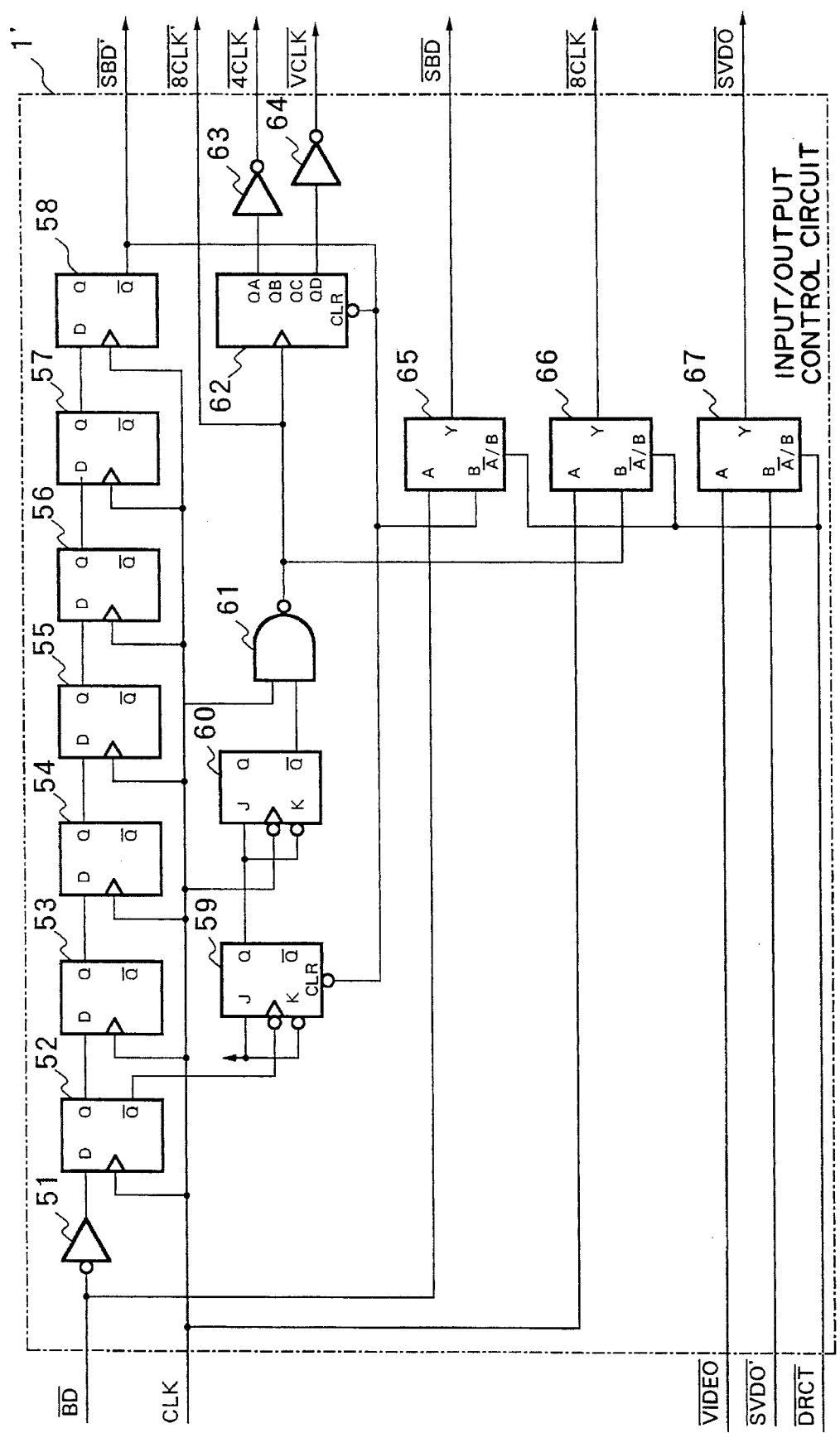
FIG. 30 is a block diagram of an input/output control circuit in the fourth embodiment.

FIG. 29 is a timing chart for describing operation based upon the signals of the fourth embodiment, and FIG. 30 is a circuit diagram illustrating the construction of the input/output control circuit of this embodiment. Shown in FIG. 30 are NOT circuits 51, 63, 64, D-FFs 52–58, J-K.FFs 59, 60, a NAND circuit 61, a four-bit counter 62, and selector circuits 65–67. The construction of portions not directly related to the description of the foregoing operation are omitted.

First, an SBD signal is sent as a horizontal synchronizing signal from the signal processing circuit 205' to the printer controller 100. The SBD signal is the result of delaying the BD signal from the printer engine 200 by a period of time corresponding to one period of the VCLK signal. Further, a signal 8CLK, whose frequency is eight times that of the VCLK signal, is sent to the printer controller 100 as a clock signal. After the BD signal has entered from the printer engine 200, the 8CLK signal is quiescent until the SBD signal is outputted. This is so that the transfer clock of the image data synchronized to the SBD signal within the printer controller 100 may be obtained from the initial 8CLK by frequency division by eight after the SBD signal has entered. In other words, the synchronizing timing of horizontal scanning can be produced by the input/output control circuit 1'. By similarly obtaining the VCLK signal also in the input/output control circuit 1', the image-data transfer clock and the VCLK signal within the printer controller 100 become clock signals having the same phase. Accordingly, the transfer of image data can be carried out accurately without relying upon the same clock on the sending and receiving sides.

A control signal (hereinafter referred to as a "DRCT signal") inputted to the signal processing circuit 205 from the printer controller 100 will be described next. The DRCT signal is a signal which designates a state equivalent to one in which the signal processing circuit 205 is not present. That is, when the DRCT signal is valid ("L"), the VIDEO signal from the printer controller 100 is outputted on the SVDO signal line as is, the BD signal from the printer engine 200 is outputted on the SBD signal line as is, and the CLK signal from the oscillating circuit 206 is outputted on the 8CLK signal line as is. This mode is useful in the following case, by way of example: In response to the VIDEO signal, a data conversion is performed by the signal processing circuit 205 and the result is sent to the printer engine 200 as the SVDO signal. As a result, in comparison with a case where the signal processing circuit 205' is absent, an image-data time delay of three lines in the subordinate scanning direction and seven dots in the main scanning direction occurs owing to data reference. Accordingly, if printing is performed as is by the control system of the conventional printer engine 200 and printer controller 100, the image will be shifted three dots downward and seven dots rightward from the normal printing position. This problem can be solved if the value of T1 in FIG. 22 is shortened by three lines and the value of T2 in FIG. 23 is shorted by seven dots on the side of the printer controller 100. However, in a case where the abovementioned change cannot readily be made in the printer controller 100 and more importance is given to accuracy of the printing position than to smoothness of the image, it will suffice to make the DRCT signal valid "L").

Other operations in the signal processing circuit 205 are performed in the same manner as set forth in the third embodiment. In FIGS. 27 and 28, SVDO', SBD' and 8CLK' are signals that are independent of the DRCT signal.

In the fourth embodiment, as described above, modifications on the side of the printer controller are fewer. This makes it possible to reduce cost and to shorten development time.

Described next will be a fifth embodiment of the present invention.

Figure 31:
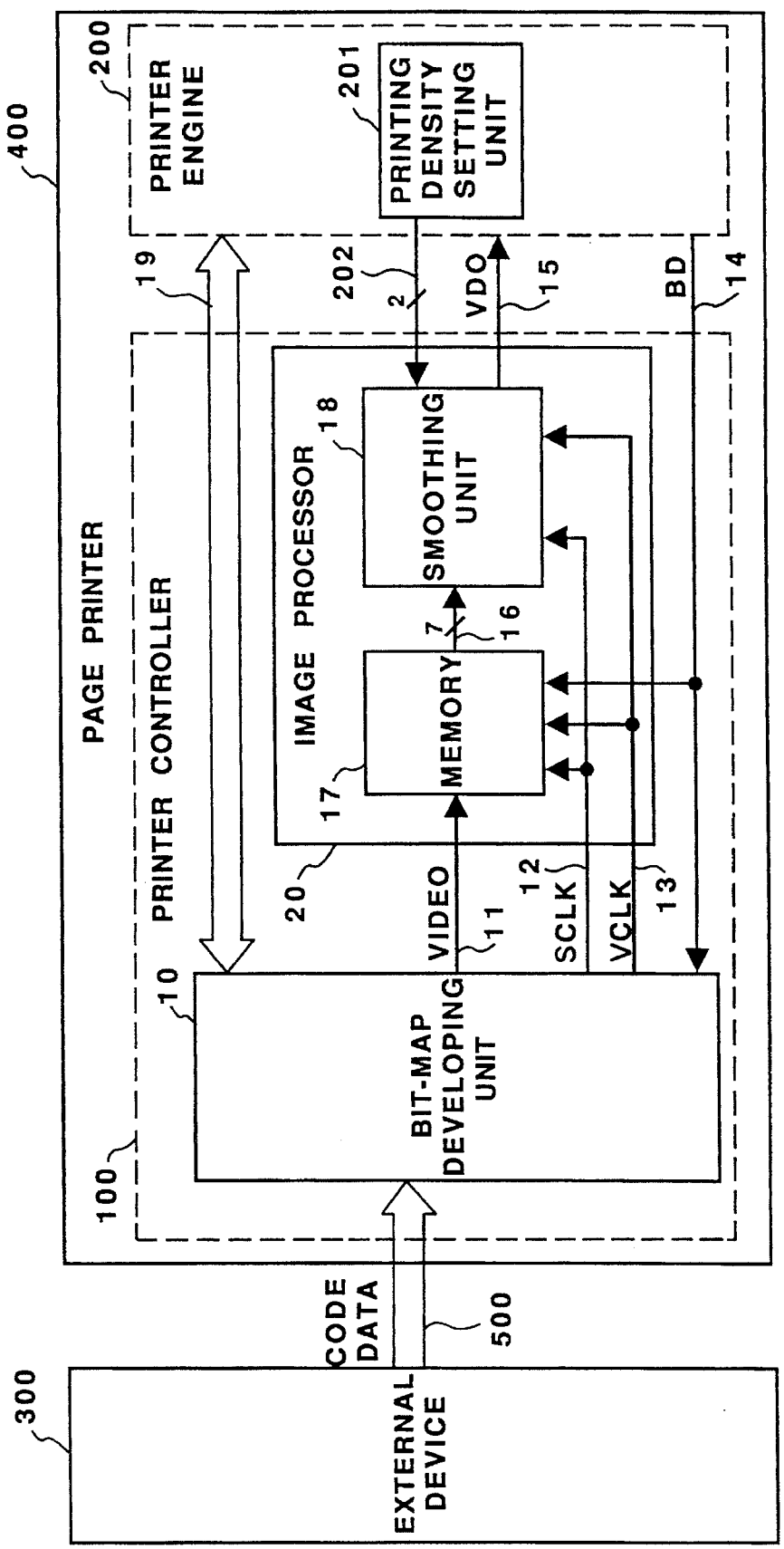
FIG. 31 is a block diagram of a laser-beam printer according to the fifth embodiment.

FIG. 31 is a block diagram illustrating a fourth embodiment to which the image processing apparatus of the invention is applied. The circuit arrangement is almost the same as that of the first embodiment. This embodiment differs from the first embodiment in that the printer engine 200 is provided with a printing density setting unit 201 set by the user. Units having functions the same as those set forth above are not described again.

In the fifth embodiment also, the image processor 20 received VIDEO 11 sent from the bit-map developing unit 10, seven main scanning lines are stored, this is developed in window form into seven dots in the main scanning direction, smoothing processing is executed and the results are sent to the printer engine 200.

Figure 32:
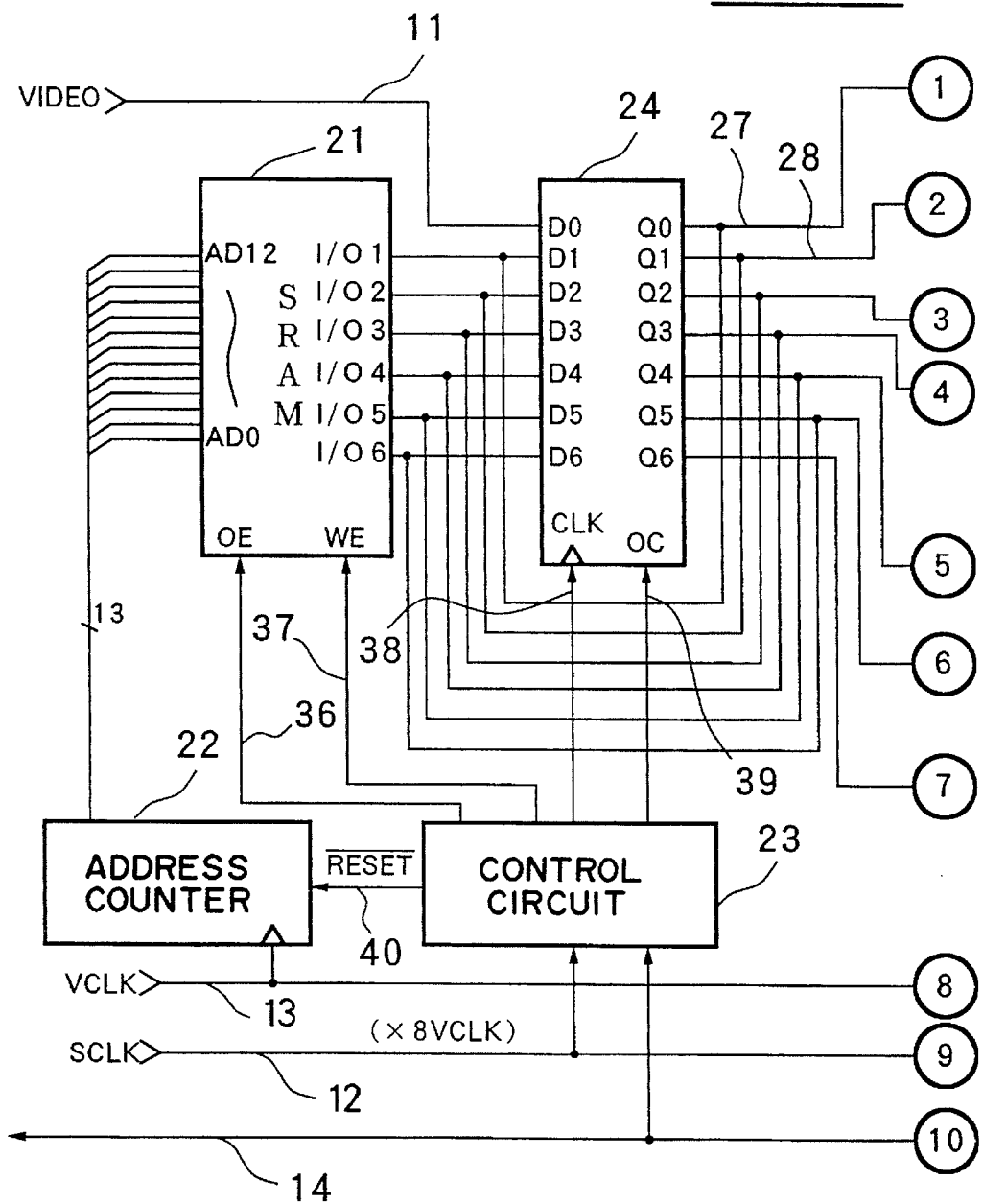
FIGS. 32 and 33 are block diagrams illustrating an image processor according to the fifth embodiment.
Figure 33:
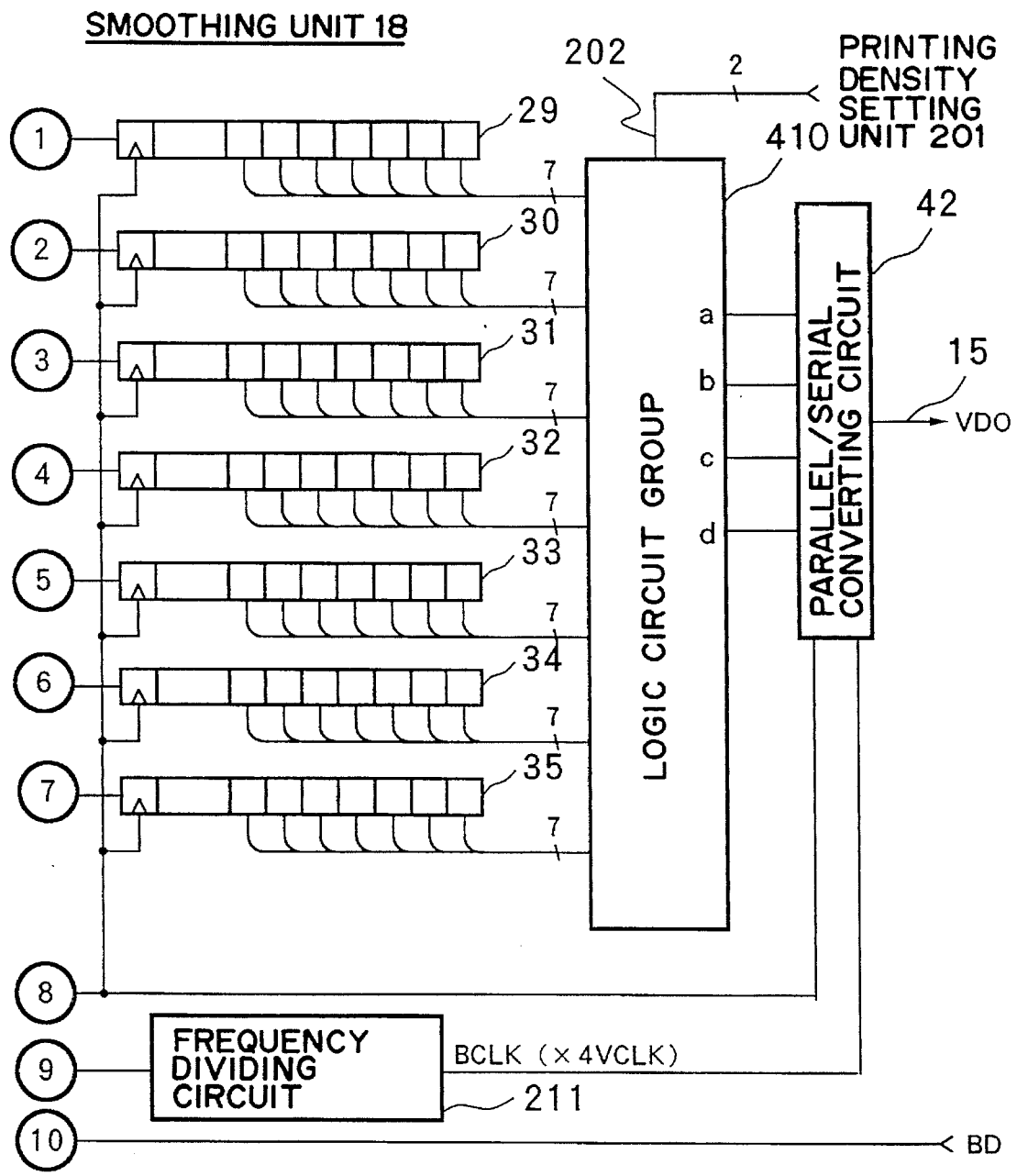

FIGS. 32 and 33 are block diagrams illustrating the construction of the image processor 20 according to the fifth embodiment. As shown in FIGS. 32 and 33, the image processor 20 includes the static RAM (hereinafter referred to as an "SRAM") 21, the address counter 22, the control circuit 23, the three-state latch buffer 24, a logic circuit group 410, a parallel-serial converting circuit 42 and a frequency dividing circuit 211. A clock signal VCLK 12 corresponding to 300 dpi from the bit-map development unit 10, a clock signal SCLK 13 having the same phase as VCLK 12 and eight times the frequency, and VIDEO 11 synchronized to VCLK 12 are sent to the image processor 20. The signal VIDEO 11 is connected to one input terminal (D0) of the three-state latch buffer 24. The output Q0 (which corresponds to D0) of the three-state latch buffer 24 is delivered to the input terminal of the shift register 29 and to a data pin I/01 of the SRAM 21. The address of the SRAM 21 is connected to 13 address lines from the address counter 22. The address length should be enough to store one line of 300 dpi image data. A read signal 36 and write signal 37 for the SRAM 21, a latch signal 38 and output enable signal 39 for the three-state latch buffer 24, and a clear signal 40 for the address counter 22 are produced by the control circuit 23, the operation of which will be described later.

In FIGS. 32 and 33, the control circuit 23 produces a plurality of states during one period of VCLK 12 in accordance with SCLK 13. Accordingly, SCLK 13 has a frequency eight times that of VCLK 12, and therefore eight steps are capable of being executed during one period of VCLK 13.

The circuitry of the three-state latch buffer 24 in the fifth embodiment is the same as that in the first embodiment. The operation of the peripheral circuitry of the SRAM is the same as that in FIG. 5 of the first embodiment.

The processing performed is the same at that of the first embodiment. Data that has been outputted from the data pin D2 of SRAM 21 in one cycle of the image clock VLCK is written in at D3 of the same address. By sending the data sequentially, seven lines of image data are stored at all times and the image data is supplied to shift registers 29 through 35.

The shift registers 29 through 35 each have a bit length of seven bits and subject the seven lines of image data sent from the three-state latch buffer 24 to a serial-to-parallel conversion. The data is developed seven dots at a time in the main scanning direction and an image composed of a total of 49 dots is sent to the logic circuit group 410. The logic circuits constituting the logic circuit group 410 apply the delivered 49-bit data to a 7×7-dot matrix, as shown in FIG. 6 described in connection with the first embodiment, one of the plurality of logic circuits is selected by of the kind illustrated below, and, in accordance with selected logic, four dots a, b, c, d resulting from processing a pixel of interest D4 are decided.

A method of selecting a logic circuit from among the group 410 of logic circuits will now be described.

FIG. 37 is a diagram for describing the inputs and outputs of the logic circuits in the fifth embodiment.

As shown in FIG. 31, the page printer 400 has a printing density setting unit 201, such as a switch or volume control, so that the user may select a preferred printing density. A logic selecting signal 202 (a two-bit signal) for smoothing outputted by the printing density setting unit 201 is sent to a smoothing unit 18 so that the smoothing logic can be selected depending upon the printing density.

Figure 34:
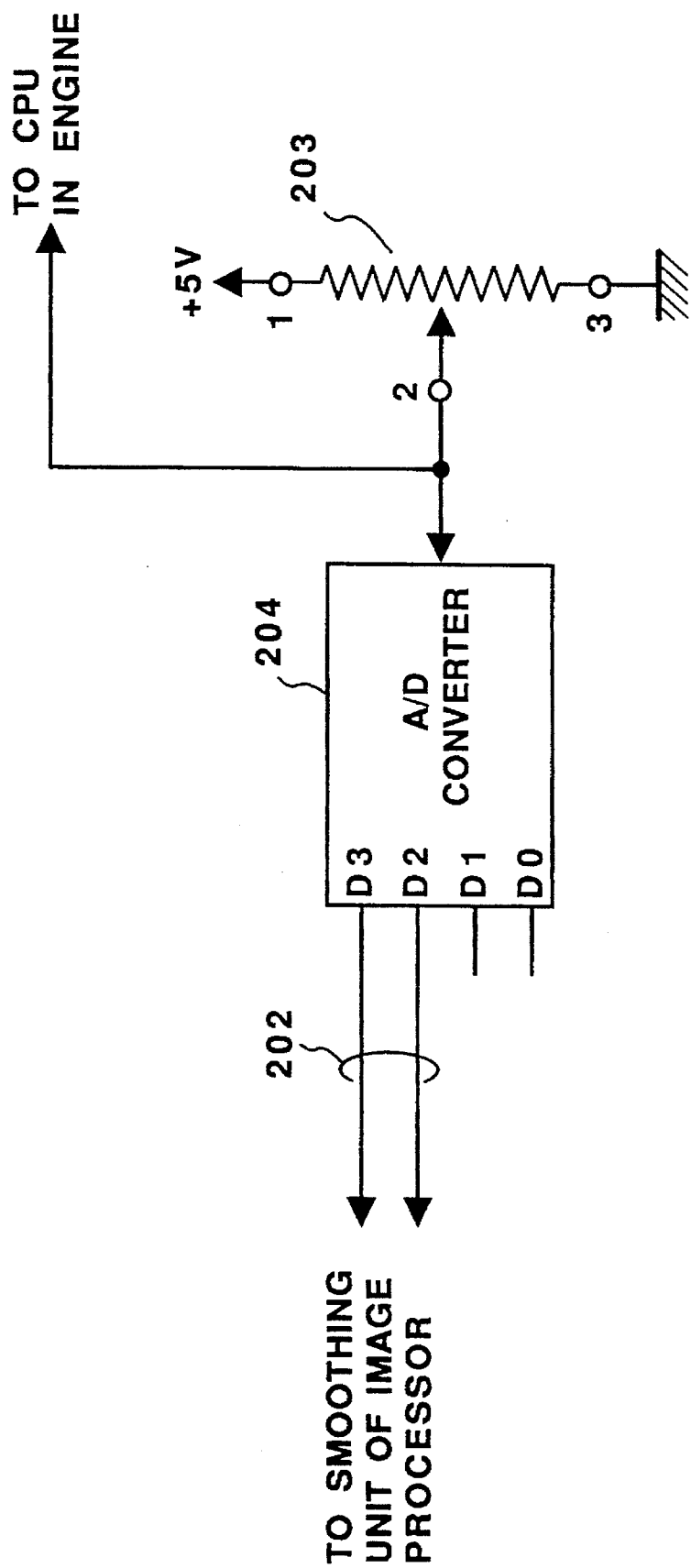
FIG. 34 is a block diagram showing a printing density setting unit according to the fifth embodiment.

FIG. 34 is a block diagram showing an example of the construction of the printing density setting unit 201 according to the fifth embodiment. In FIG. 34, numeral 203 denotes a volume control, and numeral 204 denotes an A/D converter.

When the volume 203 is turned, the voltage produced thereby is varied. The voltage signal is sent to a CPU (not shown) for engine control. This CPU changes the image developing bias, etc., based upon the inputted voltage signal. As a result, it is possible to change the printing density.

Thus, if only printing density is to be controlled, it will suffice to control the developing bias in conformity with the voltage level varied by the volume control 203. However, it has been clarified that if the apparatus of the first embodiment having one circuit for performing smoothing processing is additionally provided with a function for changing printing density by changing only the developing bias, a problem arises. The problem is that if the printing density is set too low, the smoothing effect is difficult to verify. Conversely, if the printing density is set too high, the portions subjected to smoothing processing are emphasized too strongly and the lines of printed characters of the like become too thick.

Accordingly, in the fifth embodiment, the A/D converter 204, which converts the voltage value set by the volume control 203 into digital data, is provided in order that optimum smoothing processing may be executed in conformity with the set printing density. The A/D converter 204 converts the voltage value obtained from the volume control 203 into four-bit digital data. The two higher order bits of the four bits resulting from the conversion are outputted to the smoothing unit 18.

The logic selecting signal 202 outputted by the A/D converter 204 is a signal of the kind shown in FIG. 37.

Figure 35:
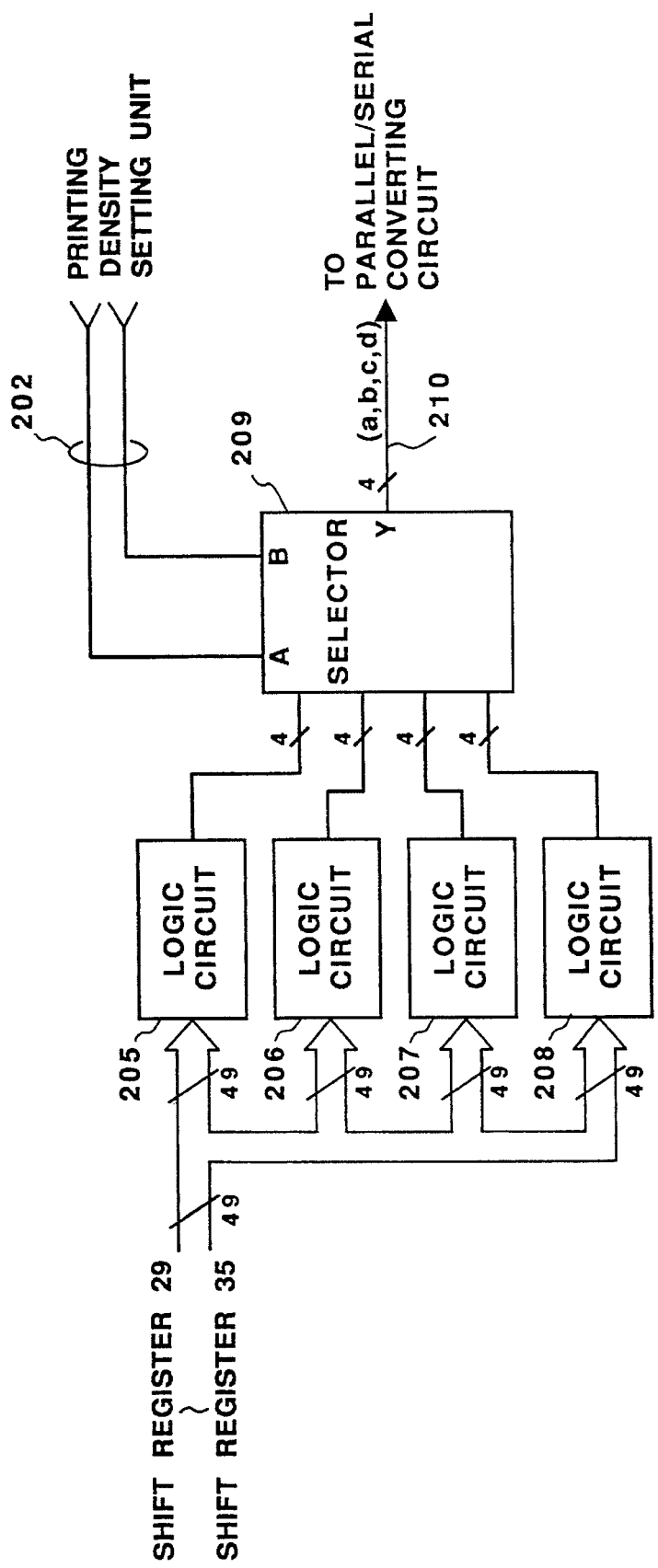
FIG. 35 is a block diagram showing a group of logic circuits in FIG. 33.

FIG. 35 is a block diagram illustrating the construction of the logic circuit group 410 according to the fifth embodiment. Numerals 205 through 208 denote logic circuits, and numeral 209 denotes a selector.

As shown in FIGS. 32 and 33, the logic selecting signal 202 enters the logic circuit group 410 in the smoothing unit 18. As shown in FIG. 35, the logic circuit group 410 comprises the aforementioned four logic circuits 205 through 208 and the selector 209. The 49-bit signals from the shift registers 29~35, namely the items of dot information consisting of seven dots in the main scanning direction and seven lines in the subordinate scanning direction, inclusive of the pixel of interest D4, are supplied to respective ones of the logic circuits 205~208. The circuits 205~208 are logic for deciding different print areas of the pixel of interest. These circuits output, as four-bit signals, printing information of first through fourth subdivisions obtained when the pixel of interest is split into four parts. The selector 209 selects one set of the four sets of signals outputted by the four logic circuits, and the selected set is transmitted to the parallel/serial converting circuit, which is the next stage. In this embodiment, the logic circuit 205, for example, performs smoothing processing suited to a case where the printing density is high, and the logic circuits 206, 207, 208 perform smoothing processing suited to successively lower printing densities. If information for setting a high density from the logic selecting signal 202 has entered the control terminal of the selector 209, the output of the logic circuit 205 is selected. If information for setting a low density from the logic selecting signal 202 has entered the control terminal of the selector 209, the output of the logic circuit 208 is selected.

The four-bit signal (a, b, c, d) outputted from the selected logic circuit enters the parallel/serial converting circuit 42 shown in FIG. 33, which delivers an output as VDO 15 in synchronization with BCLK, which has a frequency four times that of VCLK 12. The printer performs printing by turning the laser beam on and off based upon VDO 15.

Figure 36:
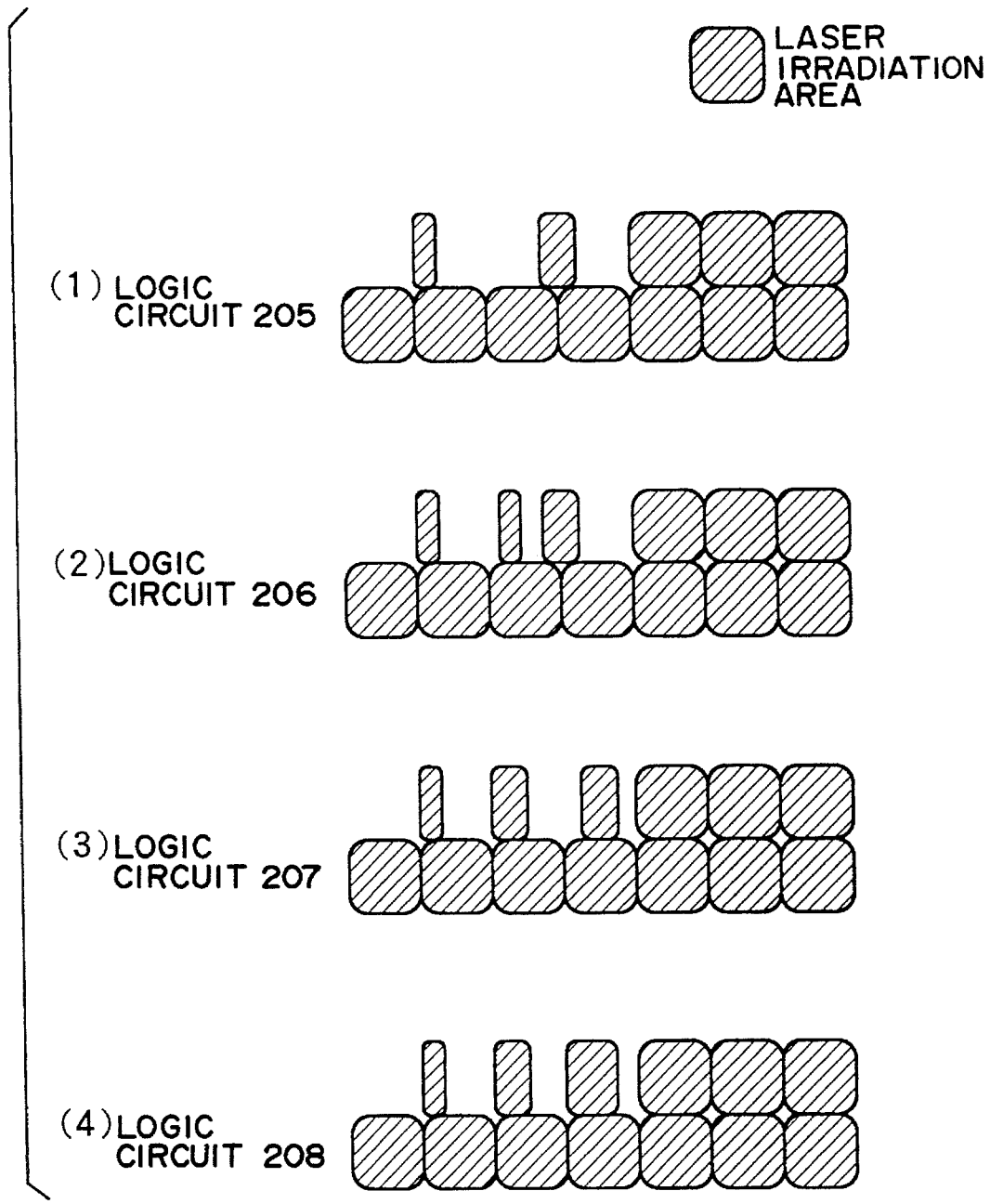
FIG. 36 is a diagram showing the state of laser irradiation by reach of the logic circuits in FIG. 35.

FIG. 36 is a diagram showing the irradiating state of the laser based upon each of the logic circuits of the fifth embodiment. Since the logic circuit 205 is logic for the case where high-density printing is carried out, the area of laser irradiation of auxiliary dots for smoothing is reduced to widen the spacing between dots, as shown in (1) of FIG. 36. Since the logic circuit 208 is logic for preforming low-density printing, the area of laser irradiation of auxiliary dots for smoothing is enlarged to reduce the spacing between dots, as shown in (4) of FIG. 36. By thus changing over smoothing processing depending upon the printing density, the same smoothing effect can be obtained for all densities.

In order to change the essential irradiation area of the laser beam in conformity with the rise and fall in the set density, it will suffice to derive, by processing which differs for each logic circuit, which of the partial pixels should be turned on among the partial pixels a, b, c, d obtained by splitting the pixel of interest into four parts. It should be noted that selecting a logic circuit for a higher density tends to result in a higher number of partial pixels being turned on.

In the fifth embodiment, the logic circuits 205~208 execute the logical expressions (A)~(D), respectively, shown in FIG. 38. In actuality, this is achieved by combining logic gates for realizing the logical operation shown in the same drawing.

Thus, in accordance with the fifth embodiment, as described above, the printing area of a pixel of interest split into four parts in the main scanning direction is decided. In addition, by raising the printing density in the main scanning direction, the jagged contour of a printed character can be smoothed. Moreover, these effects can be obtained even if the printing density is changed.

A sixth embodiment of the invention will now be described.

Figure 39:
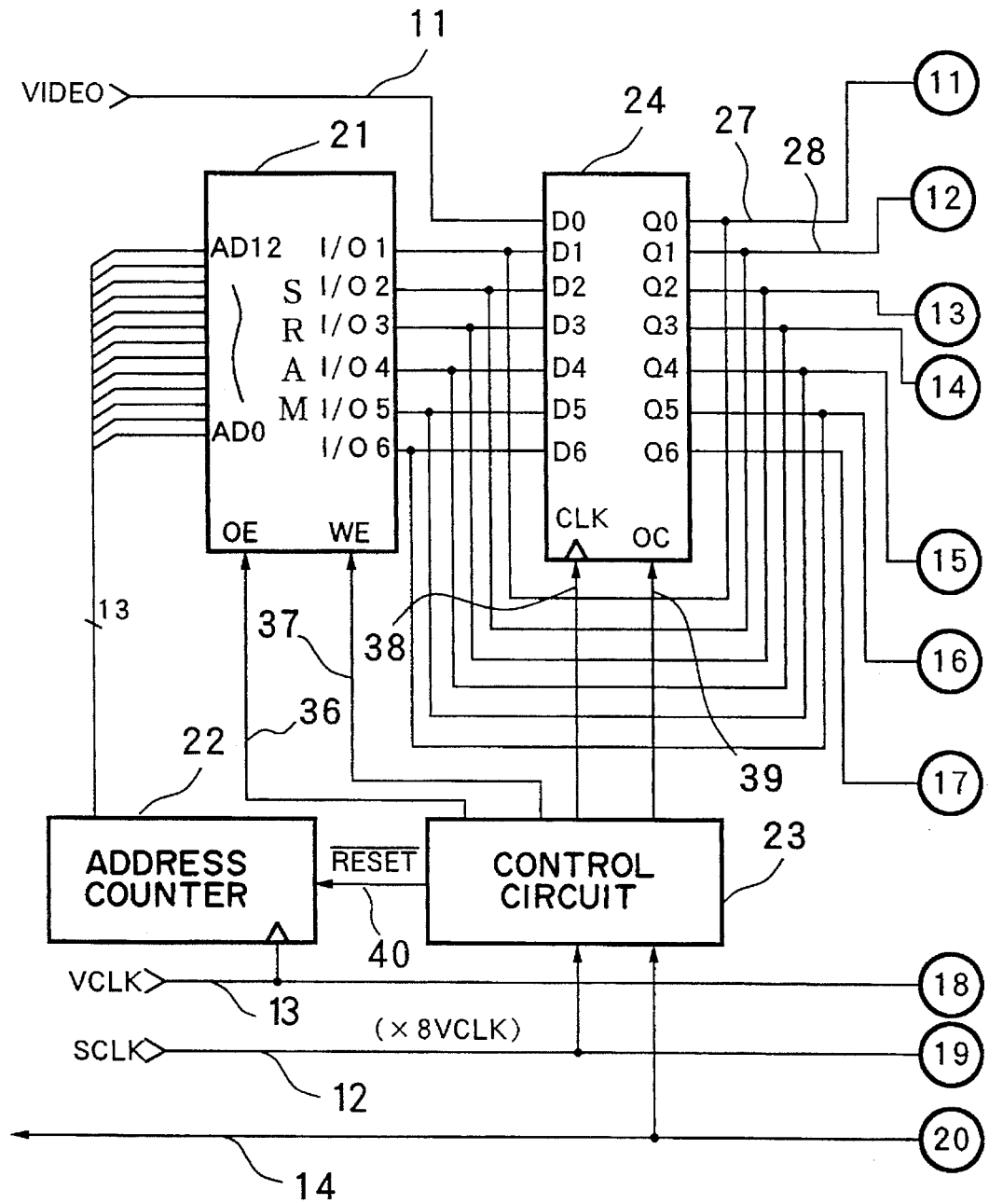
FIGS. 39 and 40 are block diagrams showing an image processor according to the sixth embodiment.
Figure 40:
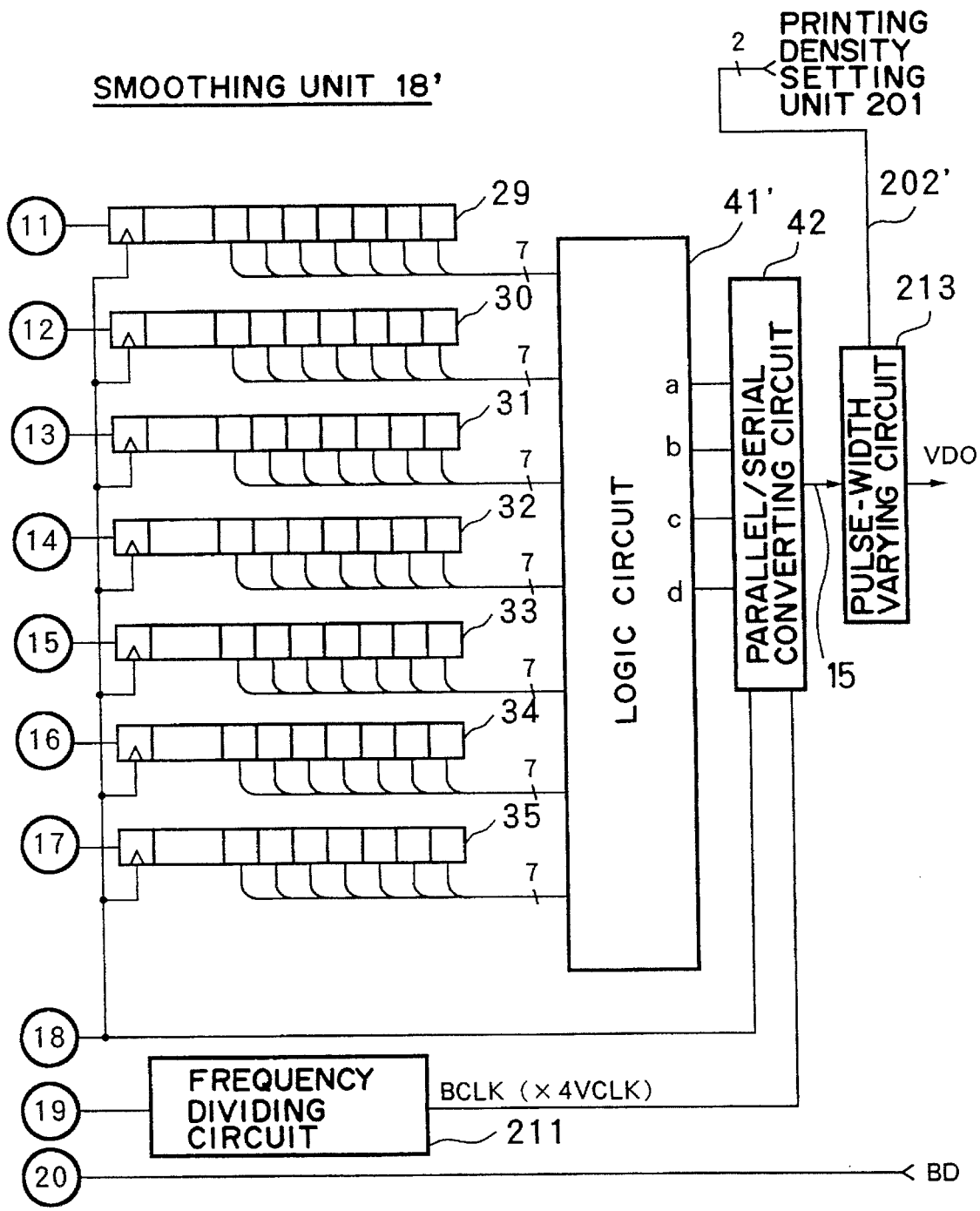

FIGS. 39 and 40 are block diagram illustrating an example of an image processing according to the sixth embodiment. Circuits in FIGS. 39 and 40 whose construction and function are the same as those shown in FIGS. 32 and 33 are designated by like reference characters and need not be described again.

In the fifth embodiment described above, a logic circuit in the logic circuit group 410 is selected in accordance with the logic selecting signal 202 accepted from the printing density setting unit 201. In the sixth embodiment, only one type of logic circuit 41' is used. Furthermore, in order to select printing density, there is provided a pulse-width varying circuit 213 which varies pulse width based upon a printing density setting signal 202' from the printing density setting unit 201.

Thus, there is only one type of logic circuit 41', and the pulse width of the signal converted into serial data by the parallel/serial converting circuit 42 is changed by the pulse-width varying circuit 213. The amount of pulse width varied is decided by the two-bit printing density setting signal 202' outputted from the printing density setting unit 201. The signal 202' is the same as the logic selecting signal 202 from the printing density setting unit 201 described in the fifth embodiment. Since the meaning of the signal is changed by shifting the destination of transmission to the pulse-width varying circuit 213, this signal is designated the printing density setting signal 202'.

Figure 41:
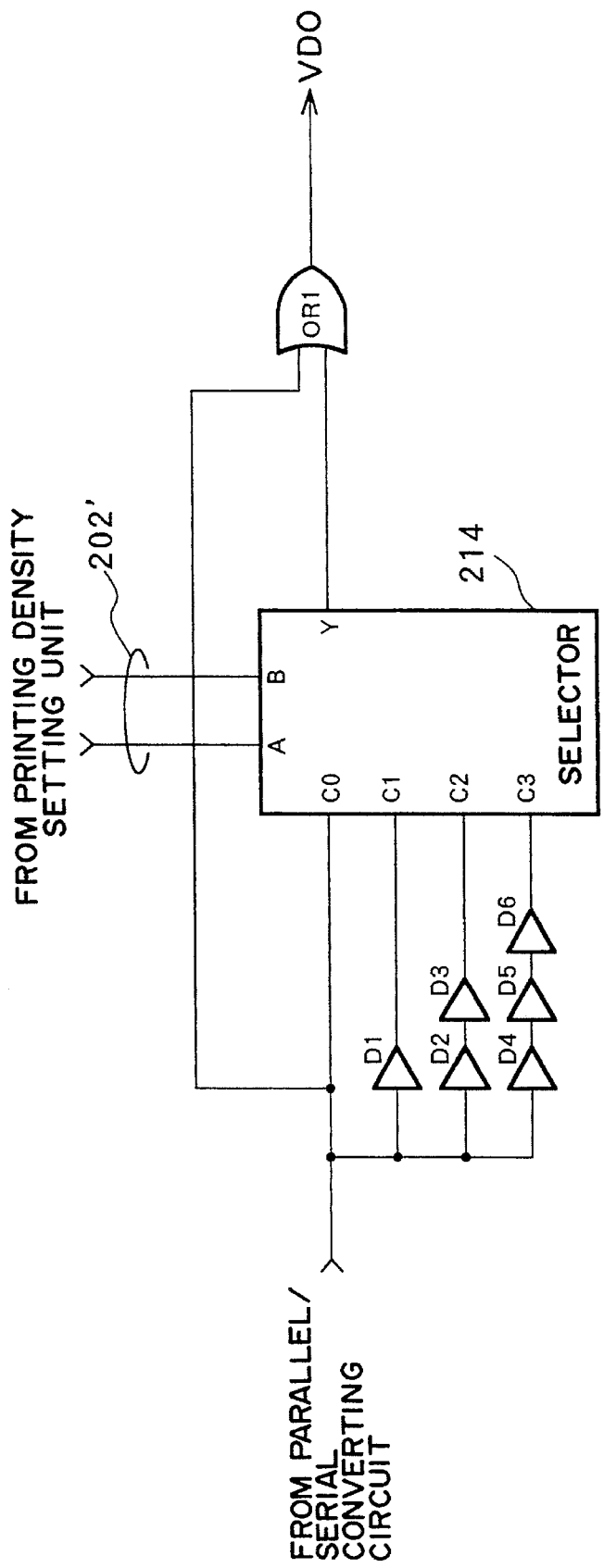
FIG. 41 is a block diagram showing a pulse-width modifying circuit in FIG. 40.
Figure 42:
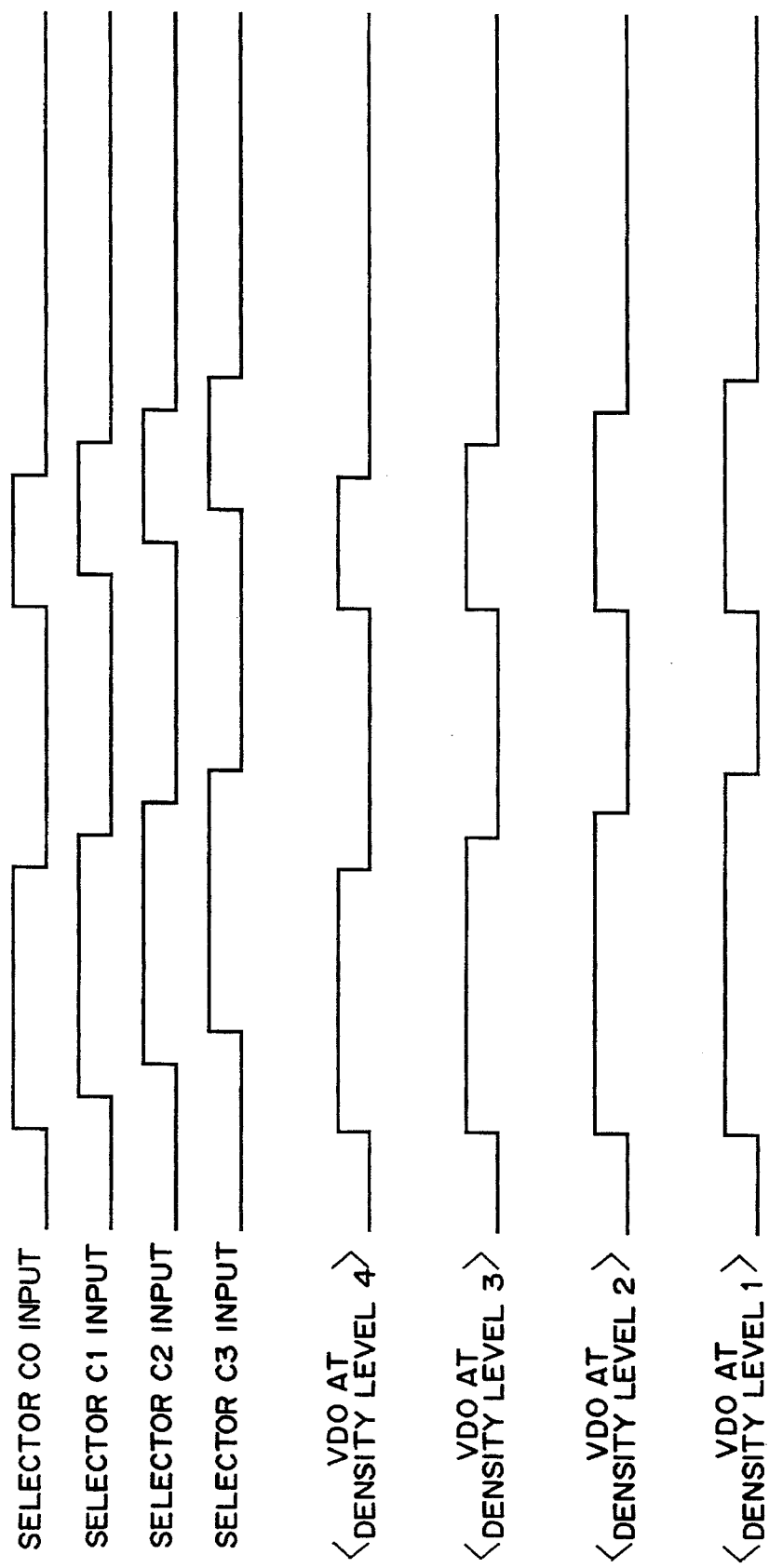
FIG. 42 is a timing chart associated with the pulse-width modifying circuit of the sixth embodiment.

FIG. 41 is a block diagram showing an example of the construction of the pulse-width varying circuit 213 according to the sixth embodiment. In FIG. 41, numeral 214 denotes a selector for selecting printing density. D1~D6 represent delay lines. The selector 214 selects one signal based upon selection control signals A and B inputted to the selector. The selected signal is delivered from an output terminal Y. The output passes through an OR gate OR1 as signal VDO. FIG. 42 illustrates the relationship between the output VDO and the density setting represented by the control signals A, B of the selector 214, namely the two-bit printing density setting setting signal 202' sent from the printing density setting unit 201. As in FIG. 10, when density has been set to its lowest value, the level is taken as being 1, and the level rises as density is set higher. As will be appreciated from the drawings, the higher the printing density is set, the smaller the pulse width of the outputted VDO signal. Accordingly, it is possible to execute processing similar to that of the fifth embodiment.

In accordance with the sixth embodiment, as described above, high-quality printing can be performed without a decline in the smoothing function even though the logic circuit is of one type and the density of the printer is changed.

In the description of the sixth embodiment, the logic circuit is of one type. However, a combined-type arrangement having the pulse-width varying circuit of this embodiment can be adopted by using a plurality of logic circuits.

In the fifth and sixth embodiments set forth above, a laser-beam printed is taken as an example. However, the invention is not limited to a laser-beam printer, for it is permissible to employ a dot-impact printer, a thermosensitive printer, an ink-jet printer, a static-electric recording-type printer or a thermal-transfer printer, etc.

In accordance with the fifth and sixth embodiments, as described above, the printing area of pixels of interest split into four parts in the main scanning direction are decided and printed depending upon the state of the pixel of interest, and printing density is raised in the main scanning direction, thereby smoothing the jaggedness of the contour of a printed character.

Furthermore, a plurality of methods of deciding the printing area of the pixels of interest are provided, and one of these methods is selected by a printing density level designated by the user. As a result, an excellent smoothing effect is obtained irrespective of the density level.

A seventh embodiment of the invention will now be described in detail.

Figure 43:
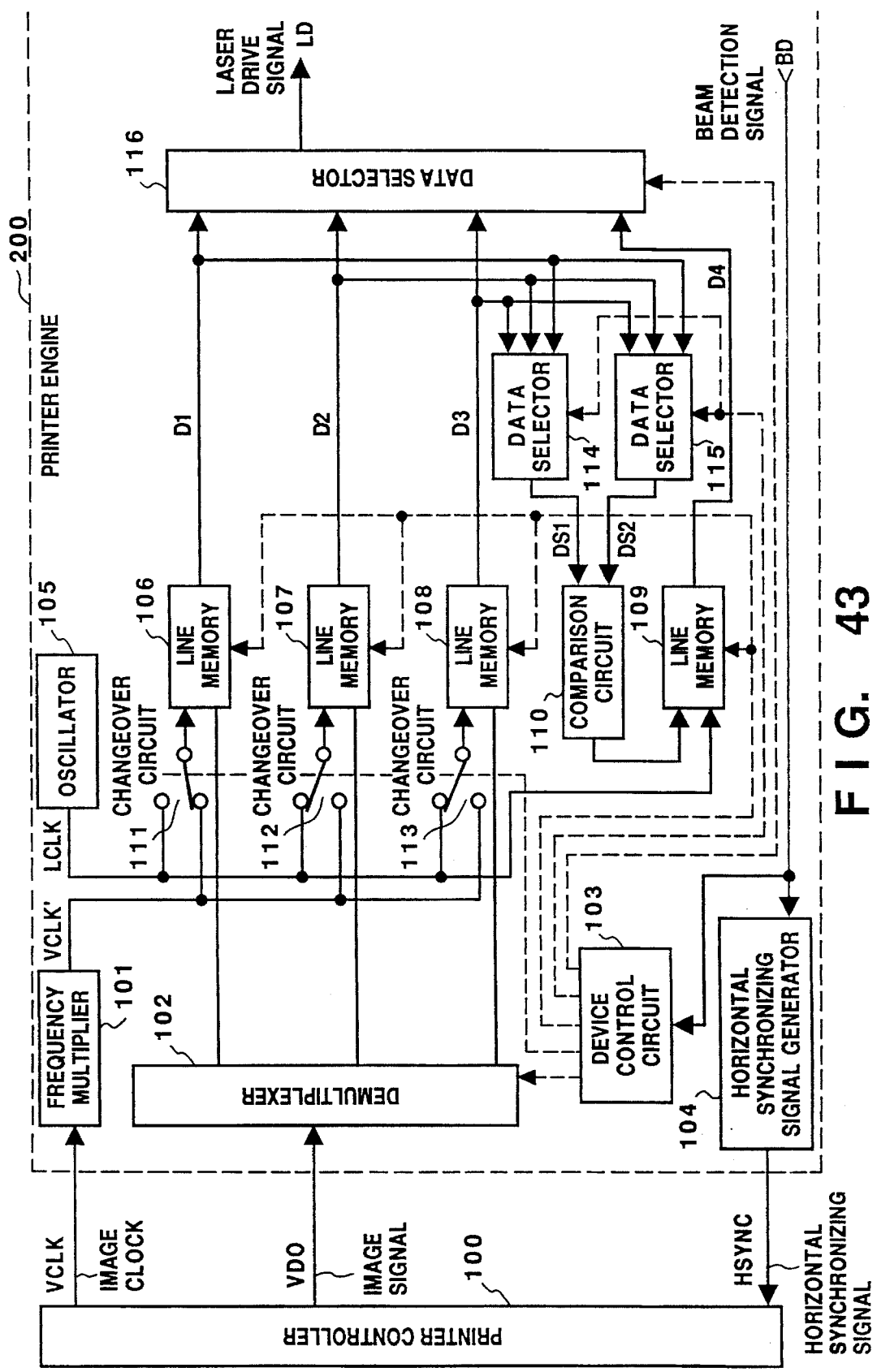
FIG. 43 is a block diagram relating to signal processing in a printer engine according to the seventh embodiment.

FIG. 43 is a block diagram showing a seventh embodiment of the invention. The circuit of FIG. 43 is a data converting circuit situated between the printer controller 100 and the printer engine 200. In this embodiment, the data converting circuit is illustrated as being part of the printer engine 200. (Of course, it is possible for the data converting circuit to be constructed as part of the printer controller.)

Further, the data conversion illustrated is for a case where the printer controller 100 delivers a 300 dpi image signal and the printer engine 200 is a 600 dpi printer engine. As is well known, the printer engine 200 is equipped with a laser driver which modulates the laser beam based upon an inputted image signal (dot information), a scanner for scanning the laser beam, a photosensitive drum and a conveyance system for recording paper.

The printer controller 100 sends a 300 dpi image signal VDO and the image clock VCLK to the printer engine 200 in dependence upon a horizontal synchronizing signal HSYNC outputted by a synchronizing signal generating circuit 104. The synchronizing signal generating circuit 104 delivers the horizontal synchronizing signal based upon the well-known signal BD, which is the synchronizing signal in the main scanning direction.

The data converting circuit of this embodiment within the printer engine 200 forms a laser drive signal LD for 600 dpi from the 300 dpi image signal VDO and image clock VCLK, and causes printing to take place at 600 dpi by the aforementioned laser driver, scanner, photosensitive drum, etc.

The data converting circuit of this embodiment will be described in further detail with reference to FIG. 43.

Shown in FIG. 43 are a frequency multiplier circuit 101 which multiplies the frequency of the image clock VCLK to obtain a clock VCLK' having twice the frequency, a demultiplexer 102 having a function for supplying the image signal VDO to line memories 106, 107, 108 in an alternative manner, a device control circuit 103, horizontal synchronizing signal generating circuit 104 for counting the beam detection signal (BD signal) and outputting one horizontal synchronizing signal HSYNC for every two inputted BD signals, and an oscillating circuit 105 for generating a clock LCLK whose frequency is four times that of the image clock VCLK.

Numerals 111 through 113 denote changeover circuits each of which is for selecting the clock VCLK' or LCLK in an alternative manner and supplying the selected clock to the respective line memories 106 through 108 as write clocks or read clocks.

The image signal VDO is written in one of the line memories 106 through 108 at the clock VCLK' by the demultiplexer 2, the changeover circuits 111, 112, 113, and the device control circuit 103 which controls these changeover circuits line by line based upon the BD signal. At the same time, image signals are read out of the other two line memories based upon the clock LCLK. This operation is performed sequentially. When data is written in the line memory 106, the line memories 107 and 108 undergo reading operations. Then, at the next timing, the line memory 107 undergo a writing operation and the line memories 108, 106 undergo a reading scan. At the next timing, the line memory 108 undergoes a writing operation, and the line memories 106, 107 undergo a reading operation. Such control is repeated.

The line memories 106 through 108 each have a memory capacity which is double the 300 dpi data in the main scanning direction. That is, each has a data memory capacity in the main scanning direction of 600 dpi. The image signals read out of the line memories 106 through 108 are designated D1, D2, D3, respectively.

Numerals 114 and 115 denote data selectors each of which selects two signals, which are undergoing a reading operation, from the signals D1, D2, D3 obtained from the respective line memories 106, 107, 108. For example, when the line memory 106 is undergoing writing and the line memories 107, 108 are undergoing reading, the data selector 114 selects the read data D2 from line memory 107 and outputs a DS1 signal, and the data selector 115 selects the read data D3 from line memory 108 and outputs a DS2 signal. In any case, of the two items of data undergoing a reading operation, the data selector 114 selects the data received earlier in time and the data selector 115 selects the data received later in time.

A comparison circuit 110 receives the DS1, DS2 signals as inputs, compares the data and delivers an output signal Q in accordance with the result of the comparison. The line memory 109 stores the output signal Q, and the memory capacity thereof is the same as the memory capacities of the line memories 106 through 108. The clock for writing and reading the line memory 109 is LCLK.

Control for writing and reading the line memories 106~108 and the line memory 109, as well as control of the selecting operation of the data selectors 114, 115, is executed by the device control circuit 103.

A data selector 116 selects a signal from among the signals D1, D2, D3 read out of the line memories 106, 107, 108, respectively, and the signal D4 read out of the line memory 109, and outputs the selected signal as the laser drive signal LD. Control for this selection is carried out by the device control circuit 103.

Figure 44:
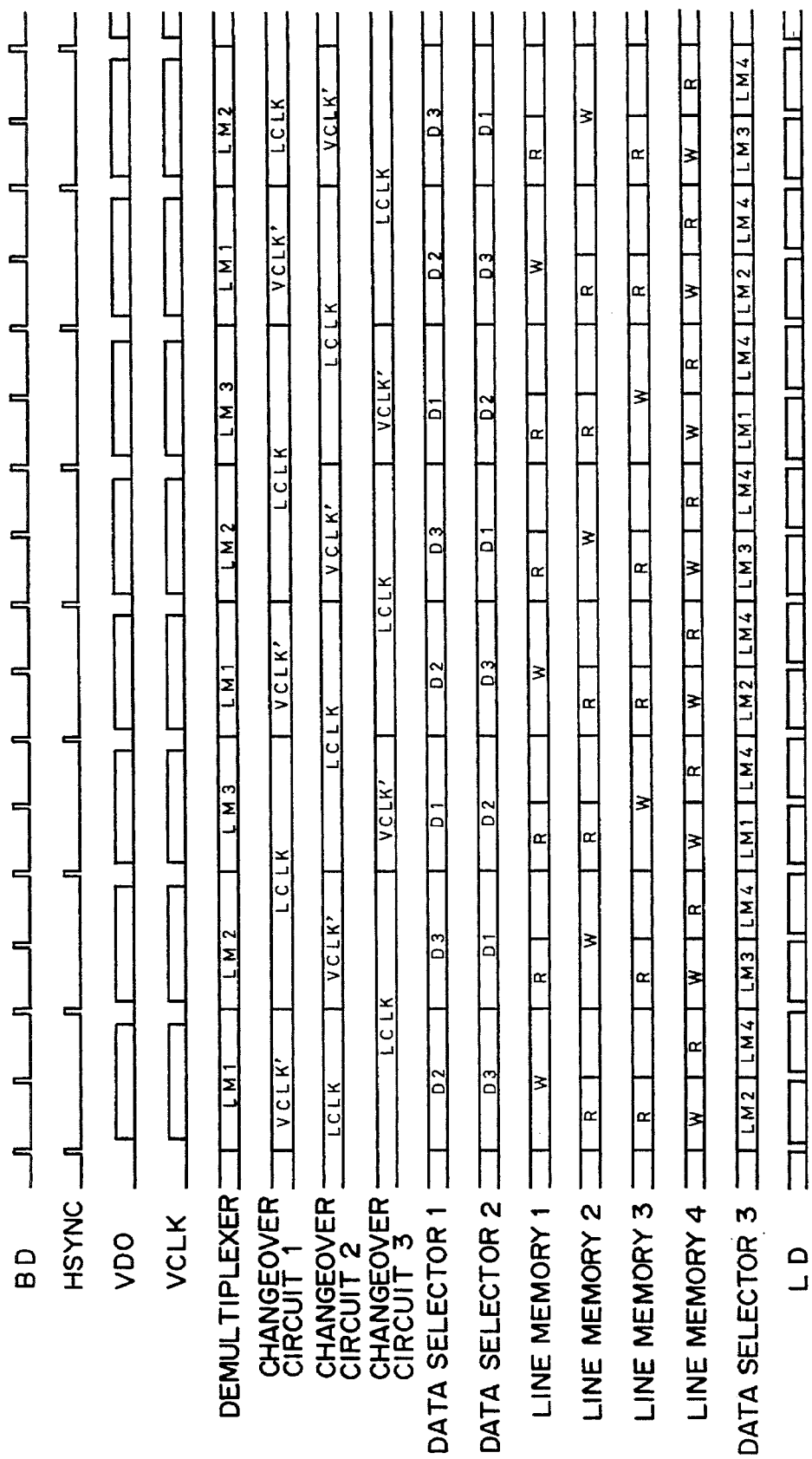
FIG. 44 is a timing chart associated with each of the units in FIG. 43.

The operations set forth above are illustrated as a timing chart in FIG. 44. In the Figure, mark "LM" denotes line memory.

The details of the comparison circuit 110 in FIG. 43 are shown in FIG. 45. In FIG. 45, the input signals DS1 and DS2 are inputted to seven-bit registers 117 and 118, respectively. Shift outputs A, B, C, D, E, F, G of the shift register 117 and shift outputs a, b, c, d, e, f, g of the shift register 118 enter a logic circuit 119.

Figure 46:
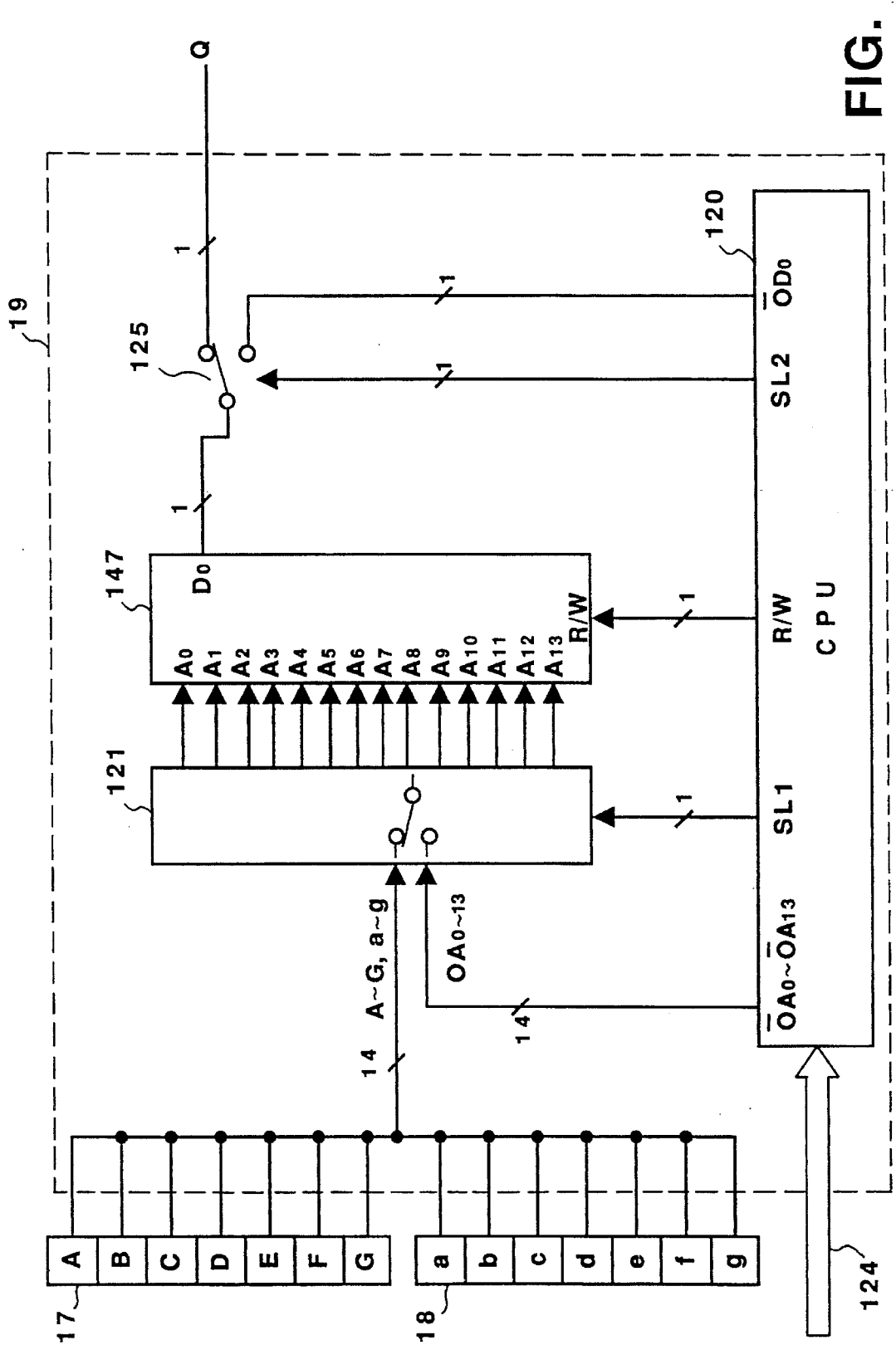
FIG. 46 is a block diagram of a logic circuit in FIG. 45.

The details of the logic circuit 119 are illustrated in FIG. 46. Numeral 147 denotes an SRAM memory, 120 a CPU, and 121 a changeover circuit for performing a changeover to select, as the address signals of the SRAM memory 147, either a data group made up of the 14 shift outputs A~G, a~g of the foregoing shift registers or a data group made up of 14 outputs $OA_0$~$OA_{13}$ from the CPU 120. The changeover circuit 121 is controlled by a control signal SL1 outputted by the CPU 120. Numeral 125 denotes a changeover circuit for changing over between an operation in which output data $OD_0$ from the CPU 120 is written in as data $D_0$ of the SRAM memory 147, and an operation in which the data $D_0$ of the SRAM memory 147 is outputted as Q. The changeover circuit 125 is controlled by a control signal SL2 outputted by the CPU 120. The SRAM memory 147 is placed selectively in either a read state or a write state by a control signal R/W outputted by the CPU 120. Numeral 124 denotes a communication line which transmits data to the CPU 120 from an external device (not shown) by serial communication. Accordingly, the arrangement is such that the contents of the SRAM memory 147 can be changed by the data sent from the external device via the communication line 124. It should be noted that the SRAM 147 is used as a so-called look-up table.

Described next will be an operation for downloading logic (an algorithm) for smoothing processing in the logic circuit 119 having the construction set forth above.

As mentioned above, the prescribed algorithm data is transmitted from the external device to the CPU 120 via the communication line 124. Upon receiving the algorithm data, the CPU 120 controls the signal applied to the changeover circuit 121 to place this circuit in the state for selecting and outputting the data group $OA_0 \sim OA_{13}$. The CPU 120 controls also the signal SL2 applied to the changeover circuit 125 to select and output $OD_0$. The R/W signal applied to the SRAM 147 is set to W (write) to establish the write mode in which writing is performed based upon the address data from the changeover circuit 121.

Thereafter, the data (algorithm data) transmitted from the external device is received, the received data is outputted from the terminal $OD_0$, and corresponding addresses are sequentially generated, whereby the received data is written in the SRAM 147. When the writing of the data ends, the CPU 120 controls SL1 and SL2 to set the changeover circuit 121 so as to select and output A~G and a~g and the changeover circuit 125 to select and output Q. Further, the CPU 120 sets the R/W signal, which is applied to the SRAM 147, to the R (read) side. 5 Thereafter, when the image signal VDO from the printer controller 100 is transmitted in synchronization with the image clock VCLK, smoothing processing is executed based upon the algorithm that has been stored in the SRAM memory 147.

The logic (algorithm) downloaded in the SRAM memory 147 by the foregoing operation will now be described.

Figures 47, 48:
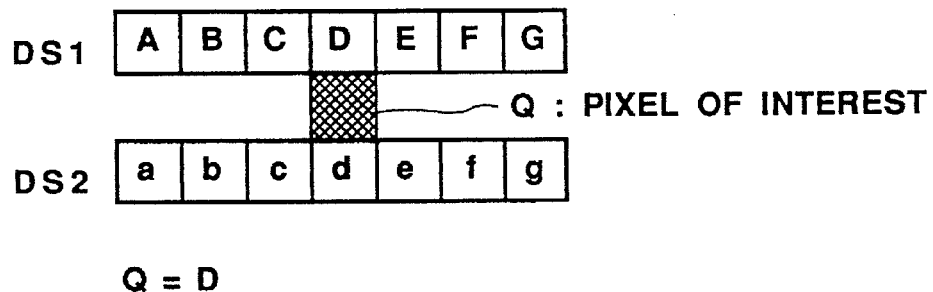
FIG. 47 is a diagram for describing the principle according to which a pixel of interest is generated in a first smoothing algorithm.
FIG. 48 is a diagram showing the data stored in an SRAM based upon the first smoothing algorithm.
Figure 49:
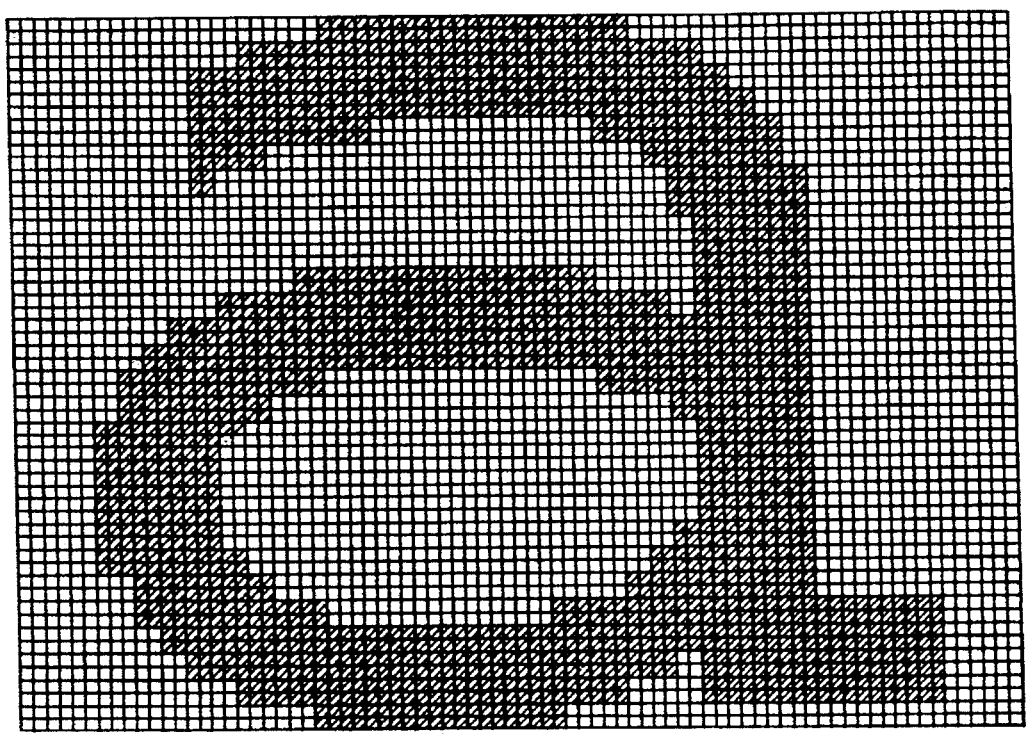
FIG. 49 is a diagram showing an example of a character pattern created by the first smoothing algorithm.

FIGS. 47, 48 and 49 are diagrams for describing a first algorithm. This algorithm is processed by the logic Q=D (where Q is the pixel of interest) with respect to the shift outputs A~G, a~g, as shown in FIG. 47. In this case, the data $D_0$ at all addresses for which the address A3 of the SRAM memory 147 can be "1" is written as "1" in the SRAM memory 147, and "0" is written in at all of the other addresses, as shown in FIG. 48.

Figure 16:
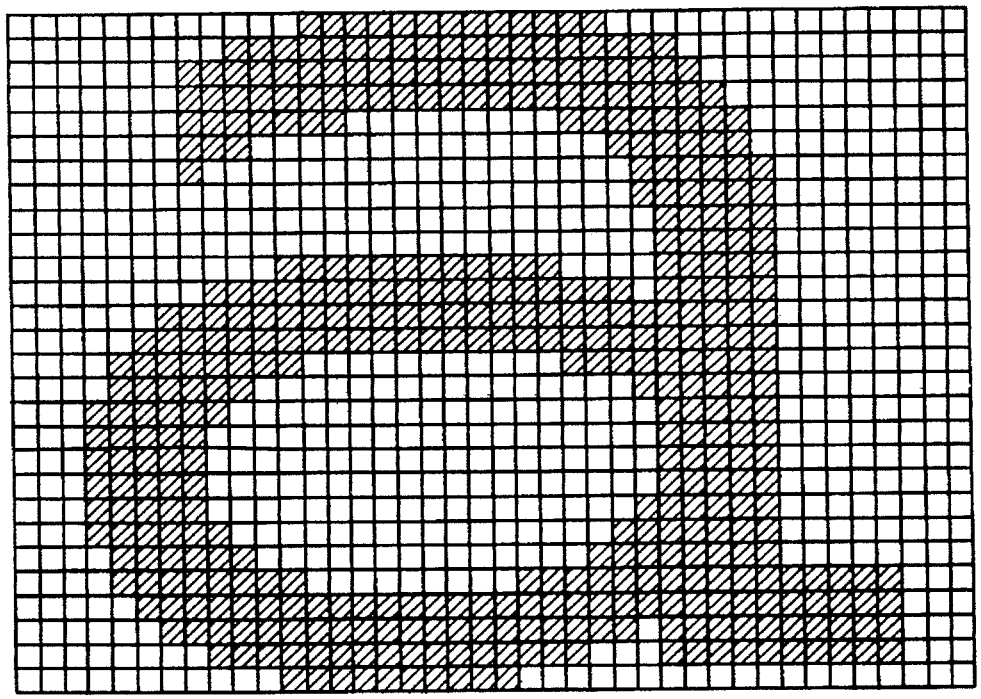
FIG. 16 is a diagram showing an example of a character pattern to be printed.

The first algorithm executes processing in which data is simply doubled in both the main and subordinate scanning directions and outputted. Though processing has no smoothing effect upon characters, it does not result in a change in the density of a dither image. Accordingly, it is useful for images which contain dither images. FIG. 49 illustrates the result of processing based upon the pattern shown in FIG. 16.

Figure 50:
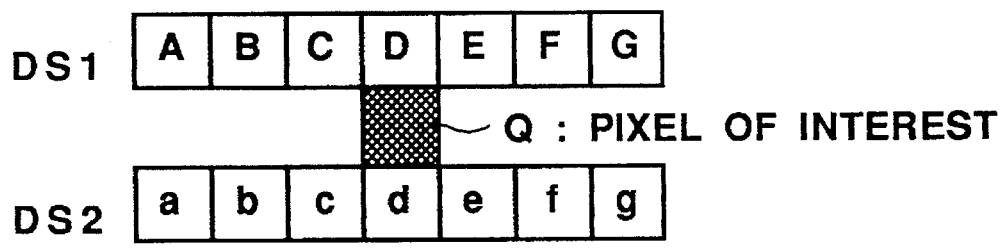
FIG. 50 is a diagram for describing the principle according to which a pixel of interest is generated in a second smoothing algorithm.
Figure 52:
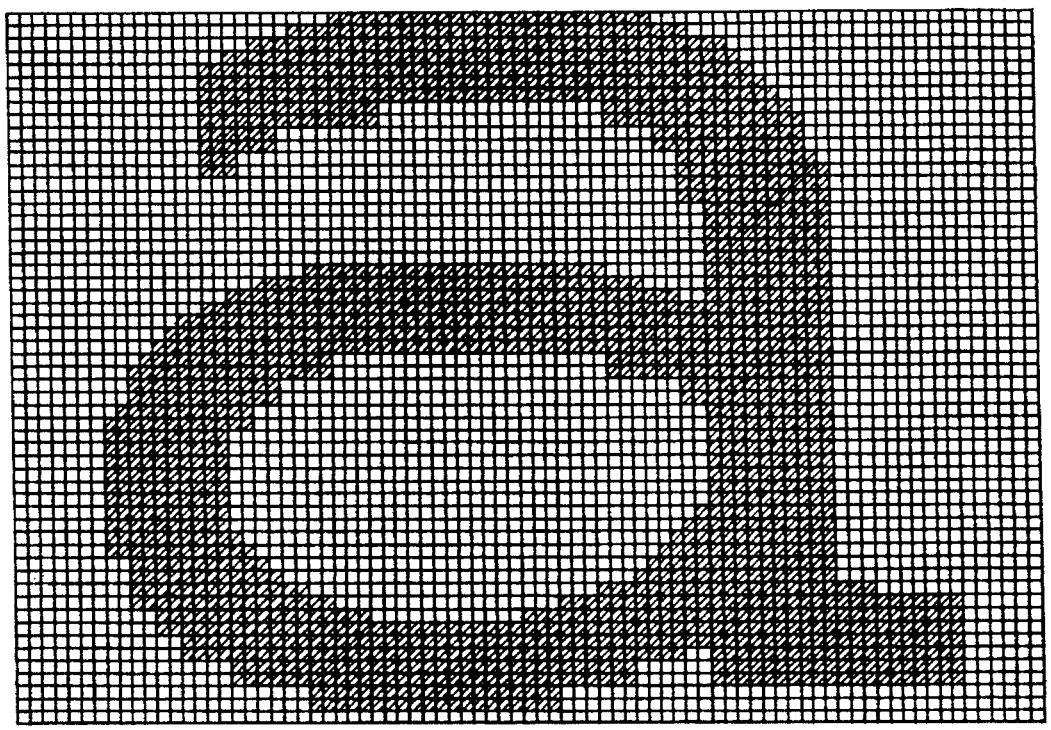
FIG. 52 is a diagram showing an example of a character pattern created by the second smoothing algorithm.

FIGS. 50, 51 and 52 are diagrams for describing a second algorithm, which will now be described in simple terms.

In a case where all seven pixels of the next line of the pixel of interest Q are "1" and at least one of the pixels at both ends of the seven pixels in the preceding line is "1", the pixel of interest Q is made "1".

In a case where the referential pixels are reduced, all five pixels of the next line of the pixel of interest Q are "1" and at least one of the pixels which are the second pixels from both ends of the seven pixels in the preceding line is "1", the pixel of interest Q is made "1".

In a case where the referential pixels are reduced, all three pixels of the next line of the pixel of interest Q are "1" and at least one of the pixels which are the third pixels from both ends of the seven pixels in the preceding line is "1", the pixel of interest Q is made "1".

In a case where pixels of lines before and after the pixel of interest Q at the same position in the main scanning direction are "1", the pixel of interest Q is made "1".

This algorithm is processed by the logic $$\begin{aligned} Q &= (A+G)*a*b*c*d*e*f*g \\ &+ (B+F)*b*c*d*e*f \\ &+ (C+E)*c*d*e*D*d \end{aligned}$$

(where Q is the pixel of interest) with respect to the shift outputs A~G, a~g, as shown in FIG. 50. In this case, the data $D_0$ solely of the addresses shown in FIG. 51 is written as "1", and the data $D_0$ corresponding to all other addresses writes in "0" in the SRAM memory 147. FIG. 52 illustrates the result of processing in a case where this processing is executed.

Figure 55:
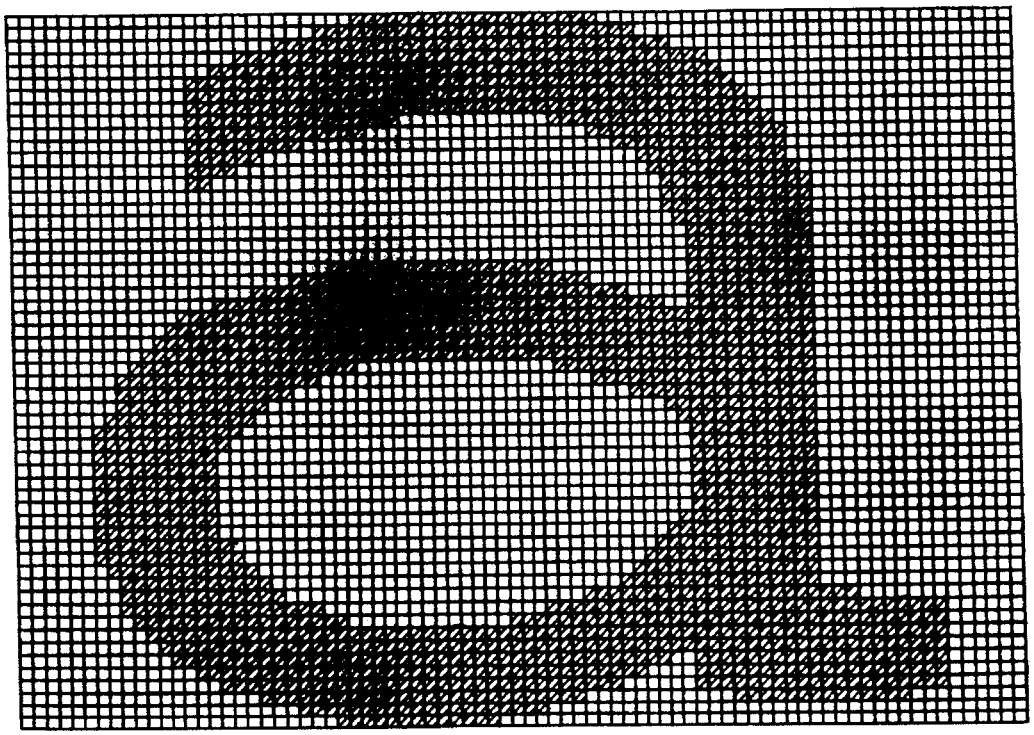
FIG. 55 is a diagram showing an example of a character pattern created by the third smoothing algorithm.

FIGS. 53, 54 and 55 are diagrams for describing a third algorithm.

This algorithm is processed by the logic $$\begin{aligned} Q &= (B+F)*b*c*d*e*f \\ &+ (b+f)*B*C*D*E*F \\ &+ (C+E)*c*d*e \\ &+ (C+e)*C*D*E*D*d \\ &+ A*B*C*D*E*F*G \\ &+ a*b*c*d*e*f*g \end{aligned}$$

(where Q is the pixel of interest) with respect to the shift outputs A~G, a~g, as shown in FIG. 50. In this case, the data DO solely of the addresses shown in FIG. 54 is written as "1", and the data $D_0$ corresponding to all other addresses writes in "0" in the SRAM memory 147. FIG. 55 illustrates the result of processing in a case where this processing is executed.

The result of processing in FIG. 52 and the result of processing in FIG. 55 have different smoothing effects and the characters appear differently. In this case, which is better cannot be decided unconditionally owing to individual taste. Though a smoothing effect is produced with regard to characters by the processing of both types, processing for increasing printing area is executed by one type of smoothing processing, and therefore image density becomes somewhat too high in case of dither images. Accordingly, these types of processing are suited to images composed mainly of characters or Figures.

Accordingly, with regard to the algorithm data downloaded from the external device, it will suffice to download the optimum algorithm (e.g., the first, second or third algorithm) in dependence upon the content of the image to be printed. As one method, the operator may designate, at the external device, the algorithm according to which printing is to be performed. The data indicative of the designation would then be sent to the CPU 124 of the image processing apparatus.

An eighth embodiment of the invention will now be described.

In the description given above, only one algorithm is downloaded in the logic circuit at one time. However, downloading is not limited to this example, for an arrangement may be adopted in which a large number of algorithms are capable of being downloaded simultaneously. An eighth embodiment so constructed that three (of a maximum of eight) algorithms can be downloaded simultaneously will now be described with reference to FIGS. 56 and 57.

Figure 56:
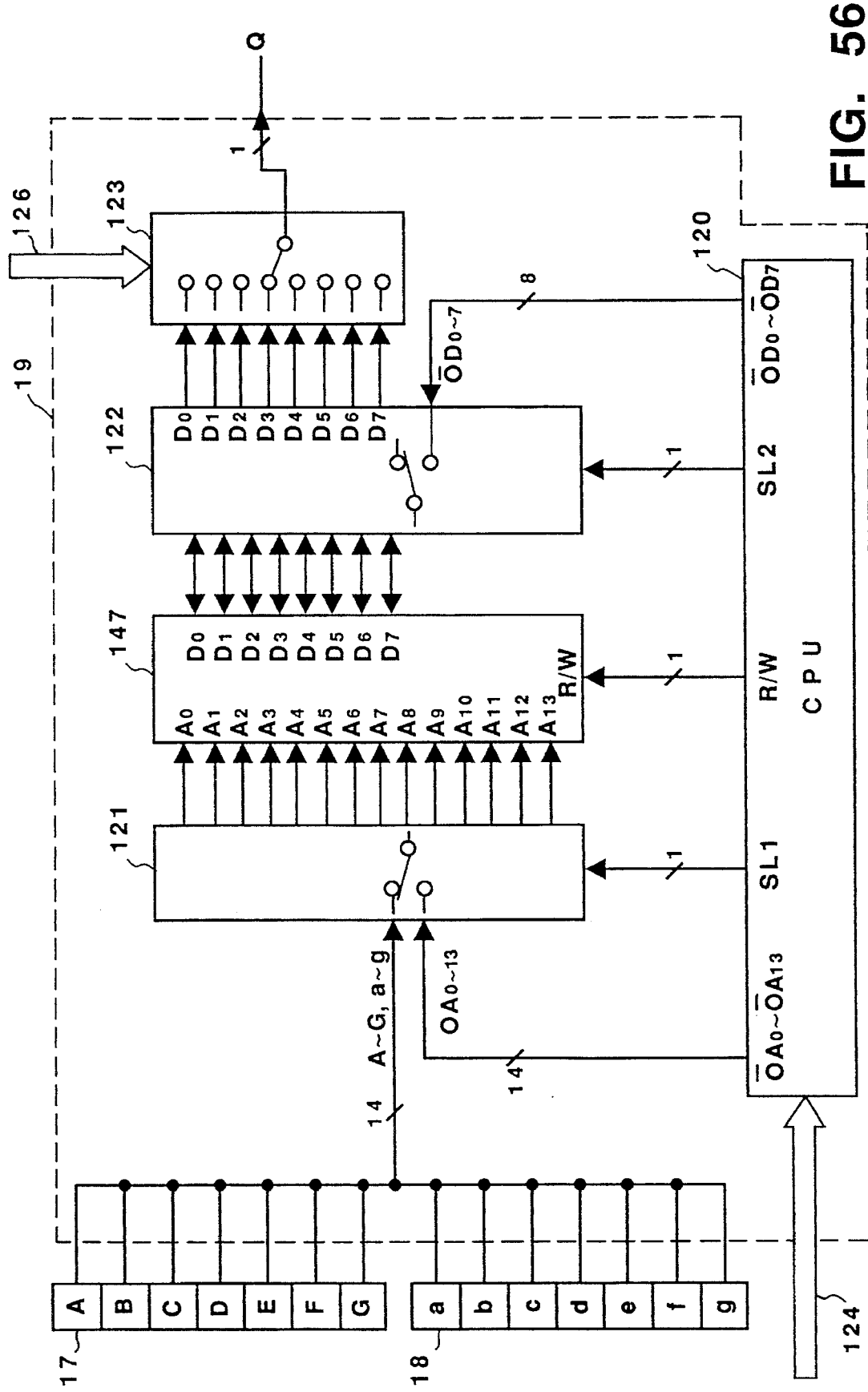
FIG. 56 is a block diagram showing a logic circuit according to the eighth embodiment.

In the eighth embodiment, the basic construction is approximately the same as that of the seventh embodiment, and the logic circuit depicted in FIG. 46 of the seventh embodiment has the construction illustrated in FIG. 56. Portions in FIG. 56 similar to those of the seventh embodiment shown in FIG. 46 are designated by like reference characters and need not be described in detail again.

In FIG. 56, numeral 122 denotes a changeover circuit controlled by the control signal SL2 outputted by the CPU 120. The changeover circuit performs a changeover to either deliver an output data group $OD_0$~$OD_7$ from the CPU 120 to the SRAM memory 147 or a read data group $Q_0$~$Q_7$ from the SRAM memory 147 to a signal selecting circuit 123. In accordance with a changeover signal 126 from selecting means such as a changeover switch, the signal selecting circuit 123 selects, in alternative fashion, one item of data from the data group $Q_0$~$Q_7$ obtained from the changeover circuit 122. The origin of the changeover signal 126 can be a physical switch or a logic switch (application software operated within a host computer).

The operation of the eighth embodiment having the foregoing construction will now be described.

In the eighth embodiment, the prescribed algorithm data is transmitted from the external device to the CPU 120 via the communication line 124. The CPU 120 outputs the signal SL1 which controls the changeover circuit 121 in such a manner that the data group $OA_0$~$OA_{13}$ from the CPU 120 is selected and outputted to the SRAM 147, and outputs the signal SL2 which controls the changeover circuit 122 in such a manner that the data group $OD_0$~$OD_7$ from the CPU 120 is selected and outputted to the SRAM 147.

In a case where the algorithm data actually received registered in the SRAM 147 anew, the operation performed is as follows:

By way of example, if the data newly downloaded from the external device is written in bit D4 (=bit 4) of the SRAM 147, first the address at which writing is to be performed is generated and a read signal is outputted to the SRAM 147. Since eight bits of a corresponding address are obtained as a result, the state of the bit to be written in from this point is set at the position of bit 4 in the eight bits. This eight-bit data is outputted, address data the same as the address at the time of readout is outputted, and the write signal is outputted. Thereafter, the address data is incremented to prepare for the next writing operation. The foregoing processing is continued until the writing of all of the downloaded algorithm data is completed. The reason for reading out the eight-bit data before the writing operation is performed is so that algorithm data already registered will not be described.

The bit position at which writing is to be performed may be designated by the user at a control panel, or the external device may send a command which designates the bit position at which writing is to be performed. In the former case, unintentional erasure of data will no longer occur if it is so arranged that it is possible to judge which bits of the SRAM 147 are unused.

Thereafter, when further data (algorithm data) is received from the external device, this data is sequentially written in the SRAM memory 147 at the prescribed address. When the writing of the data ends, the CPU 120 controls SL1 and SL2 to set the changeover circuit 121 so as to select and output A~G and a~g and the changeover circuit 122 to select and output $Q_0$~$Q_7$. Further, the CPU 120 sets the R/W signal, which is applied to the SRAM 147, to the R (read) side. The signal selecting circuit 123 selects one of the signals $Q_0$~$Q_7$.

Thereafter, when the image signal VDO from the printer controller 100 is transmitted together with the image clock VCLK, smoothing processing is executed based upon the algorithm that has been stored in the SRAM memory 147.

In the eighth embodiment shown in FIG. 56, the first, second and third algorithms of the seventh embodiment are stored in the SRAM 147 as data D0, D1, D2. The relationship between the addresses and data in this case is illustrated in FIG. 57.

Thus, in accordance with the eighth embodiment, three (a maximum of eight) algorithms can be downloaded simultaneously, and any one of these algorithms can be selected promptly.

It should be noted that the present invention may be applied to a system constituted by a plurality of apparatus or to a single apparatus. Further, it goes without saying that the invention is applicable also to a case where a program for implementing the invention is supplied to a system or apparatus.

In accordance with the seventh or eighth embodiment described above, image processing in accordance with any interpolation algorithm information outputted by an external device is possible. As a result, it is possible to download any smoothing algorithm in conformity with the content of an image to be outputted, or in conformity with individual preference. This makes it possible to produce a high-quality output image.

Though the foregoing embodiments are based upon an example in which the invention is applied to the interior of a printer, the apparatus of the invention can be situated between a host computer and a printer.

Though use of a laser-beam printer is described in the first through eighth embodiments, the invention is not limited to such a printer. The invention is applicable to a dot-impact printer, a thermosensitive printer, an ink-jet printer, a static-electric recording-type printer or a thermal-transfer printer, etc.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for generating an output image based upon inputted print data and delivering the output image to a prescribed recording device, comprising:

density setting means for setting a dark level of recording density;

input means for inputting binary print data intended to be printed at a first resolution;

resolution converting means for generating binary image data having a second resolution by splitting each pixel in image data, which is based upon the binary print data inputted by said input means, into a plurality of partial pixels and then applying a correction; and output means for outputting the binary image data converted by said resolution converting means to the prescribed recording device;

said resolution converting means including:

a plurality of arithmetic means for computing the state of each individual partial pixel at the second resolution, wherein computations performed by individual arithmetic means differ from one another; and selecting means for selecting one of said plurality of arithmetic means in dependence upon the dark level of recording density set by said density setting means.

2. The apparatus according to claim 1, wherein when said plurality of arithmetic means are such that when the state of each partial pixel of the second resolution corresponding to a pixel of interest is computed, the contents of processing of the states of a group of pixels at the first resolution in the vicinity of the pixel of interest are different.

3. The apparatus according to claim 1, wherein said plurality of arithmetic means are such that the higher the density set by said density setting means, the lower the probability that the individual partial pixels generated will be black.

4. The apparatus according to claim 1, wherein said prescribed recording device is a laser-beam printer, and said plurality of arithmetic means are such that the higher the density set by said density setting means, the shorter the ON time of laser emission for the individual partial pixels.

5. An image processing apparatus for generating an output image based upon inputting print data and printing the output image on a prescribed recording medium, comprising:

density setting means for setting a dark level of recording density;

input means for inputting binary print data intended to be printed at a first resolution;

resolution converting means for generating binary image data having a second resolution by splitting each pixel in image data, which is based upon the binary print data inputted by said input means, into a plurality of partial pixels and then applying a correction; and printing means for printing the binary image data converted by said resolution converting means;

said resolution converting means including:

a plurality of arithmetic means for computing the state of each individual partial pixel at the second resolution, wherein computations performed by individual arithmetic means differ from one another; and selecting means for selecting one of said plurality of arithmetic means in dependence upon the dark level of recording density set by said density setting means.

6. The apparatus according to claim 5, wherein when said plurality of arithmetic means are such that when the state of each partial pixel of the second resolution corresponding to a pixel of interest is computed, the contents of processing of the states of a group of pixels at the first resolution in the vicinity of the pixel of interest are different.

7. The apparatus according to claim 5, wherein said plurality of arithmetic means are such that the higher the density set by said density setting means, the lower the probability that the individual partial pixels generated will be black.

8. The apparatus according to claim 5, wherein said prescribed recording device is a laser-beam printer, and said plurality of arithmetic means are such that the higher the density set by said density setting means, the shorter the ON time of laser emission for the individual partial pixels.

9. An image processing apparatus comprising:

density setting means for setting a dark level of recording density;

generating means for generating a synchronizing clock signal in a main scanning direction;

input means for inputting binary image data, which has a first printing density, in synchronization with the synchronizing clock signal generated by said generating means;

memory means for storing a plurality of lines of the binary image data, inputted by said input means, in main-scanning units;

referring means for referring to the state of a pixel of interest and the states of pixels peripheral to the pixel of interest based upon the binary image data stored in said memory means;

a plurality of converting means for converting binary image data which corresponds to the pixel of interest to a plurality of binary image data of a second printing density higher than the first printing density based upon the results of reference performed by said referring means;

selecting means for selecting one item of binary image data, from among the plurality of binary image data converted by said plurality of converting means, based upon the dark level of recording density set by said density setting means; and output means for outputting the binary image data of the second printing density selected by said selecting means.

10. The apparatus according to claim 9, wherein said output means includes pulse-width control means for controlling pulse widths of individual pixels, which constitute the image data of the second printing density selected by said selecting means, based upon the density set by said density setting means.

11. An image processing apparatus comprising:

density setting means for setting a dark level of recording density;

generating means for generating a synchronizing clock signal in a main scanning direction;

input means for inputting binary image data, which has a first printing density, in synchronization with the synchronizing clock signal generated by said generating means;

memory means for storing a plurality of lines of the binary image data, inputted by said input means, in main-scanning units;

referring means for referring to the state of a pixel of interest and to the states of pixels peripheral to the pixel of interest based upon the binary image data stored in said memory means;

converting means for converting binary image data which corresponds to the pixel of interest to a binary image data of a second printing density higher than the first printing density based upon the results of reference performed by said referring means;

pulse-width control means for controlling pulse width of each pixel, which is contained in the binary image data converted by said converting means, based upon the dark level of recording density set by said density setting means; and output means for outputting the binary image data controlled by said pulse-width control means.

12. The apparatus according to claim 11, wherein said output means is a laser-beam printer which records the image by turning laser-beam irradiation on and off based upon a pulse-width signal controlled by said pulse-width control means.

13. An image processing apparatus for generating an output image based upon inputted print data and delivering the output image to a prescribed recording device, comprising:

input means for inputting binary image data;

memory means for storing a plurality of pixels located within a predetermined area of the binary image data inputted by said input means;

output-pixel generating means for generating an output pixel upon processing status information indicative of said plurality of pixels stored in said memory means;

wherein said output-pixel generating means generates an output pixel by converting one binary pixel data inputted by said input means into a plurality of binary pixel data;

output means for delivering the output pixel generated by said output-pixel generating means to the prescribed recording device;

second input means for externally inputting data of an algorithm of said processing in said output-pixel generating means; and control means for performing control in accordance with the processing algorithm inputted by said second input means in such a manner that said output-pixel generating means generates an output pixel.

14. The apparatus according to claim 13, further comprising second memory means for storing a plurality of items of processing algorithm data inputted by said second input means;

said control means including selecting means for selecting one of the plurality of items of processing algorithm data stored in said second memory means, said control means performing control in such a manner that said output-pixel generating means generates an output pixel in accordance with the processing algorithm data selected by said selecting means.

* * * * *

UNITED STATES PATENT AND TRADEMARK OFFICE
CERTIFICATE OF CORRECTION

PATENT NO. : 5,586,227

DATED : December 17, 1996

INVENTOR(S) : Takashi Kawana, et al.

It is certified that error appears in the above-identified patent and that said Letters Patent is hereby corrected as shown below:

On the cover page, Under "Foreign Patent Documents", change "389776    4/1991    Japan" to --3-89776    4/1991    Japan--.

Column 2, line 14, delete "of".

Column 6, line 67, change "reach" to --each--.

Column 9, line 60, change "OCCUr." to --occur.--

Column 14, line 3, change "at" to --as--.

Column 16, line 56, change " 'L')." to --("L")--.

Column 17, line 49, change "at" to --as--; and
line 66, change "of the kind" to --the technique--.

Column 20, line 26, change "setting setting" to --setting--.

UNITED STATES PATENT AND TRADEMARK OFFICE
CERTIFICATE OF CORRECTION

PATENT NO. : 5,586,227

DATED : December 17, 1996

INVENTOR(S) : Takashi Kawana, et al.

It is certified that error appears in the above-identified patent and that said Letters Patent is hereby corrected as shown below:

Column 23, line 20, change "side 5. 5 Thereafter" to --side.-- and begin a new paragraph with "Thereafter".

Column 24, line 5, change "+ (C+E)*c*d*e*D*d" to --+ (C+E)*c*d*e+D*d--;
line 20, change "+ (C+E)*C*D*E*D*d" to --+ (C+E)*C*D*E+D*d--; and
line 26, change "DO" to --$D_0$--.

Signed and Sealed this

Twelfth Day of August, 1997

Attest:

Attesting Officer

BRUCE LEHMAN

Commissioner of Patents and Trademarks